US009391754B2

(12) United States Patent
Nammi et al.

(10) Patent No.: US 9,391,754 B2
(45) Date of Patent: Jul. 12, 2016

(54) METHODS OF MAPPING RETRANSMISSIONS RESPONSIVE TO BUNDLED NACK MESSAGES AND RELATED DEVICES

(71) Applicant: Telefonaktiebolaget L M Ericsson (publ), Stockholm (SE)

(72) Inventors: Sairamesh Nammi, Stockholm (SE); Namir Lidian, Solna (SE); Anders Jonsson, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 160 days.

(21) Appl. No.: 13/976,669

(22) PCT Filed: May 29, 2013

(86) PCT No.: PCT/SE2013/050614
§ 371 (c)(1),
(2) Date: Jun. 27, 2013

(87) PCT Pub. No.: WO2013/187824
PCT Pub. Date: Dec. 19, 2013

(65) Prior Publication Data
US 2014/0126551 A1 May 8, 2014

Related U.S. Application Data

(60) Provisional application No. 61/659,793, filed on Jun. 14, 2012.

(51) Int. Cl.
*H04L 5/00* (2006.01)
*H04L 1/00* (2006.01)
(Continued)

(52) U.S. Cl.
CPC ............ *H04L 5/0055* (2013.01); *H04B 7/0413* (2013.01); *H04L 1/0025* (2013.01);
(Continued)

(58) Field of Classification Search
CPC ... H04L 5/0055; H04L 1/0025; H04L 1/0026; H04L 1/06; H04L 5/0053; H04L 5/0048; H04B 7/0413; H04B 7/0417; H04W 72/042
USPC .......................... 370/336, 311, 329, 330, 280
See application file for complete search history.

(56) References Cited

U.S. PATENT DOCUMENTS

2008/0225964 A1  9/2008  Han et al.
2008/0232449 A1  9/2008  Khan
(Continued)

FOREIGN PATENT DOCUMENTS

EP    2 234 308 A1    9/2010
EP    2 375 607 A1    10/2011

OTHER PUBLICATIONS

International Search Report and Written Opinion Corresponding to International Application No. PCT/SE2013/050614; Date of Mailing: Sep. 13, 2013; 12 Pages.
(Continued)

*Primary Examiner* — Jamal Javaid
(74) *Attorney, Agent, or Firm* — Myers Bigel & Sibley, P.A.

(57) ABSTRACT

A method of operating a node of a MIMO network may include transmitting first and second HARQ IDs over a downlink signaling channel to a wireless terminal for a first MIMO TTI. The first HARQ ID is mapped to a first MIMO layer, and the second HARQ ID is mapped to second and third MIMO layers. First, second, and third data blocks are transmitted over the first, second, and third MIMO layers to the wireless terminal for the first MIMO TTI. Responsive to receiving an ACK message associated with the first HARQ ID, a fourth data block is transmitted over the first MIMO layer to the wireless terminal for a second MIMO TTI. Responsive to receiving a NACK message associated with the second HARQ process identification, the second and third data blocks are retransmitted over the second and third MIMO layers to the wireless terminal for the second MIMO TTI.

20 Claims, 16 Drawing Sheets

(51) Int. Cl.
  *H04L 1/16* (2006.01)
  *H04L 1/18* (2006.01)
  *H04B 7/04* (2006.01)

(52) U.S. Cl.
  CPC ............ *H04L1/0075* (2013.01); *H04L 1/1671* (2013.01); *H04L 1/1812* (2013.01); *H04L 1/1819* (2013.01); *H04L 1/1822* (2013.01); *H04L 1/1896* (2013.01)

(56) References Cited

U.S. PATENT DOCUMENTS

| | | | |
|---|---|---|---|
| 2009/0098876 | A1 | 4/2009 | Khan et al. |
| 2009/0201869 | A1 | 8/2009 | Xu et al. |
| 2009/0279460 | A1* | 11/2009 | Sarkar .......................... 370/280 |
| 2009/0282310 | A1 | 11/2009 | Seok et al. |
| 2011/0051824 | A1 | 3/2011 | Kim et al. |
| 2011/0142147 | A1 | 6/2011 | Chen |
| 2011/0222483 | A1 | 9/2011 | Yuda et al. |
| 2011/0299466 | A1 | 12/2011 | Ofuji et al. |
| 2013/0121312 | A1 | 5/2013 | Roman et al. |

OTHER PUBLICATIONS

Ericsson "4-branch MIMO for HSDPA", 3GPP TSG RAN WG1 Meeting #65, R1-111763, Barcelona, Spain, May 9-13, 2011, 17 Pages.

Alcatel-Lucent, Alcatel-Lucent Shanghai Bell "Further discussion of the codeword to layer mapping for 4-branch HSDPA", 3GPP TSG RAN WG1 Meeting #66bis, R1-114035, Zhuhai, China, Oct. 10-14, 2011, 2 Pages.

Ericsson "Layer Mapping for Four branch MIMO System", 3GPP TSG-RAN WG1 Meeting #69, R1-122813, Prague, Czech Republic, May 21-25, 2012, 5 Pages.

Ericsson "Data Bundling in a 2 codeword MIMO System", 3 GPP TSG-RAN WG1 Meeting #68, R1-120356, Dresden, Germany, Feb. 6-10, 2012, 9 Pages.

International Search Report, PCT/SE2013/050133, Apr. 12, 2013.

Ericsson: "Four Branch MIMO transmission for HSDPA (core part)"; 3GPP TSG-RAN Meeting #53, RP-111393; Fukuoka, Japan, Sep. 13-16, 2011, 3rd Generation Partnership Project; 6 pages.

Ericsson: "Four Branch MIMO transmission for HSDPA (feature part)"; 3GPP TSG-RAN Meeting #53, RP-111393; Fukuoka, Japan, Sep. 13-16, 2011, $3^{rd}$ Generation Partnership Project; 5 pages.

Ericsson: "Four Branch MIMO transmission for HSDPA (performance part)"; 3GPP TSG-RAN Meeting #53, RP-111393; Fukuoka, Japan, Sep. 13-16, 2011, 3rd Generation Partnership Project; 5 pages.

Ericsson: "4-branch MIMO for HSDPA"; 3GPP TSG RAN-WG1 Meeting #65, R1-111763; Barcelona, Spain, May 9-13, 2011; $3^{rd}$ Generation Partnership Project; 17 pages.

I. Emre Telatar, "Capacity of Multi-antenna Gaussian Channels", Lucent Technologies, Bell Laboratories, Murray Hill, NJ, Oct. 1995; *European Transactions on Telecommunications*, vol. 1, No. 6, pp. 585-595, Nov./Dec. 1999.

3GPP TS 25,308 V11.0.0 (Dec. 2011) High Speed Downlink Packet Access (HSDPA); Overall description; Stage 2 (Release 11); Dec. 2011.

3GPP TS 25.321 V11.0.0 (Dec. 2011) Medium Access Control (MAC) protocol specification; (Release 11); Dec. 2011.

I. Emre Telatar: "Capacity of Multi-antenna Gaussian Channels" Tech. Rep, 1995 :Bell Labs, Lucent Technologies, 28 pages.

International Preliminary Report on Patentability Corresponding to International Application No. PCT/SE2013/050133; Date of Mailing: Feb. 26, 2014; 14 Pages.

International Preliminary Report on Patentability Corresponding to International Application No. PCT/SE2013/050614; Date of Issuance: Dec. 16, 2014; 8 Pages.

IEEE Computer Society, "IEEE Standard for information Technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput", IEEE Std 801,11 n™ 2009, Oct. 29, 2009, 536 pp.

* cited by examiner

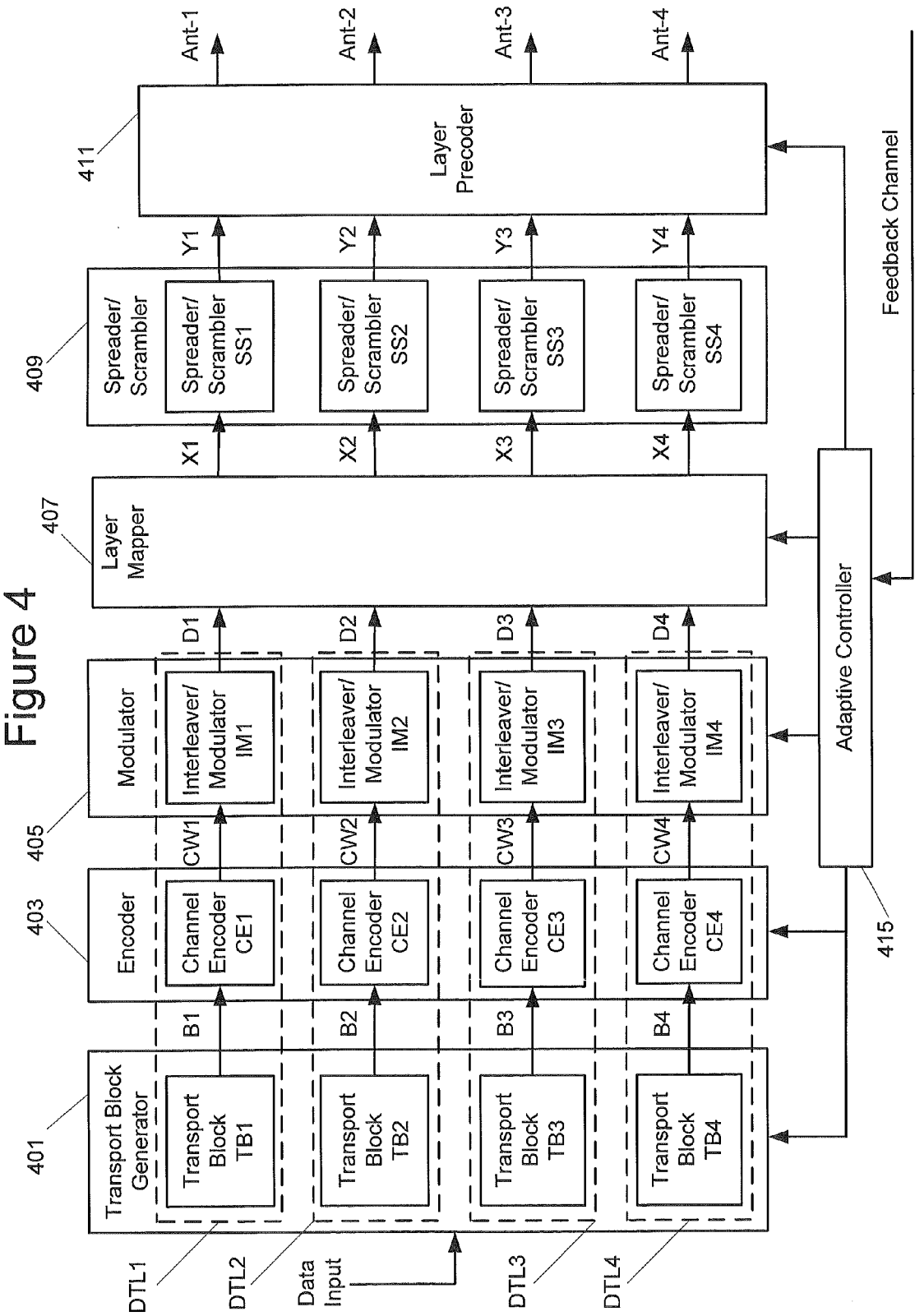

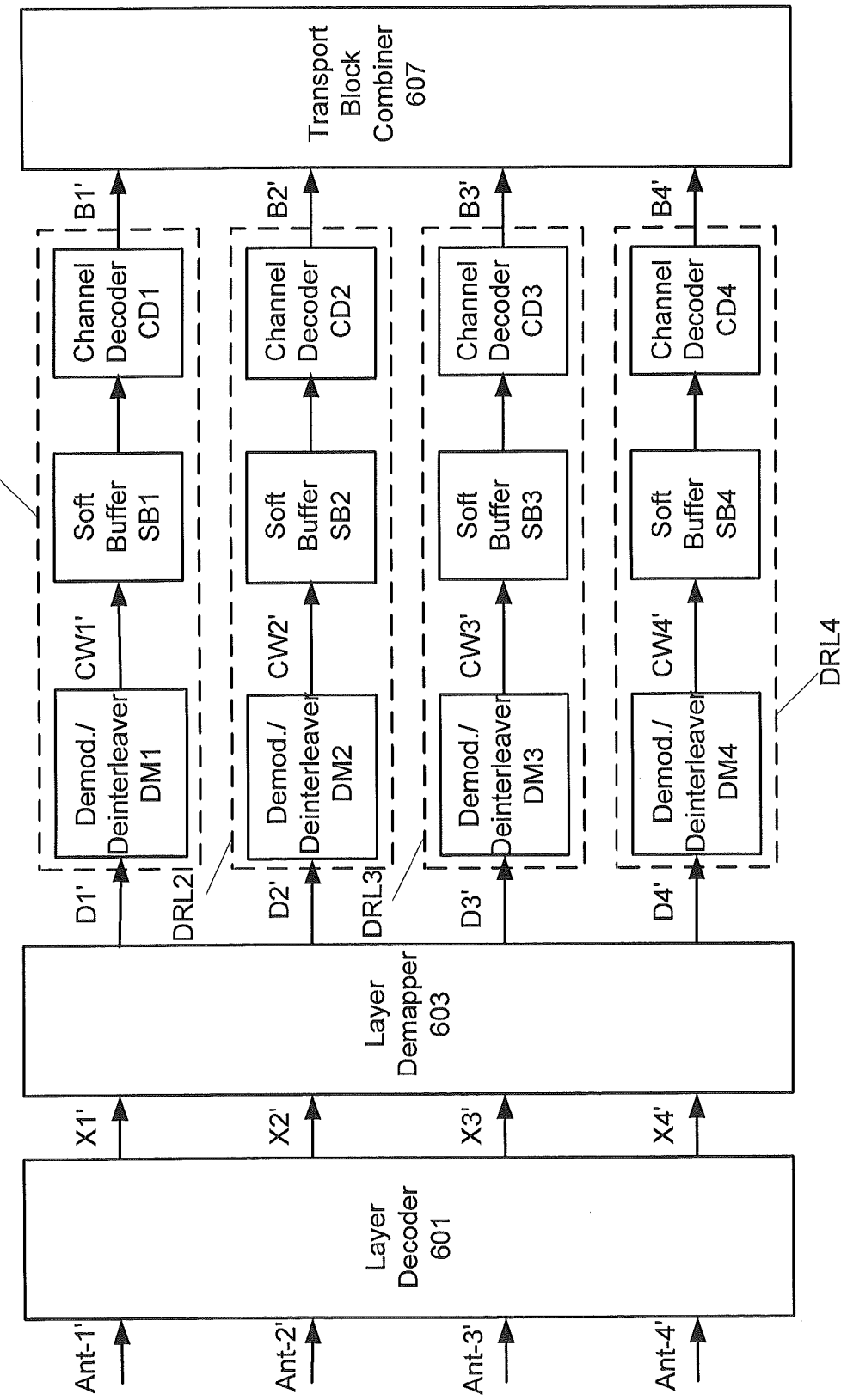

Figure 7

| Number of Streams | HARQ Process ID | |
|---|---|---|
| | HARQ-ID-1 | HARQ-ID-2 |
| 1 | HARQ-1 | N/A |
| 2 | HARQ-1 | HARQ-2 |
| 3 | HARQ-1 | HARQ-2 and HARQ-3 |
| 4 | HARQ-1 and HARQ-4 | HARQ-2 and HARQ-3 |

HARQ-ID Mapping Table

Figure 8

| Number of Streams | HARQ Process ID | |
|---|---|---|
| | HARQ-ID-1 | HARQ-ID-2 |
| 1 | Soft Buffer SB1 | N/A |
| 2 | Soft Buffer SB1 | Soft Buffer SB2 |
| 3 | Soft Buffer SB1 | Soft Buffers SB2 and SB3 |
| 4 | Soft Buffers SB1 and SB4 | Soft Buffers SB2 and SB3 |

Soft Buffer Mapping Table

Figure 9

| Number of Streams | HARQ Process Results | | | | HARQ ID Results | |
|---|---|---|---|---|---|---|
| | HARQ-1 | HARQ-2 | HARQ-3 | HARQ-4 | HARQ-ID-1 | HARQ-ID-2 |
| 1 | ACK | N/A | N/A | N/A | ACK | N/A |
| | NACK | N/A | N/A | N/A | NACK | N/A |
| 2 | ACK | ACK | N/A | N/A | ACK | ACK |
| | NACK | ACK | N/A | N/A | NACK | ACK |
| | ACK | NACK | N/A | N/A | ACK | NACK |
| | NACK | NACK | N/A | N/A | NACK | NACK |
| 3 | ACK | ACK | ACK | N/A | ACK | ACK |
| | NACK | ACK | ACK | N/A | NACK | ACK |
| | ACK | NACK | ACK | N/A | ACK | NACK |
| | NACK | NACK | ACK | N/A | NACK | NACK |
| | ACK | ACK | NACK | N/A | ACK | NACK |
| | NACK | ACK | NACK | N/A | NACK | NACK |
| | ACK | NACK | NACK | N/A | ACK | NACK |
| | NACK | NACK | NACK | N/A | NACK | NACK |
| 4 | ACK | ACK | ACK | ACK | ACK | ACK |
| | NACK | ACK | ACK | ACK | NACK | ACK |
| | ACK | NACK | ACK | ACK | ACK | NACK |
| | NACK | NACK | ACK | ACK | NACK | NACK |
| | ACK | ACK | NACK | ACK | ACK | NACK |
| | NACK | ACK | NACK | ACK | NACK | NACK |
| | ACK | NACK | NACK | ACK | ACK | NACK |
| | NACK | NACK | NACK | ACK | NACK | NACK |
| | ACK | ACK | ACK | NACK | NACK | ACK |
| | NACK | ACK | ACK | NACK | NACK | ACK |
| | ACK | NACK | ACK | NACK | NACK | NACK |
| | NACK | NACK | ACK | NACK | NACK | NACK |
| | ACK | ACK | NACK | NACK | NACK | NACK |
| | NACK | ACK | NACK | NACK | NACK | NACK |
| | ACK | NACK | NACK | NACK | NACK | NACK |
| | NACK | NACK | NACK | NACK | NACK | NACK |

ACK/NACK Mapping Table

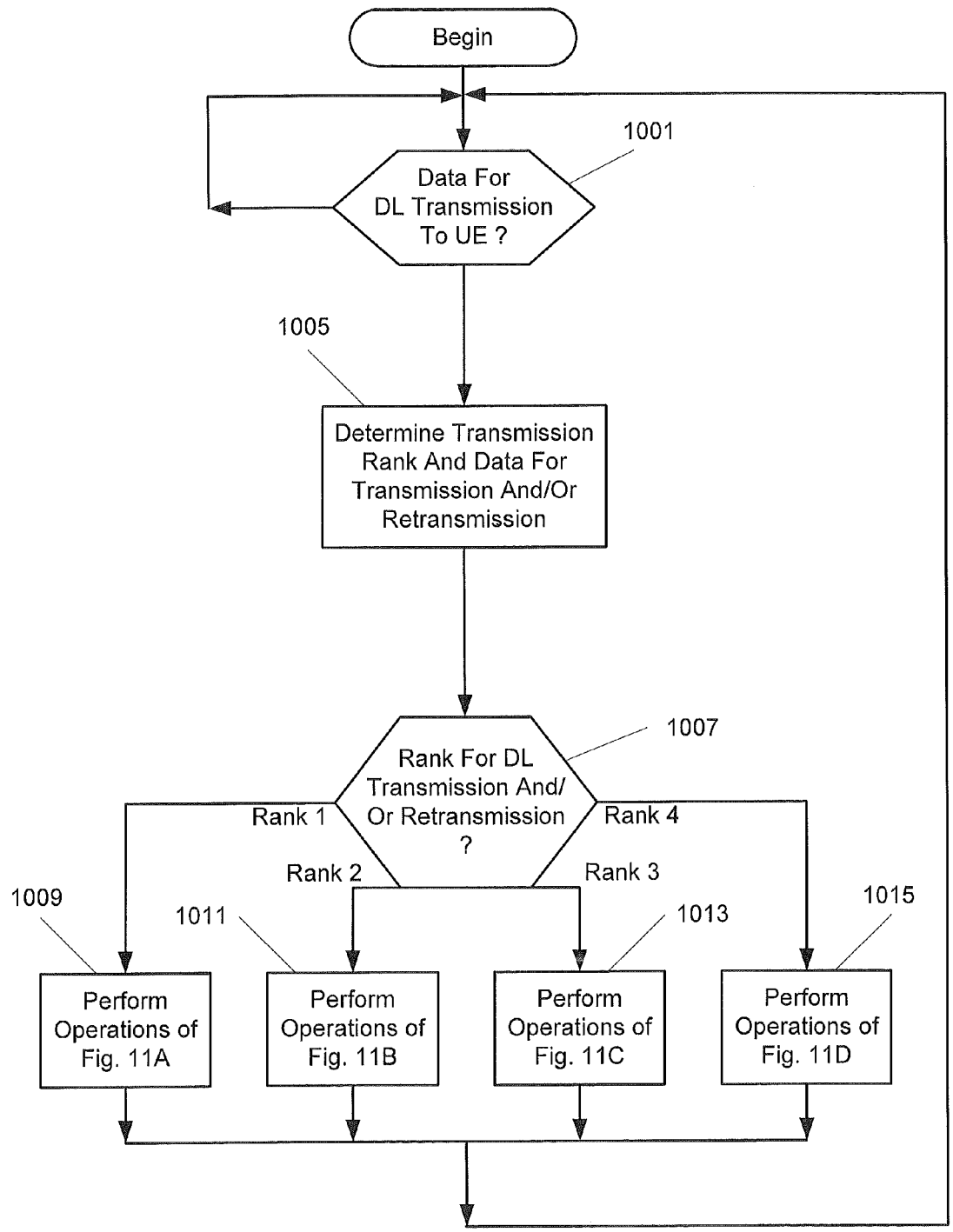

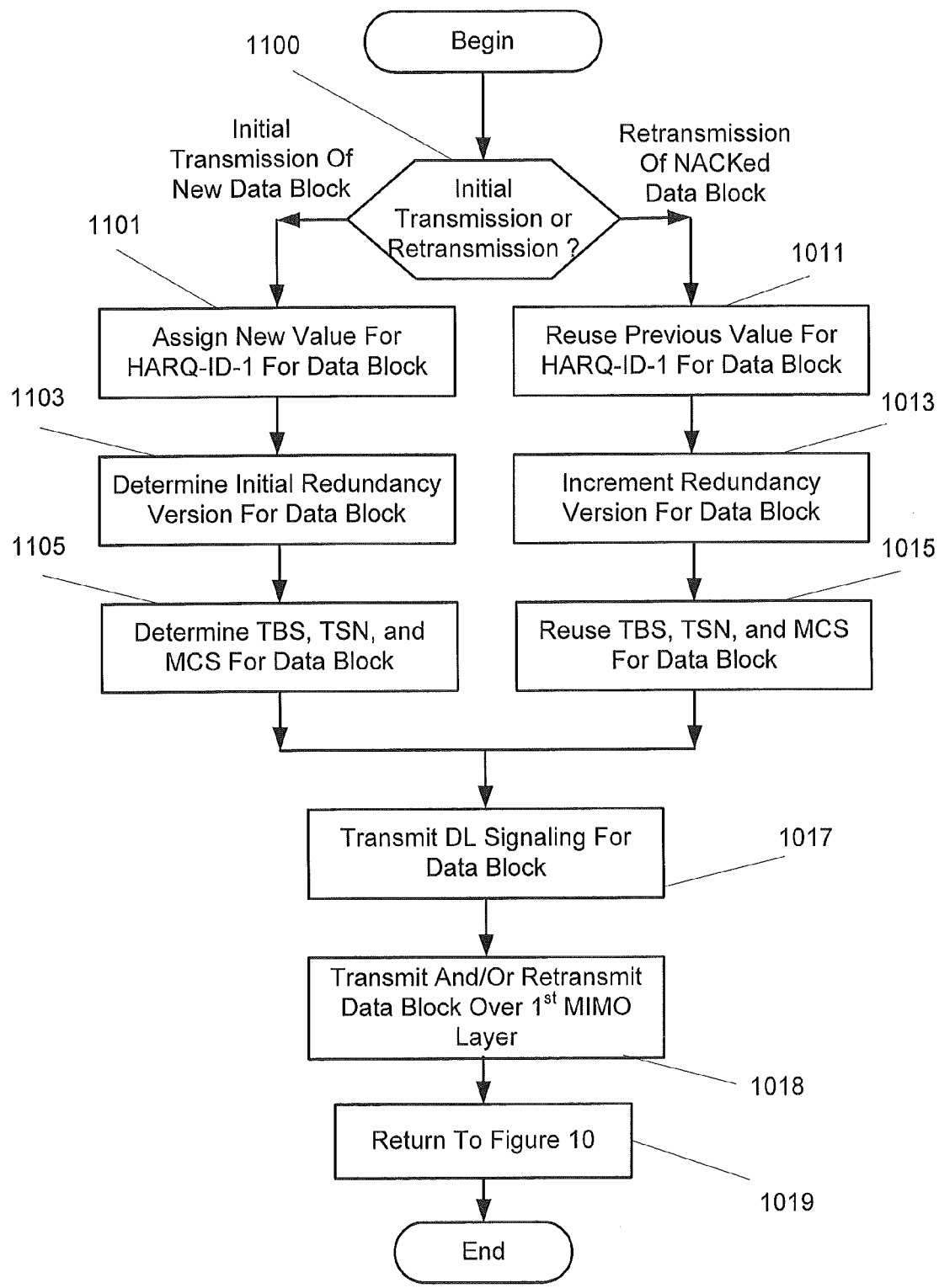

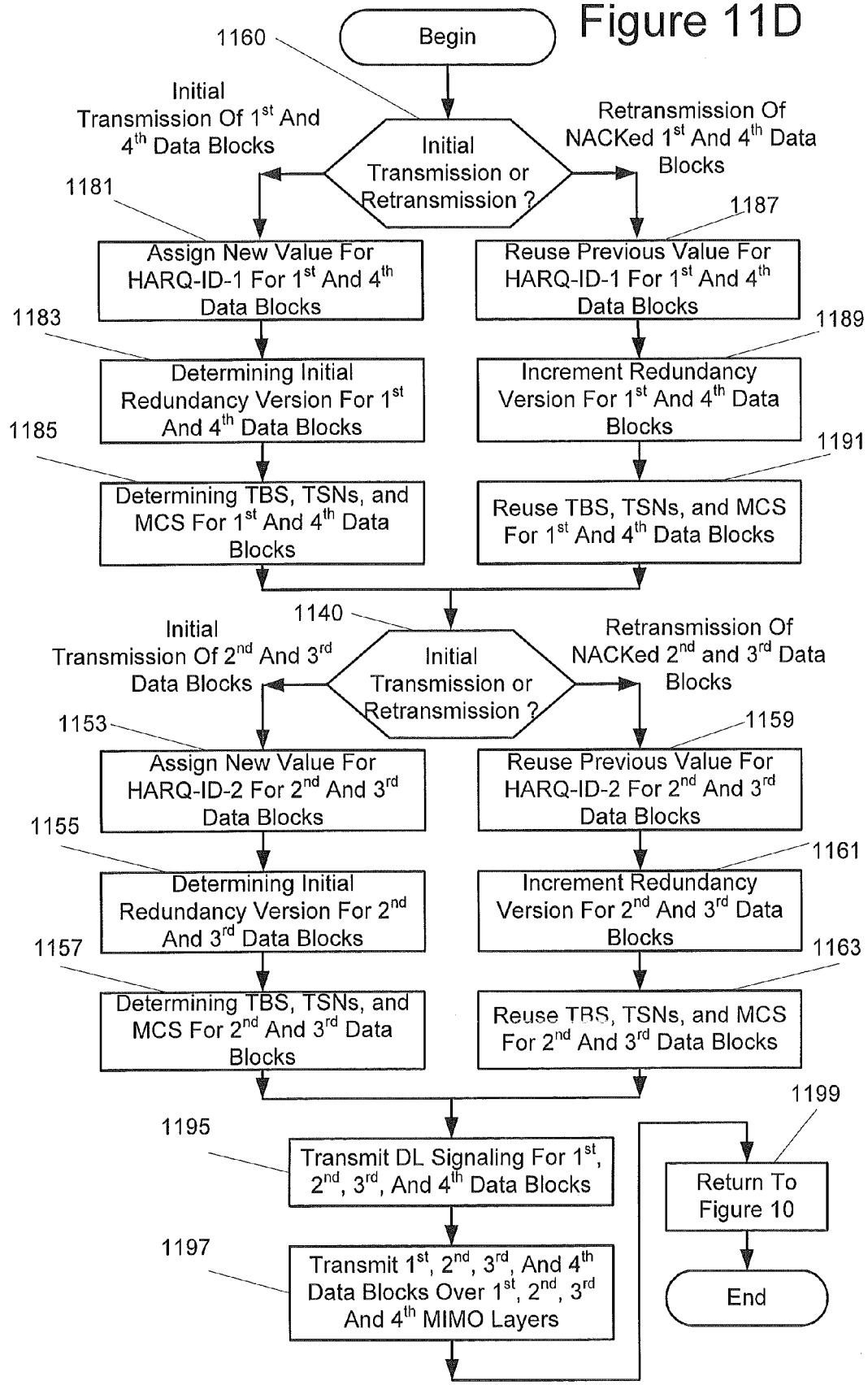

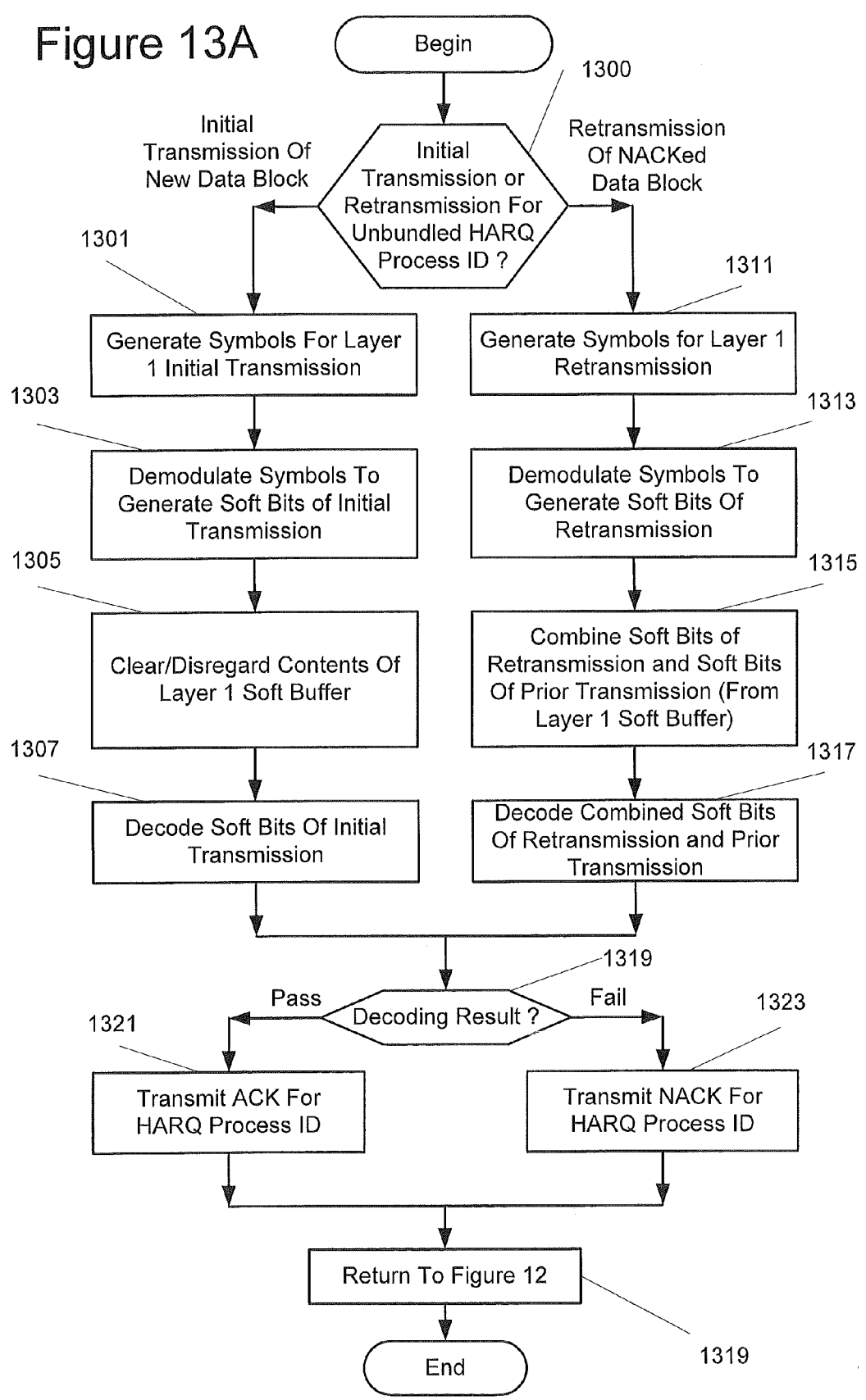

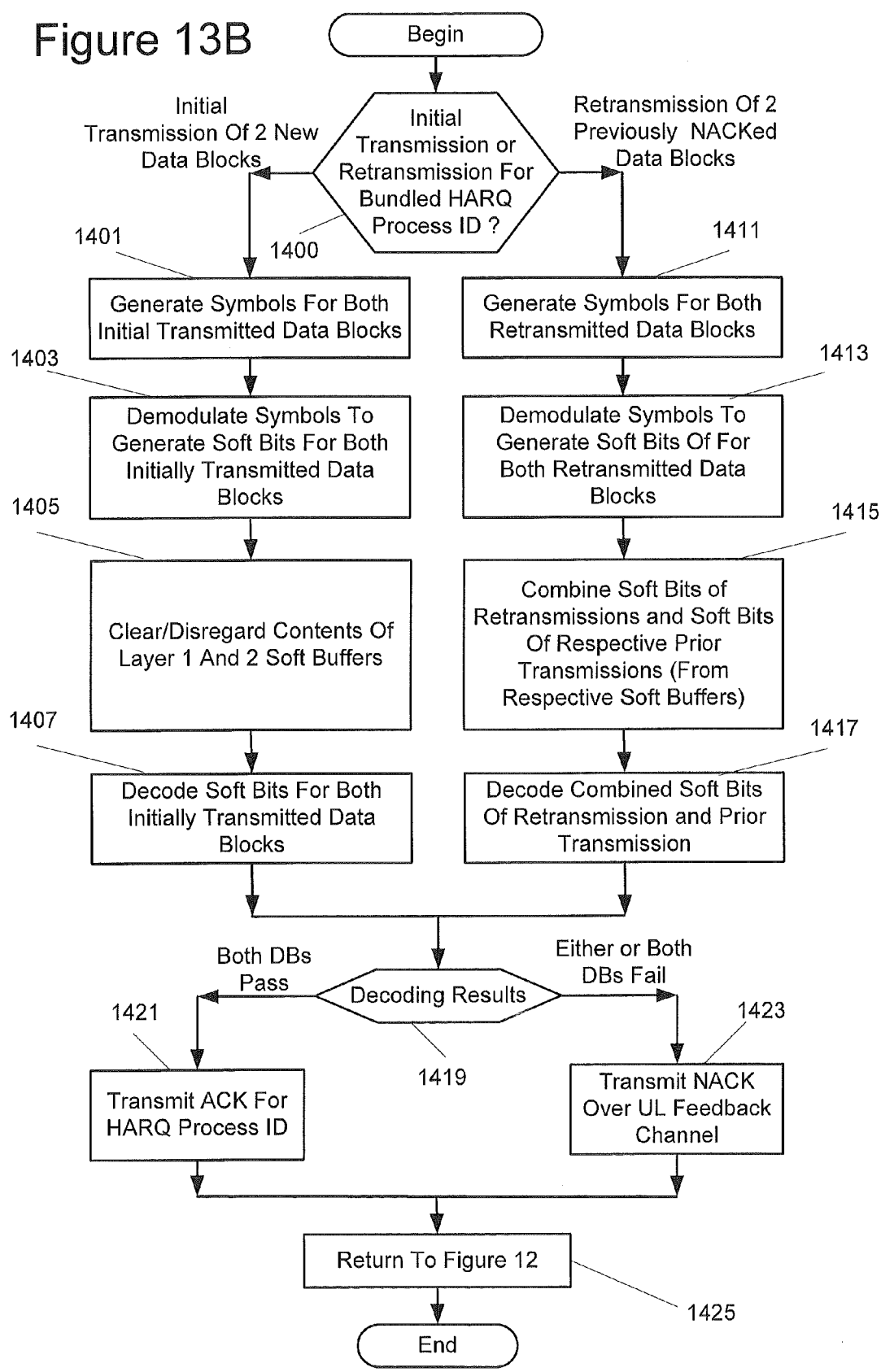

METHODS OF MAPPING RETRANSMISSIONS RESPONSIVE TO BUNDLED NACK MESSAGES AND RELATED DEVICES

CROSS REFERENCE TO RELATED APPLICATION

This application is a 35 U.S.C. §371 national stage application of PCT International Application No. PCT/SE2013/050614, filed in English on 29 May 2013, which claims priority to U.S. Provisional Application No. 61/659,793 filed on 14 Jun. 2012. The disclosures of all of the above referenced applications are hereby incorporated herein in their entireties by reference.

TECHNICAL FIELD

The present disclosure is directed to wireless communications and, more particularly, to multiple-input-multiple-output (MIMO) wireless communications and related network nodes and wireless terminals.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

Moreover, a cell area for a base station may be divided into a plurality of sectors surrounding the base station. For example, a base station may service three 120 degree sectors surrounding the base station, and the base station may provide a respective directional transceiver and sector antenna array for each sector. Stated in other words, a base station may include three directional sector antenna arrays servicing respective 120 degree base station sectors surrounding the base station.

Multi-antenna techniques can significantly increase capacity, data rates, and/or reliability of a wireless communication system as discussed, for example, by Telatar in "Capacity Of Multi-Antenna Gaussian Channels" (European Transactions On Telecommunications, Vol. 10, pp. 585-595, November 1999). Performance may be improved if both the transmitter and the receiver for a base station sector are equipped with multiple antennas (e.g., an sector antenna array) to provide a multiple-input multiple-output (MIMO) communication channel(s) for the base station sector. Such systems and/or related techniques are commonly referred to as MIMO. The LTE standard is currently evolving with enhanced MIMO support and MIMO antenna deployments. A spatial multiplexing mode is provided for relatively high data rates in more favorable channel conditions, and a transmit diversity mode is provided for relatively high reliability (at lower data rates) in less favorable channel conditions.

In a downlink from a base station transmitting from a sector antenna array over a MIMO channel to a wireless terminal in the sector, for example, spatial multiplexing (or SM) may allow the simultaneous transmission of multiple symbol streams over the same frequency from the base station sector antenna array for the sector. Stated in other words, multiple symbol streams may be transmitted from the base station sector antenna array for the sector to the wireless terminal over the same downlink transmission time interval (TTI) or time/frequency resource element (TFRE) to provide an increased data rate. In a downlink from the same base station sector transmitting from the same sector antenna array to the same wireless terminal, transmit diversity (e.g., using space-time codes) may allow the simultaneous transmission of the same symbol stream over the same frequency from different antennas of the base station sector antenna array. Stated in other words, the same symbol stream may be transmitted from different antennas of the base station sector antenna array to the wireless terminal over the same transmission time interval (TTI) time/frequency resource element (TFRE) to provide increased reliability of reception at the wireless terminal due to transmit diversity gain.

Four layer MIMO transmission schemes are proposed for High-Speed-Downlink-Packet-Access (HSDPA) within Third Generation Partnership Project (3GPP) standardization. Accordingly, up to 4 channel encoded transport data blocks (sometimes referred to as transport blocks, transport data blocks, transport data block codewords, etc.) may be transmitted using a same TTI/TFRE when using 4-branch MIMO transmission. Because ACK/NACK signaling and/or channel encoding for each transport data block to be transmitted during a same TTI/TFRE may require wireless terminal feedback (e.g., as ACK/NACK and/or CQI or channel quality information), feedback to define ACK/NACK and/or channel encoding for 4 transport data blocks may be required when using 4-branch MIMO transmission. Feedback signaling when using 4-branch MIMO transmission may thus be undesirably high, for example, because different MIMO layers may be received at a wireless terminal during a same TTI/TFRE with different qualities, signal strengths, error rates, etc.

SUMMARY

It may therefore be an object to address at least some of the above mentioned disadvantages and/or to improve performance in a wireless communication system. Some embodiments of present inventive concepts, for example, may provide HARQ process identification and/or ACK/NACK messages mapped to multiple downlink transmission/reception layers and/or elements thereof to reduce uplink and/or downlink signaling.

According some embodiments, a method of operating a node of a multiple-input-multiple-output (MIMO) radio access network may include transmitting a first hybrid automatic repeat request (HARQ) process identification and a second hybrid automatic repeat request process identification over a downlink signaling channel to a wireless terminal for a first MIMO transmission time interval (TTI). More particularly, the first HARQ process identification may be mapped to a first MIMO data transmission layer, and the second HARQ process identification may be mapped to second and third MIMO data transmission layers. First, second, and third data blocks may be transmitted over the first, second, and third MIMO data transmission layers, respectively, to the wireless terminal for the first MIMO transmission time interval. Responsive to receiving an acknowledgment (ACK) message associated with the first HARQ process identification from the wireless terminal, a fourth data block may be transmitted over the first MIMO data transmission layer to the wireless terminal for a second MIMO transmission time interval. Responsive to receiving a negative acknowledgment (NACK)

message associated with the second HARQ process identification from the wireless terminal, the second and third data blocks may be retransmitted over the second and third MIMO data transmission layers to the wireless terminal for the second MIMO transmission time interval.

By mapping a HARQ process identification and an associated HARQ ACK/NACK message to more than one MIMO transmission/reception layer downlink control signaling and/or uplink feedback signaling may be reduced.

Before transmitting the second hybrid automatic repeat request process identification, an initial redundancy version may be determined for the second and third data blocks. Before transmitting the second and third data blocks, the initial redundancy version for the second and third data blocks may be transmitted over the downlink signaling channel. Responsive to receiving the NACK message, a subsequent redundancy version may be determined for the second and third data blocks, with the initial and subsequent redundancy versions for the second and third data blocks being different. Responsive to receiving the NACK message and before retransmitting the second and third data blocks, the first hybrid automatic repeat request process identification and the subsequent redundancy version for the second and third data blocks may be transmitted over the downlink signaling channel to the wireless terminal for the second MIMO TTI.

Before transmitting the second hybrid automatic repeat request process identification for the first MIMO TTI, a transport block size and/or a modulation/coding scheme to be applied to the second and third data blocks may be determined. Before transmitting the second and third data blocks, the transport block size and/or the modulation/coding scheme for the second and third data blocks may be transmitted over the downlink signaling channel. More particularly, transmitting the second and third data blocks may include transmitting the second and third data blocks in accordance with the transport block size and/or the modulation/coding scheme.

Responsive to receiving an acknowledgment (ACK) message associated with the second HARQ process identification from the wireless terminal, fifth and sixth data blocks may be transmitted over the second and third MIMO data transmission layers to the wireless terminal for the second MIMO transmission time interval.

Before transmitting the first and second hybrid automatic repeat request process identifications, a first initial redundancy version may be determined for the first data block and a second initial redundancy version may be determined for the second and third data blocks. Before transmitting the first, second, and third data blocks, the first initial redundancy version for the first data block and the second initial redundancy version for the second and third data blocks may be transmitted over the downlink signaling channel. Responsive to receiving the ACK message associated with the first HARQ process identification, a third initial redundancy version may be determined for the fourth data block, and the first and third initial redundancy versions may be the same. Responsive to receiving the NACK message associated with the second HARQ process identification, a subsequent redundancy version may be determined for the second and third data blocks, and the second initial redundancy version and the subsequent redundancy version may be different. Responsive to receiving the ACK message associated with the first HARQ process identification and receiving the NACK message associated with the second HARQ process identification and before retransmitting the second and third data blocks, and before transmitting the fourth data block, the first and second hybrid automatic repeat request process identifications, the subsequent redundancy version for the second and third data blocks, and the third initial redundancy version for the fourth data block may be transmitted over the downlink signaling channel to the wireless terminal for the second MIMO TTI.

Before transmitting the first and second hybrid automatic repeat request process identifications for the first MIMO TTI, a first transport block size and/or a first modulation/coding scheme to be applied to the first data block may be determined and a second transport block size and/or a second modulation/coding scheme to be applied to the second and third data blocks may be determined. Before transmitting the first, second, and third data blocks, the first transport block size and/or the first modulation/coding scheme for the first data block may be transmitted over the downlink signaling channel. Before transmitting the first, second, and third data blocks, the second transport block size and/or the second modulation/coding scheme for the second and third data blocks may be transmitted over the downlink signaling channel. Moreover, transmitting the first data block may include transmitting the first data block in accordance with the first transport block size and/or the first modulation/coding scheme, and transmitting the second and third data blocks may include transmitting the second and third data blocks in accordance with the second transport block size and/or the second modulation/coding scheme.

Responsive to receiving a negative acknowledgment (NACK) message associated with the first HARQ process identification from the wireless terminal, the first data block is retransmitted over the first MIMO data transmission layer to the wireless terminal for the second MIMO transmission time interval.

The first HARQ process identification may be mapped to the first MIMO data transmission layer and to a fourth MIMO data transmission layer. In addition, a fifth data block may be transmitted over the fourth MIMO data transmission layer to the wireless terminal for the first MIMO transmission time interval. Responsive to receiving the ACK message associated with the first HARQ process identification from the wireless terminal, the fourth data block and a sixth data block may be transmitted over the third and fourth MIMO data transmission layers to the wireless terminal for the second MIMO transmission time interval.

Responsive to receiving a NACK message associated with the first HARQ process identification from the wireless terminal, the first and fourth data blocks may be retransmitted over the first and fourth MIMO data transmission layers to the wireless terminal for the second MIMO transmission time interval.

According to some other embodiments, a method of operating a wireless terminal in a multiple-input-multiple-output (MIMO) radio access network may include receiving a first hybrid automatic repeat request (HARQ) process identification and a second hybrid automatic repeat request process identification over a downlink signaling channel from a base station for a MIMO transmission time interval (TTI). More particularly, the first HARQ process identification may be mapped to a first MIMO data reception layer, and the second HARQ process identification may be mapped to second and third MIMO data reception layers. First, second, and third data blocks may be received over the first, second, and third MIMO data reception layers, respectively, from the base station for the MIMO transmission time interval. Responsive to successfully decoding the first data block, an ACK message associated with the first HARQ process identification may be transmitted to the base station. Responsive to failure decoding the second data block and/or failure decoding the third data block, a negative acknowledgment (NACK) message associated with the second HARQ process identification may be transmitted to the base station.

The MIMO transmission time interval may be a first MIMO transmission time interval, and retransmissions of the second and third data blocks may be received over the second and third MIMO data reception layers, respectively, for a second MIMO transmission time interval after transmitting the NACK message. After receiving the retransmissions, the second data block may be decoded using the transmission for the first MIMO transmission time interval and the retransmission for the second MIMO transmission time interval, and the third data block may be decoded using the transmission for the first MIMO transmission time interval and the retransmission for the second MIMO transmission time interval.

Responsive to successfully decoding the second and third data blocks, an acknowledgment (ACK) message associated with the second HARQ process identification may be transmitted to the base station.

Before the first transmission time interval, an initial redundancy version for the second and third data blocks may be received over the downlink signaling channel. After transmitting the NACK message and before the second transmission time interval, the second hybrid automatic repeat request process identification may be received over the downlink signaling channel from the base station for the second MIMO transmission time interval (TTI) wherein the second HARQ process identification is mapped to the second and third MIMO data reception layers. After transmitting the NACK message and before the second transmission time interval, a subsequent redundancy version for the second and third data blocks may be received over the downlink signaling channel, with the initial and subsequent redundancy versions being different.

Responsive to successfully decoding both of the second and third data blocks, an acknowledgment (ACK) message associated with the second HARQ process identification may be transmitted to the base station.

A first transport block size and a first modulation/coding scheme may be received over the downlink signaling channel, and a second transport block size and a second modulation/coding scheme may be received over the downlink signaling channel. Moreover, the first data block may be received in accordance with the first transport block size and the first modulation/coding scheme, and the second and third data blocks may be received in accordance with the second transport block size and the second modulation/coding scheme.

Responsive to failure decoding the first data block, a NACK message associated with the first HARQ process identification may be transmitted to the base station.

The first HARQ process identification may be mapped to the first MIMO data reception layer and to a fourth MIMO data reception layers, and a fourth data block may be received over the fourth MIMO data reception layer from the base station for the MIMO transmission time interval. Moreover, transmitting the ACK message may include transmitting the ACK messages associated with the first HARQ process identification to the base station responsive to successfully decoding both of the first and fourth data blocks.

A first transport block size and a first modulation/coding scheme may be received over the downlink signaling channel, and a second transport block size and a second modulation/coding scheme may be received over the downlink signaling channel. Moreover, the first and fourth data blocks may be received in accordance with the first transport block size and the first modulation/coding scheme, and the second and third data blocks may be received in accordance with the second transport block size and the second modulation/coding scheme.

Responsive to failure decoding the first data block and/or failure decoding the fourth data block, a NACK message associated with the first HARQ process identification may be transmitted to the base station.

A transport block size and a modulation/coding scheme may be received over the downlink signaling channel, and the second and third data blocks may be received in accordance with the transport block size and the modulation/coding scheme.

According to still other embodiments, a node of a multiple-input-multiple-output (MIMO) radio access network may include a transceiver configured to provide communications over a wireless channel with a wireless terminal, and a processor coupled with the transceiver. The processor may be configured to transmit a first hybrid automatic repeat request (HARQ) process identification and a second hybrid automatic repeat request process identification through the transceiver over a downlink signaling channel to a wireless terminal for a first MIMO transmission time interval (TTI), wherein the first HARQ process identification is mapped to a first MIMO data transmission layer and the second HARQ process identification is mapped to second and third MIMO data transmission layers. The processor may be further configured to transmit first, second, and third data blocks through the transceiver over the first, second, and third MIMO data transmission layers, respectively, to the wireless terminal for the first MIMO transmission time interval. In addition, the processor may be configured to transmit a fourth data block through the transceiver over the first MIMO data transmission layer to the wireless terminal for a second MIMO transmission time interval responsive to receiving an acknowledgment (ACK) message associated with the first HARQ process identification from the wireless terminal. The processor may also be configured to retransmit the second and third data blocks through the transceiver over the second and third MIMO data transmission layers to the wireless terminal for the second MIMO transmission time interval responsive to receiving a negative acknowledgment (NACK) message associated with the second HARQ process identification from the wireless terminal.

According to yet other embodiments, a wireless terminal may be configured for operation in a multiple-input-multiple-output (MIMO) radio access network, and the wireless terminal may include a transceiver configured to provide communications over a wireless channel with the radio access network, and a processor coupled with the transceiver. The processor may be configured to receive a first hybrid automatic repeat request (HARQ) process identification and a second hybrid automatic repeat request process identification over a downlink signaling channel from a base station through the transceiver for a MIMO transmission time interval (TTI). Moreover, the first HARQ process identification may be mapped to a first MIMO data reception layer, and the second HARQ process identification may be mapped to second and third MIMO data reception layers. The processor may be further configured to receive first, second, and third data blocks through the transceiver over the first, second, and third MIMO data reception layers, respectively, from the base station for the MIMO transmission time interval. In addition, the processor may transmit an ACK message associated with the first HARQ process identification through the transceiver to the base station responsive to successfully decoding the first data block. The processor may also be configured to transmit a negative acknowledgment (NACK) message associated with the second HARQ process identification through the transceiver to the base station responsive to failure decoding the second data block and/or failure decoding the third data block.

According to some other embodiments of present inventive concepts, a method may be provided to operate a node of a MIMO radio access network, the method comprising: transmitting a HARQ process identification over a downlink signaling channel to a wireless terminal for a first MIMO transmission time interval, wherein the HARQ process identification is mapped to first and second MIMO data transmission layers; transmitting first and second data transport blocks over the first and second MIMO data transmission layers to the wireless terminal for the first MIMO transmission time interval; responsive to receiving an ACK message associated with the HARQ process identification from the wireless terminal, transmitting third and fourth data transport blocks over the first and second MIMO data transmission layers to the wireless terminal for a second MIMO transmission time interval; and responsive to receiving a NACK message associated with the HARQ process identification from the wireless terminal, retransmitting the first and second data transport blocks over the first and second MIMO data transmission layers to the wireless terminal for the second MIMO transmission time interval.

The HARQ process identification may be a first HARQ process identification, with the method further comprising: transmitting a second HARQ process identification over the downlink signaling channel to a wireless terminal for the first MIMO transmission time interval, wherein the first HARQ process identification is mapped to a third MIMO data transmission layer; transmitting a fifth data transport block over the third MIMO data transmission layer to the wireless terminal for the first MIMO transmission time interval; responsive to receiving an ACK message associated with the second HARQ process identification from the wireless terminal, transmitting a sixth data transport block over the third MIMO data transmission layer to the wireless terminal for the second MIMO transmission time interval; and responsive to receiving a NACK message associated with the second HARQ process identification from the wireless terminal, retransmitting the fifth data transport block over the third MIMO data transmission layer to the wireless terminal for the second MIMO transmission time interval.

The HARQ process identification may be a first HARQ process identification, with the method further comprising: transmitting a second HARQ process identification over the downlink signaling channel to the wireless terminal for the first MIMO transmission time interval, wherein the second HARQ process identification is mapped to third and fourth MIMO data transmission layers; transmitting fifth and sixth data transport blocks over the third and fourth MIMO data transmission layers to the wireless terminal for the first MIMO transmission time interval; responsive to receiving an ACK message associated with the second HARQ process identification from the wireless terminal, transmitting seventh and eighth data transport blocks over the third and fourth MIMO data transmission layers to the wireless terminal for the second MIMO transmission time interval; and responsive to receiving a NACK message associated with the HARQ process identification from the wireless terminal, retransmitting the fifth and sixth data transport blocks over the third and fourth MIMO data transmission layers to the wireless terminal for the second MIMO transmission time interval.

According to some embodiments of present inventive concepts, a method may be provided to operate a wireless terminal in a MIMO radio access network, the method comprising: receiving a HARQ process identification over a downlink signaling channel from a base station for a MIMO transmission time interval, wherein the HARQ process identification is mapped to first and second MIMO data reception layers; receiving first and second data transport blocks over the first and second MIMO data reception layers from the base station for the MIMO transmission time interval; responsive to successfully decoding both of the first and second data transport blocks, transmitting an ACK message associated with the HARQ process identification to the base station; and responsive to failure decoding the first data transport block and/or failure decoding the second data transport block, transmitting a NACK message associated with the HARQ process identification to the base station.

The MIMO transmission time interval may be a first MIMO transmission time interval, and the method may further comprise: receiving retransmissions of the first and second data transport blocks for a second MIMO transmission time interval responsive to transmitting the NACK message; and after receiving the retransmissions, decoding the first data transport block using the transmission for the first MIMO transmission time interval and the retransmission for the second MIMO transmission time interval; and after receiving the retransmissions, decoding the second data transport block using the transmission for the first MIMO transmission time interval and the retransmission for the second MIMO transmission time interval.

The HARQ process identification may be a first HARQ process identification, the method further comprising: receiving a second HARQ process identification over the downlink signaling channel from the base station for the MIMO transmission time interval, wherein the second HARQ process identification is mapped to a third MIMO data reception layer; receiving a third data transport block over the third MIMO data reception layer from the base station for the MIMO transmission time interval; responsive to successfully decoding the third data transport block, transmitting an ACK message associated with the second HARQ process identification to the base station; and responsive to failure decoding the third data transport block, transmitting a NACK message associated with the second HARQ process identification to the base station.

The HARQ process identification may be a first HARQ process identification, the method further comprising: receiving a second HARQ process identification over the downlink signaling channel from the base station for the MIMO transmission time interval, wherein the second HARQ process identification is mapped to third and fourth MIMO data reception layers; receiving third and fourth data transport blocks over the third and fourth MIMO data reception layers from the base station for the MIMO transmission time interval; responsive to successfully decoding both of the third and fourth data transport blocks, transmitting an ACK message associated with the second HARQ process identification to the base station; and responsive to failure decoding the third data transport block and/or failure decoding the fourth data transport block, transmitting a NACK message associated with the second HARQ process identification to the base station.

BRIEF DESCRIPTION OF THE DRAWINGS

The accompanying drawings, which are included to provide a further understanding of the disclosure and are incorporated in and constitute a part of this application, illustrate certain non-limiting embodiment(s) of present inventive concepts. In the drawings:

FIG. 4 is a block diagram illustrating elements/functionalities of base station processors according to some embodiments of FIG. 2;

FIG. 5 is a block diagram illustrating elements/functionalities of wireless terminal processors according to some embodiments of FIG. 2;

FIG. 7 is a table illustrating mappings of HARQ process identifications according to some embodiments;

FIG. 8 is a table illustrating mappings of soft buffers according to some embodiments;

FIG. 9 is a table illustrating HARQ process and HARQ identification results according to some embodiments;

FIGS. 10, 11A, 11B, 11C, and 11D are flow charts illustrating operations of radio access network nodes according to some embodiments; and FIGS. 12, 13A, and 13B are flow charts illustrating operations of wireless terminals according to some embodiments.

DETAILED DESCRIPTION

Figure 1:
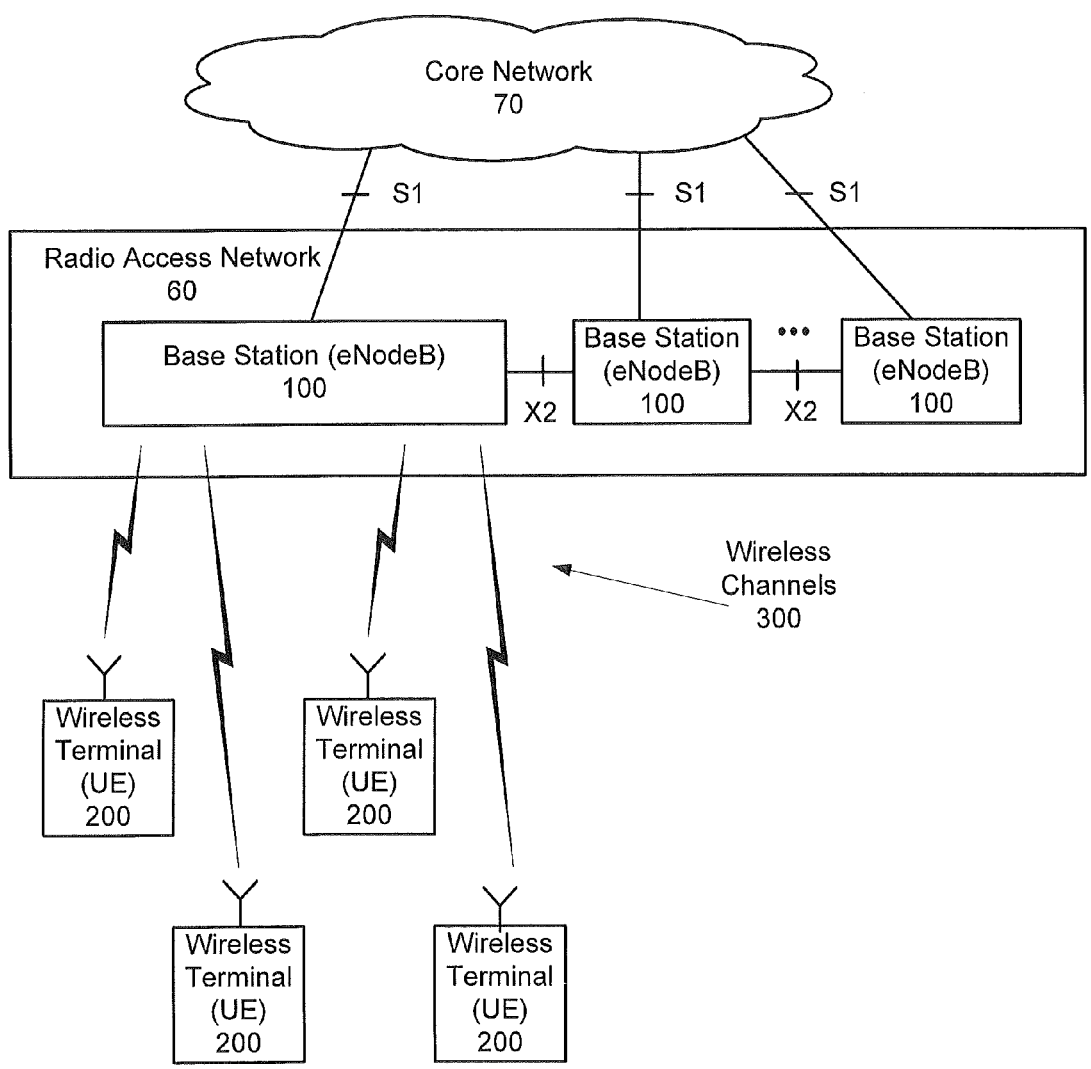
FIG. 1 is a block diagram of a communication system that is configured according to some embodiments.

Inventive concepts will now be described more fully hereinafter with reference to the accompanying drawings, in which examples of embodiments of inventive concepts are shown. Present inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

For purposes of illustration and explanation only, these and other embodiments of present inventive concepts are described herein in the context of operating in a RAN that communicates over radio communication channels with wireless terminals (also referred to as UEs). It will be understood, however, that present inventive concepts are not limited to such embodiments and may be embodied generally in any type of communication network. As used herein, a wireless terminal (also referred to as a UE) can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controller is typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of inventive concepts, this should not be seen as limiting the scope of inventive concepts to only these systems. Other wireless systems, including LTE (Long Term Evolution), LTE-A (LTE-Advanced), WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station (also referred to as eNodeB or Evolved Node B) and wireless terminal (also referred to as UE or User Equipment) should be considered non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel. While embodiments discussed herein may focus on wireless transmissions in a downlink from an eNodeB to a UE, embodiments of present inventive concepts may also be applied, for example, in the uplink.

As noted above, four layer MIMO downlink transmissions have been proposed within 3GPP standardization for HSDPA. One issue with four branch MIMO systems is the number of HARQ codewords/processes that should be supported. To reduce signaling in the uplink and/or in the downlink, two HARQ processes may be used with four MIMO downlink transmission layers. Systems using two HARQ codewords/processes to support four downlink transmission layers may provide performance that is almost/substantially the same as performance of systems using four HARQ codewords/processes to support four downlink transmission layers. Systems using two HARQ codewords/processes, however, may be relatively easier to implement and/or define according to 3GPP standards. In a two HARQ codeword/process MIMO system with four antennas providing up to four downlink transmission streams, mechanisms may thus be needed to map HARQ codewords/processes in the HARQ block entity at the base station (e.g., a Universal Terrestrial Radio Access Network or UTRAN base station), because in a two HARQ codeword MIMO system, the downlink control channel may only provide two HARQ process identifications or IDs corresponding to the two HARQ codewords. Similarly, mechanisms may be needed to map HARQ processes in a HARQ block at the wireless terminal or UE side.

According to some embodiments of present inventive concepts, HARQ functionality may be implemented at a RAN base station(s) when a number of HARQ codewords is less than a number of downlink MIMO transmission layers supported by the system. According to some other embodiments of present inventive concepts, HARQ functionality may be implemented as a wireless terminal or UE when a number of HARQ processes is less than a number of data transmission/reception layers supported by the system.

FIG. 1 is a block diagram of a communication system that is configured to operate according to some embodiments of present inventive concepts. An example RAN 60 is shown that may be a Long Term Evolution (LTE) RAN. Radio base stations (e.g., eNodeBs) 100 may be connected directly to one or more core networks 70, and/or radio base stations 100 may be coupled to core networks 70 through one or more radio network controllers (RNCs). In some embodiments, functionality of a radio network controller(s) may be performed by radio base stations 100. Radio base stations 100 communicate over wireless channels 300 with wireless terminals (also referred to as user equipment nodes or UEs) 200 that are within their respective communication service cells (also referred to as coverage areas). The radio base stations 100 can communicate with one another through an X2 interface and with the core network(s) 70 through S1 interfaces, as is well known to one who is skilled in the art.

Figure 2:
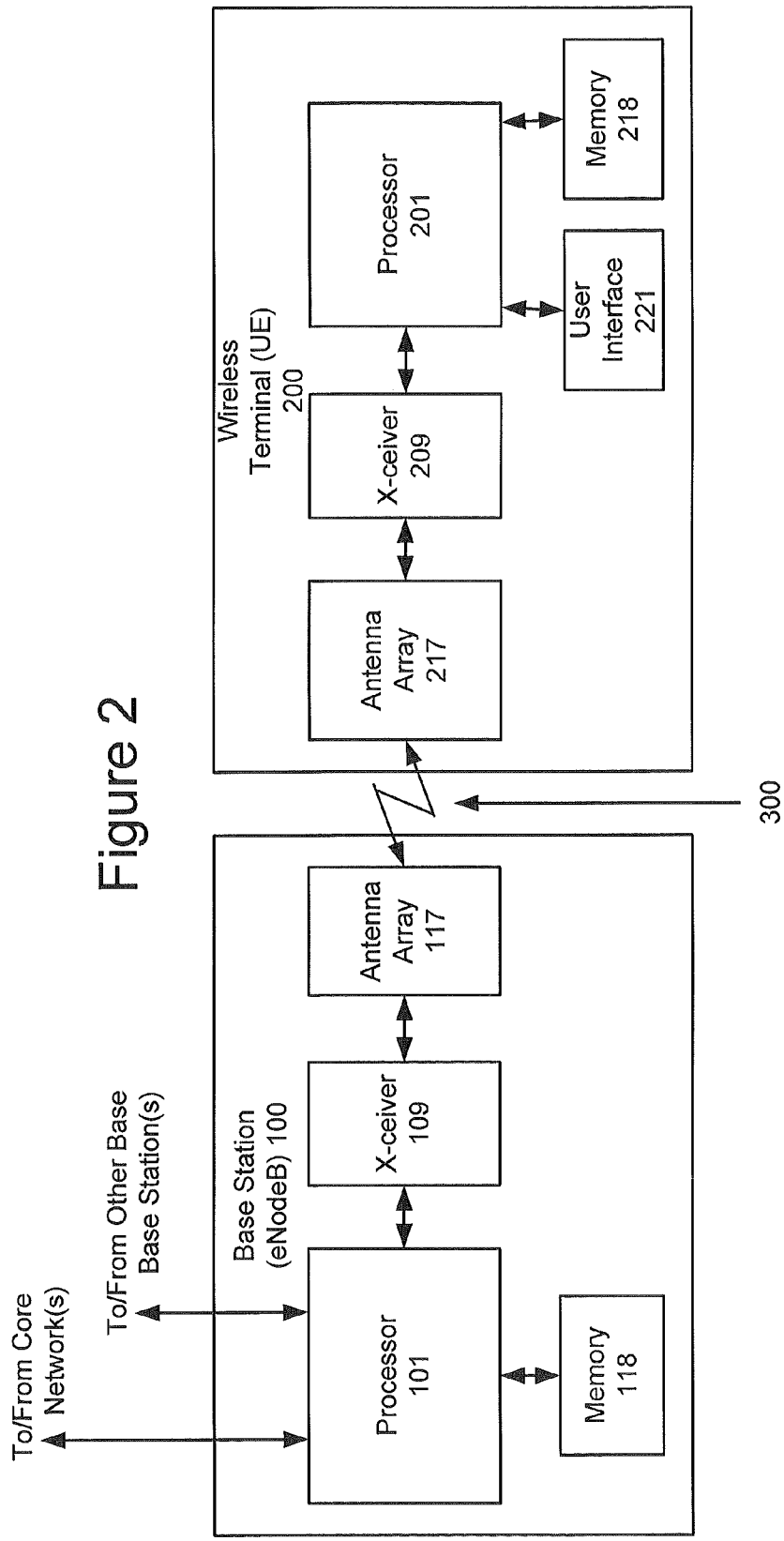
FIG. 2 is a block diagram illustrating a base station and a wireless terminal according to some embodiments of FIG. 1.

FIG. 2 is a block diagram of a base station 100 and a wireless terminal 200 of FIG. 1 in communication over wireless channel 300 according to some embodiments of present inventive concepts. As shown, base station 100 may include transceiver 109 coupled between processor 101 and antenna array 117 (including multiple antennas), and memory 118 coupled to processor 101. Moreover, wireless terminal 200 may include transceiver 209 coupled between antenna array 217 and processor 201, and user interface 221 and memory 218 may be coupled to processor 201. Accordingly, base station processor 101 may transmit communications through transceiver 109 and antenna array 117 for reception at wireless terminal processor 201 through antenna array 217 and transceiver 209. In the other direction, wireless terminal processor 201 may transmit communications through transceiver 209 and antenna array 217 for reception at base station processor 101 through antenna array 117 and transceiver 109. To support up to 4-branch MIMO (allowing parallel transmission of up to 4 downlink layers/streams of data using a same TTI/TFRE), each of antenna arrays 117 and 217 may include four (or more) antenna elements. Wireless terminal 200 of FIG. 2, for example, may be a cellular radiotelephone, a smart phone, a laptop/netbook/tablet/handheld computer, or any other device providing wireless communications. User interface 211, for example, may include a visual display such as an liquid crystal display, a touch sensitive visual display, a keypad, a speaker, a microphone, etc.

For MIMO downlink transmissions from RAN 60 to wireless terminal 200, a codebook of precoding vectors (known at both RAN 60 and wireless terminal 200) is used to precode (e.g., to apply precoding weights to) the different data layers (data streams) that are transmitted in parallel from a sector antenna array(s) to the wireless terminal 200 during a same TTI/TFRE, and to decode the data layers (data streams) received in parallel during the same TTI/TFRE at wireless terminal 200. The same codebook of precoding vectors may be stored in wireless terminal memory 218 and in base station memory 118. Moreover, wireless terminal 200 may estimate characteristics of each downlink channel to generate channel quality information (CQI), and CQI feedback from wireless terminal 200 may be transmitted to base station 100. This CQI feedback may then be used by the base station processor 101 to select: transmission rank (i.e., a number of data layers/streams to be transmitted during a subsequent TTITFRE); transport data block length(s); channel code rate(s) to be used to channel encode different transport data blocks and modulation order(s) (collectively referred to as modulation and coding schemes or MCSs); symbol to layer mapping schemes; and/or precoding vectors for respective downlink transmissions to the wireless terminal 200.

By way of example, base station antenna array 117 may include 4 antennas and wireless terminal antenna array 217 may include four antennas so that wireless terminal 200 may receive up to four downlink data layers (data streams) from base station antenna array 117 during MIMO communications. In this example, the precoding codebook may include rank 1 precoding vectors (used when transmitting one downlink data stream from a base station sector antenna array 117 to wireless terminal 200), rank 2 precoding vectors (used when transmitting two downlink data streams from a base station sector antenna array 117 to wireless terminal 200), rank 3 precoding vectors (used when transmitting three downlink data streams from a base station sector antenna array 117 to wireless terminal 200), and rank 4 precoding vectors (used when transmitting four downlink data streams from a base station sector antenna array 117 to wireless terminal 200). Precoding vectors may also be referred to, for example, as precoding codebook entries, precoding codewords, and/or precoding matrices.

An issue for four layer MIMO transmission schemes for HSDPA is the number of HARQ (Hybrid Automatic Repeat Request) codewords/processes that should be supported. To reduce uplink and/or downlink signaling, two HARQ codewords/processes may be used in four layer MIMO transmission schemes for feedback relating to one, two, three, and four layer downlink transmissions. Use of two HARQ codewords/processes may be relatively easier to implement without significantly reducing performance (relative to use of four HARQ codewords/processes).

A Hybrid Automatic Repeat Request (HARQ) process(es) may be used in a wireless system to overcome transmission errors that cannot be corrected using a forward error correction code (also referred to as a channel code) alone. In some embodiments of a HARQ process, the HARQ process is mapped to one or more MIMO transmission layers, and the transmitting device (e.g., base station 100) attaches an error detection/correction code (e.g., a cyclic redundancy check or CRC code) to each transport data block (also referred to as a data block, data packet, packet, etc.) of a TTI/TFRE to provide error detection/correction, and the resulting data block including the error detection/correction code may be referred to as a data codeword CW. At the receiving device (e.g., at wireless terminal 200), the contents of each received transport data block may be validated using the respective error detection/correction code attached thereto. If the transport data block fails the error detection/correction validation, the receiving device (e.g., wireless terminal 200) may send a HARQ codeword including a negative acknowledgement NACK message (also referred to as a non-acknowledgement message) for the HARQ process back to the transmitting device (e.g., base station 100) to request a retransmission of the failed transport data block or blocks mapped to the HARQ process. A failed data block may be retransmitted until it is either decoded or until a maximum number of allowed retransmissions (e.g., four to six retransmissions) have occurred. If the transport data block passes the error detection/correction validation, a HARQ codeword including an acknowledgement ACK message for the HARQ process is sent back to the transmitting device to acknowledge reception and correct decoding of the transport data block. A HARQ process may thus be mapped to one or more MIMO transmission layers, and for each TTI/TFRE, the HARQ process may generate a HARQ ACK/NACK feedback message that is transmitted in a HARQ codeword of the feedback channel (e.g., HS-PDCCH).

As discussed in greater detail below, a wireless terminal 200 implementing HARQ functionality may include a soft buffer for each transport data block received during a TTI/TFRE so that originally transmitted and retransmitted transport data blocks may be combined before decoding to thereby improve system throughput. Depending on the way the originally transmitted and retransmitted transport data blocks are combined, HARQ systems/processes may be classified as chase combining or CC (retransmitting the same transport data block without additional information) or Incremental Redundancy or IR (transmitting the same transport data block with additional parity bits).

A single soft buffer may be used for layer/rank one MIMO transmission/reception (with one transport data block received during a TTI/TFRE), two soft buffers may be used for layer/rank two MIMO transmission/reception (with two transport data blocks received during a TTI/TFRE), three soft buffers may be used for layer/rank three MIMO transmission/reception (with three transport data blocks received during a TTI/TFRE), and four soft buffers may be used for layer/rank four MIMO transmission/reception (with four transport data blocks received during a TTI/TFRE). Each soft buffer stores a demodulator output for a transport data block before decoding to be used after a retransmission if the transport data block is not successfully decoded. For Release 7 MIMO supporting up to two rank/layer transmissions (with up to two transport data blocks transmitted to a UE during a TTI/TFRE), a HARQ process is provided for each soft buffer and thus for each transport data block. When two HARQ processes are mapped to three or four layer/rank MIMO transmission/reception, however, a mechanism to map UE receiver soft buffers to HARQ processes may be needed.

According to some embodiments discussed herein, methods may be provided to map functionalities between base station 100 transmission layers, wireless terminal 200 receiver layers (including respective soft buffers), and HARQ processes for situations when the number of supported HARQ processes is less than a number of MIMO transmission/reception layers/ranks supported by the system (e.g., when rank/layer 3 and/or 4 MIMO transmissions are supported but only two HARQ processes are supported). With two HARQ processes, both HARQ ACK/NACK messages may be included in a HARQ codeword of the feedback channel (e.g., HS-DPCCH).

Figure 3A:
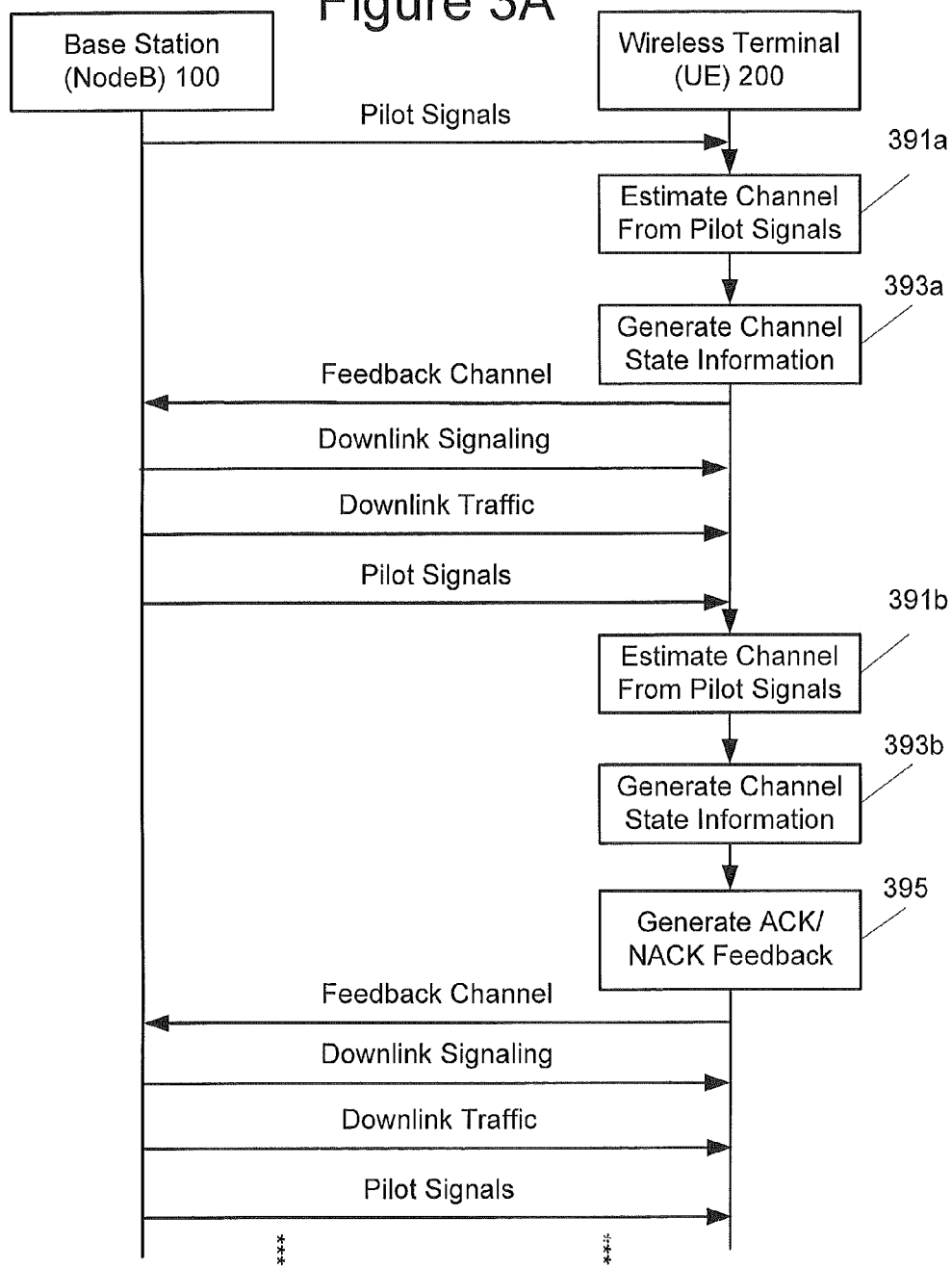
FIG. 3A is a message sequence chart for a MIMO communication system.

FIG. 3A illustrates a message sequence between base station 100 and wireless terminal 200 in an HSDPA MIMO communications system. As shown in FIG. 3A, base station 100 transmits pilot signals over the downlink channel(s), and wireless terminal 200 estimates the downlink channel(s) at block 391a (for transmissions from base station 100 to wireless terminal 200) based on the pilot signals. Wireless terminal 200 generates (e.g., computes) channel state information at block 393a for the downlink channel(s), and wireless terminal 200 reports the channel state information to base station 100 over a feedback channel. Base station 100 uses the channel state information to choose transmission characteristics (e.g., a transmission rank, a precoding vector, a modulation and coding scheme, etc.) for a next downlink TTI and/or TFRE, and base station 100 transmits these transmission characteristics over a downlink signaling channel to wireless terminal 200. Base station 100 transmits downlink data over a downlink traffic channel in accordance with the chosen transmission characteristics, and base station 100 also continues transmitting pilot signals. Wireless terminal receives the transmission characteristics, the pilot signals, and the downlink data. Wireless terminal 200 estimates the current downlink channel(s) at block 391b (for transmissions from base station 100 to wireless terminal 200) based on the pilot signals; wireless terminal 200 generates (e.g., computes) channel state information at block 393b for the current downlink channel(s); and wireless terminal 200 generates ACK/NACK feedback 395 responsive to the received downlink data. Wireless terminal 200 reports the channel state information and the ACK/NACK feedback to base station 100 over a feedback channel. Responsive to the ACK/NACK feedback, base station may either transmit new data over a transmission layer or layers corresponding to ACK feedback and/or retransmit previous data over a transmission layer or layers corresponding to NACK feedback. Operations from block 391b and down may be repeated for each TTI over which downlink data is transmitted to wireless terminal 200.

Figure 3B:
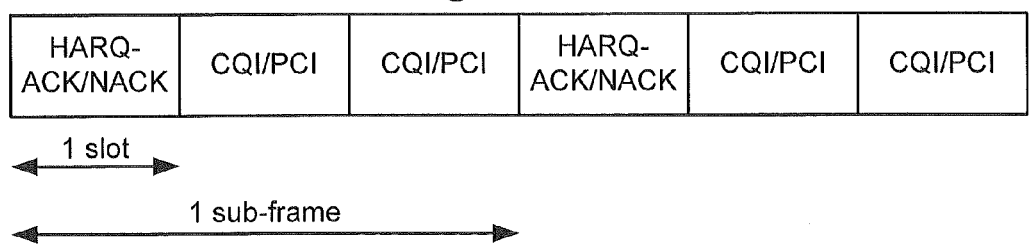
FIG. 3B is illustrates a feedback channel report format of FIG. 3A.

An example of a format for a feedback channel report for two reporting intervals is illustrated in FIG. 3B. FIG. 3B shows that the feedback channel report may include a HARQ element/message/codeword (including acknowledge/ACK and/or negative-acknowledge/NACK information, and respective HARQ process IDs) and/or CQI/PCI (channel quality information and/or precoding control indicator) information. More particularly, wireless terminal 200 may transmit CQI/PCI information (over the feedback channel) including a rank indicator requesting/recommending a MIMO transmission rank for subsequent downlink transmissions from base station 100 to wireless terminal 200. Base station processor 101 may select the requested/recommended MIMO rank or a different MIMO rank, and base station 100 may identify the selected MIMO rank in downlink signaling transmitted to wireless terminal 200. Base station 100 may then transmit one or more transport data blocks using respective MIMO layers/streams over the downlink channel in a subsequent TTI/TFRE in accordance with the selected MIMO rank as downlink traffic. Based on success/failure decoding each received transport data block, wireless terminal 200 may generate respective HARQ ACK/NACK messages and HARQ IDs that are transmitted to base station 100 over the feedback channel. For each HARQ ACK/NACK message for a TTI/TREE, for example, wireless terminal 200 may generate a HARQ codeword including a HARQ process ID (also referred to as a HARQ ID) identifying the respective HARQ process and an ACK or a NACK indicator. Moreover, HARQ IDs may be provided over the downlink signaling channel for each TTI/TRFE to identify the HARQ process associated with each transmission layer used for the respective TTI/TRFE.

FIG. 4 is block diagram illustrating elements/functionalities of base station processor 101 of FIG. 2 supporting two HARQ codeword MIMO with 4 channel encoders and up to four rank MIMO downlink transmission according to some embodiments. According to embodiments of FIG. 4, four channel encoders CE1, CE2, CE3, and CE4 may be provided for four streams of transport data blocks B1, B2, B3, and B4, with symbols of one data input stream for wireless terminal 200 being mapped to as many as four different data streams transmitted over respective MIMO layers. As shown, processor 101 may include transport data block generator 401, channel encoder 403, modulator 405, layer mapper 407, spreader/scrambler 409, and layer precoder 411. In embodiments of FIG. 4, channel encoder 403 may include channel encoders CE1, CE2, CE3, and CE4 for the four streams of transport data blocks B1, B2, B3, and B4, modulator 405 may include interleavers/modulators IM1, IM2, IM3, and IM4, and layer mapper 407 may be configured to map resulting symbols of the four streams to as many as four different MIMO layers (streams) X1, X2, X3, and X4 as discussed in greater detail below. Moreover, adaptive controller 415 may be configured to control transport data block generator 401 (e.g., to choose transport block lengths), channel encoder 403, modulator 405 (e.g., to choose modulation orders and coding rates), layer mapper 407, and/or layer precoder 411 (e.g., to choose precoding vectors) responsive to channel quality information (CQI) received as feedback from wireless terminal 200. Accordingly, symbols generated responsive to data block codewords respectively generated by channel encoders CE1, CE2, CE3, and CE4 using different channel coding (determined by adaptive controller 415 responsive to wireless terminal 200 feedback) may be interleaved and distributed (mapped) to 4 different MIMO layers. More particularly, symbols generated responsive to two data codewords CW (where a data codeword CW is a transport data block with additional channel coding and/or CRC bits) may be interleaved and then split between two different MIMO layers. According to some embodiments discussed herein, layer mapper 407 may perform a one-to-one mapping.

Base station processor 101, for example, may receive input data (e.g., from core network 70, from another base station, etc.) for transmission to wireless terminal 200, and transport data block generator 401 (including transport data block generators TB1, TB2, TB3, and TB4) may provide a single stream of data blocks (for rank 1 transmissions) or separate the input data into a plurality of different streams of data blocks (for rank 2, rank 3, and rank 4 transmission). More particularly, for rank 1 transmissions (providing only 1 MIMO layer/stream), all input data may be processed through transport data block generator TB1 to provide a single stream of transport data blocks B1 (including individual transport data blocks b1-1, b1-2, b1-3, etc.) without using transport data block generators TB2, TB3, or TB4 and without generating other streams of transport data blocks B2, B3, or B4. For rank 2 transmissions (providing 2 MIMO layers/streams), transport data block generator TB1 may generate a stream of transport data blocks B1 (including individual transport data blocks b1-1, b1-2, b1-3, etc.), and transport data block generator TB2 may generate a stream of transport data blocks B2 (including individual transport data blocks b2-1, b2-2, b2-3, etc.) without using transport data block generators TB3 or TB4 and without generating other streams of transport data blocks B3 or B4. For rank 3 transmissions (providing 3 MIMO layers/streams), transport data block generator TB1 may generate a stream of transport data blocks B1 (including individual transport data blocks b1-1, b1-2, b1-3, etc.), transport data block generator TB2 may generate a stream of transport data blocks B2 (including individual transport data blocks b2-1, b2-2, b2-3, etc.), and transport data block generator TB3 may generate a stream of transport data blocks B3 (including individual transport data blocks b3-1, b3-2, b3-3, etc.), without using transport data block generator TB4 and without generating another stream of transport data blocks B4. For rank 4 transmissions (providing 4 MIMO layers/streams), transport data block generator TB1 may generate a stream of transport data blocks B1 (including individual transport data blocks b1-1, b1-2, b1-3, etc.), transport data block generator TB2 may generate a stream of transport data blocks B2 (including individual transport data blocks b2-1, b2-2, b2-3, etc.), transport data block generator TB3 may generate a stream of transport data blocks B3 (including individual transport data blocks b3-1, b3-2, b3-3, etc.), and transport data block generator TB4 may generate a stream of transport data blocks B4 (including individual transport data blocks b4-1, b4-2, b4-3, etc.).

Channel encoder 403 (including channel encoders CE1, CE2, CE3, and CE4) may encode the stream/streams of data blocks B1, B2, B3, and/or B4 generated by transport data block generator 401 to provide respective streams of data codewords CW1 (including individual data codewords cw1-1, cw1-2, cw1-3, etc.), CW2 (including individual data codewords cw2-1, cw2-2, cw2-3, etc.), CW3 (including individual data codewords cw3-1, cw3-2, cw3-3, etc.), and/or CW4 (including individual data codewords cw4-1, cw4-2, cw4-3, etc.), for example, using turbo coding, convolutional coding, etc. Moreover, coding characteristics (e.g., coding rates) applied by channel encoders CE1, CE2, CE3, and CE4 may be separately determined by adaptive controller 415 responsive to wireless terminal 200 feedback (e.g., CQI regarding the downlink channel). For rank 1 transmissions, channel encoder 403 may generate a single stream of data codewords CW1 responsive to the stream of data blocks B1 using only channel encoder CE1. For rank 2 transmissions, channel encoder 403 may generate two streams of data codewords CW1 and CW2 responsive to respective streams of data blocks B1 and B2 using channel encoder CE1 and channel encoder CE2. For rank 3 transmissions, channel encoder 403 may generate three streams of data codewords CW1, CW2, and CW3 responsive to respective streams of data blocks B1, B2, and B3 using channel encoder CE1, channel encoder CE2, and channel encoder CE3. For rank 4 transmissions, channel encoder 403 may generate four streams of data codewords CW1, CW2, CW3, and CW4 responsive to respective streams of data blocks B1, B2, B3, and B4 using channel encoder CE1, channel encoder CE2, channel encoder CE3, and channel encoder CW4. According to some embodiments, channel encoders CE1, CE2, CE3, and/or CE4 may apply different coding characteristics (e.g., different coding rates) during rank 2, rank 3, and/or rank 4 transmissions to generate respective (differently coded) data codewords cw1-1, cw2-1, cw3-1, and/or cw4-1 including data to be transmitted during a same TTI/TFRE.

Modulator 405 (including interleaver/modulators IM1, IM2, IM3, and IM4) may modulate and interleave the stream/streams of data codewords CW1, CW2, CW3, and/or CW4 generated by channel encoder 403 to provide respective streams of unmapped symbol blocks D1 (including unmapped symbol blocks d1-1, d1-2, d1-3, etc.), D2 (including unmapped symbol blocks d2-1, d2-2, d2-3, etc.), D3 (including unmapped symbol blocks d3-1, d3-2, d3-3, etc.), and/or D4 (including unmapped symbol blocks d4-1, d4-2, d4-3, etc.). For rank 1 transmissions (providing only 1 MIMO layer/stream), modulator 405 may generate a single stream of unmapped symbol blocks D1 responsive to the stream of data codewords CW1 using only interleaver/modulator IM1. For rank 2 transmissions, modulator 405 may generate two streams of unmapped symbol blocks D1 and D2 responsive to respective streams of data codewords CW1 and CW2 using interleaver/modulators IM1 and IM2. For rank 3 transmissions, modulator 405 may generate three streams of unmapped symbol blocks D1, D2, and D3 responsive to respective streams of data codewords CW1, CW2, and CW3 using interleaver/modulators IM1, IM2, and IM3. For rank 4 transmissions, modulator 405 may generate four streams of unmapped symbol blocks D1, D2, D3, and D4 responsive to respective streams of data codewords CW1, CW2, CW3, and CW4 using interleaver/modulators IM1, IM2, IM3, and IM4. Modulator 405 may apply modulation orders responsive to input from adaptive controller 415 determined based on CQI feedback from wireless terminal 200.

In addition, each interleaver/modulator IM1, IM2, IM3, and/or IM4 may interleave data of two or more codewords of a stream so that two or more consecutive unmapped symbol blocks of a respective stream include symbols representing data of the two or more consecutive codewords. For example, data of consecutive data codewords cw1-1 and cw1-2 of data codeword stream CW1 may be interleaved and modulated to provide consecutive unmapped symbol blocks d1-1 and d1-2 of stream D1. Similarly, data of consecutive data codewords cw2-1 and cw2-2 of data codeword stream CW2 may be interleaved and modulated to provide consecutive unmapped symbol blocks d2-1 and d2-2 of stream D2; data of consecutive data codewords cw3-1 and cw3-2 of data codeword stream CW3 may be interleaved and modulated to provide consecutive unmapped symbol blocks d3-1 and d3-2 of stream D3; and/or data of consecutive data codewords cw4-1 and cw4-2 of data codeword stream CW4 may be interleaved and modulated to provide consecutive unmapped symbol blocks d4-1 and d4-2 of stream D4.

Symbols of streams of unmapped symbol blocks D1, D2, D3, and D4 may be mapped to respective streams of mapped symbol blocks X1, X2, X3, and X4 (for respective MIMO transmission layers), for example, using a one-to-one mapping. While one-to-one mapping is discussed by way of example, other mappings may be used provided that the mapping function of layer mapper 407 is known to both base station 100 and wireless terminal 200. According to some embodiments, layer mapper 407 may interleave symbols of different data block transmission layers that share a HARQ process for rank 3 and rank 4 downlink transmissions. For example, unmapped symbol streams D2 and D3 (generated by interleavers/modulators IM2 and IM3) may be interleaved/mapped to mapped symbol streams X2 and X3 for rank 3 and rank 4 downlink transmissions, and unmapped symbol streams D1 and D4 (generated by interleavers/modulators IM1 and IM4) may be interleaved/mapped to mapped symbol streams X1 and X4 for rank 4 downlink transmissions.

Spreader/scrambler 409 may include four spreader/scramblers SS1, SS2, SS3, and SS4, and for each mapped symbol stream provided by layer mapper 407, spreader/scrambler 409 may generate a respective stream of spread symbol blocks Y1, Y2, Y3, and Y4 (e.g., using a Walsh code). Layer precoder 411 may apply a MIMO precoding vector (e.g., by applying precoding weights) of the appropriate rank (based on wireless terminal feedback as interpreted by adaptive controller 415) to the streams of spread symbol blocks for transmission through transceiver 109 and antennas Ant-1, Ant-2, Ant-3, and Ant-4 of antenna array 117. According to some embodiments, with rank one transmissions, only first transmission layer TL1 (e.g., including elements TB1, CE1, IM1, and/or SS1) of FIG. 4 may be used; with rank two transmissions, two transmission layers TL1 and TL2 (e.g., including TB1, CE1, IM1, and/or SS1; and including TB2, CE2, IM2, and/or SS2) of FIG. 4 may be used; with rank three transmissions, three transmission layers TL1, TL2, and TL3 (e.g., including TB1, CE1, IM1, and/or SS1; TB2, CE2, IM2, and/or SS2; and TB3, CE3, IM3, and/or SS3) of FIG. 4 may be used; and with rank four transmissions, four transmission layers TL1, TL2, TL3, and TL4 (e.g., including TB1, CE1, IM1, and/or SS1; TB2, CE2, IM2, and/or SS2; TB3, CE3, IM3, and/or SS3; and TB4, CE4, IM4, and/or SS4) of FIG. 4 may be used. Accordingly, data transmission layer DTL1 may include TB1, CE1, and/or IM1, data transmission layer DTL2 may include TB2, CE2, and/or IM2, data transmission layer DTL3 may include TB3, CE3, and/or IM3, and data transmission layer DTL4 may include TB4, CE4, and/or IM4. According to some other embodiments, with rank one transmissions, only a first layer of elements (e.g., TB1, CE1, IM1, and/or SS1) of FIG. 4 may be used; with rank two transmissions, two layers of elements (e.g., TB1, TB2, CE1, CE2, IM1, IM2, SS1, and/or SS2) of FIG. 4 may be used; with rank three transmissions, three layers of elements (e.g., TB1, TB2, TB3, CE1, CE2, CE3, IM1, IM2, IM3, SS1, SS2, and/or SS3) of FIG. 4 may be used; and with rank four transmissions, four layers of elements (e.g., TB1, TB2, TB3, TB4, CE1, CE2, CE3, CE4, IM1, IM2, IM3, and IM4, SS1, SS2, SS3, and/or SS4) of FIG. 4 may be used.

In embodiments of FIG. 4, base station processor 101 may support two HARQ process/codeword MIMO with 4 channel encoders CE1-CE4. Using feedback from wireless terminal 200 (indicated by "feedback channel" of FIG. 3A), adaptive controller 415 chooses transport block length, modulation order, and coding rate (used by transport block generator 401, encoder 403, and/or modulator 405). Adaptive controller 415 also generates precoding weight information used by layer precoder 411. Even though encoder 403 includes four channel encoders CE1-CE4, wireless terminal 200 may only provide feedback information for a maximum of two encoded transport block codewords. Stated in other words, wireless terminal 200 may provide one HARQ process/codeword for rank one transmissions (with one transport data blocks per TTI/TFRE using one downlink data streams), wireless terminal 200 may provide two HARQ processes/codewords for rank two transmissions (with two transport data blocks per TTI/TFRE using two downlink data streams), wireless terminal 200 may provide two HARQ processes/codewords for rank three transmissions (with three transport data blocks per TTI/TFRE using three downlink data streams), and wireless terminal 200 may provide two HARQ processes/codewords for rank four transmissions (with four transport data blocks per TTI/TFRE using four downlink data streams).

For rank three and rank four transmissions, a number of data streams (also referred to as data transmission layers) generated by transport block generator 401, encoder 403, and/or modulator 405 is greater than a number of HARQ processes/codewords supported by base station 100 and/or wireless terminal 200. According to embodiments of present inventive concepts discussed herein, a HARQ process/codeword may be mapped to more than one data stream for rank 3 and rank 4 transmissions. For rank one transmissions, one HARQ process/codeword may be mapped directly to a first data stream (e.g., transmitted using a first data transmission layer DTL1 including TB1, CE1, and/or IM1 and received using a first data reception layer DRL1 including DM1, SB1, and/or CD1). For rank two transmission, a first HARQ process/codeword may be mapped directly to a first data stream (e.g., transmitted using first data transmission layer DTL1 including TB1, CE1, and/or IM1, and received using a first data reception layer DRL1 including DM1, SB1, and/or CD1), and a second HARQ process/codeword may be mapped directly to a second data stream (e.g., transmitted using a third data transmission layer DTL2 including TB2, CE2, and/or IM2, and received using a third data reception layer DRL2 including DM2, SB2, and/or CD2). For rank three transmission, a first HARQ process/codeword may be mapped to a first data stream (e.g., transmitted using a first data transmission layer DTL1 including TB1, CE1, and/or IM1, and received using a first data reception layer DRL1 including DM1, SB1, and/or CD1) and a second HARQ process/codeword may be mapped to a second data stream (e.g., transmitted using a second data transmission layer DTL2 including TB2, CE2, and/or IM2, and received using a second data reception layer DRL2 including DM2, SB2, and/or CD2) and to a third data stream (e.g., transmitted using a third data transmission layer DTL3 including TB3, CE3, and/or IM3, and received using a third data reception layer DRL3 including DM3, SB3, and/or CD3). For rank four transmission, a first HARQ process/codeword may be mapped to a first data stream (e.g., transmitted using a first data transmission layer DTL1 including TB1, CE1, and/or IM1, and received using a first data reception layer DRL1 including DM1, SB1, and/or CD1) and to a fourth data stream (e.g., transmitted using a fourth data transmission layer DTL4 including TB4, CE4, and/or IM4, and received using a second data reception layer DRL4 including DM4, SB4, and/or CD4), and a second HARQ process/codeword may be mapped to a second data stream (e.g., transmitted using a second transmission layer DTL2 including TB2, CE2, and/or IM2, and received using a second data reception layer DRL2 including DM2, SB2, and/or CD2) and to a third data stream (e.g., transmitted using a third data transmission layer DTL3 including TB3, CE3, and/or IM3, and received using a third data reception layer DRL3 including DM3, SB3, and/or CD3). According to some other embodiments, for rank one transmissions, one HARQ process/codeword may be mapped directly to a first data stream (e.g., transmitted using a first transmission layer including TB1, CE1, IM1, and/or SS1 and received using a first reception layer including DM1, SB1, and/or CD1). For rank two transmission, a first HARQ process/codeword may be mapped directly to a first data stream (e.g., transmitted using a first transmission layer including TB1, CE1, IM1, and/or SS1 and received using a first reception layer including DM1, SB1, and/or CD1), and a second HARQ process/codeword may be mapped directly to a second data stream (e.g., transmitted using a third transmission layer including TB2, CE2, IM2, and/or SS2 and received using a third reception layer including DM2, SB2, and/or CD2). For rank three transmission, a first HARQ process/codeword may be mapped to a first data stream (e.g., transmitted using a first transmission layer including TB1, CE1, IM1, and/or SS1 and received using a first reception layer including DM1, SB1, and/or CD1), and a second HARQ process/codeword may be mapped to a second data stream (e.g., transmitted using a second transmission layer including TB2, CE2, IM2, and/or SS2 and received using a second reception layer including DM2, SB2, and/or CD2) and to a third data stream (e.g., transmitted using a third transmission layer including TB3, CE3, IM3, and/or SS3 and received using a third reception layer including DM3, SB3, and/or CD3). For rank four transmission, a first HARQ process/codeword may be mapped to a first data stream (e.g., transmitted using a first transmission layer including TB1, CE1, IM1, and/or SS1 and received using a first reception layer including DM1, SB1, and/or CD1) and to a fourth data stream (e.g., transmitted using a fourth transmission layer including TB4, CE4, IM4, and/or SS4 and received using a fourth reception layer including DM4, SB4, and/or CD4), and a second HARQ process/codeword may be mapped to a second data stream (e.g., transmitted using a second transmission layer including TB2, CE2, IM2, and/or SS2 and received using a second reception layer including DM2, SB2, and/or CD2) and to a third data stream (e.g., transmitted using a third transmission layer including TB3, CE3, IM3, and/or SS3 and received using a third reception layer including DM3, SB3, and/or CD3).

Based on the rank chosen by adaptive controller 415, transport data blocks may be passed to encoder 403, and encoder outputs may be interleaved and modulated using modulator 405. Outputs of modulator 405 may be mapped to space time layers using layer mapper 407. As discussed above, layer mapper 407 may provide a one-to-one layer mapping, or layer mapper may interleave symbols of data transmission layers sharing a same HARQ codeword/process for rank 3 and/or rank 4 transmissions. The symbol stream(s) generated by layer mapper 407 may be spread and scrambled using spreader/scrambler 409, and layer precoder 411 may precode outputs of spreader/scrambler 409, with precoder outputs being passed through transceiver 109 and antenna array 117 (including Antennas Ant-1, Ant-2, Ant-3, and Ant-4).

At wireless terminal 200, operations of processor 201 may mirror operations of base station processor 101 when receiving the MIMO downlink communications transmitted by base station 100. More particularly, elements/functionalities of wireless terminal processor 201 are illustrated in FIG. 5 mirroring elements/functionalities of base station processor 101 discussed above with reference to FIG. 4.

Radio signals may be received through MIMO antenna elements of MIMO antenna array 217 and transceiver 209, and the radio signals may be decoded by layer decoder 601 using a MIMO decoding vector to generate a plurality of MIMO decoded symbol layers X1', X2', X3', and/or X4' depending on MIMO rank used for transmission/reception. Layer Decoder 601 may use a decoding vector corresponding to the precoding vector used by base station 100. Layer decoder 601 may generate a single decoded symbol layer X1' for rank 1 reception, layer decoder 601 may generate two decoded symbol layers X1' and X2' for rank 2 reception, layer decoder 601 may generate three decoded symbol layers X1', X2', and X3' for rank 3 reception, and layer decoder 601 may generate four decoded symbol layers X1', X2', X3', and X4' for rank 4 transmission. Layer decoder 601 may thus perform a converse of operations performed by layer precoder 411 and spreader/scrambler 409 of base station 100. Layer decoder 601 may perform functionalities of a MIMO detector (corresponding to a converse of layer precoder 411) and of dispreading/descrambling blocks for each data stream/layer (corresponding to a converse of spreader/scrambler 409). Layer demapper 603 may function as a converse of layer mapper 407 to demap decoded symbol layers X1', X2', X3', and/or X4' to respective unmapped symbol layers D1', D2', D3', and/or D4' according to the transmission rank.

For rank one reception, layer demapper 603 may demap symbols of decoded symbol layer X1' blocks x1'-$j$ directly to symbols of unmapped symbol layer D1' blocks d1'-$j$, demodulator/deinterleaver DM-1 may demodulate/deinterleave unmapped symbol layer blocks d1'-$j$ to provide data codewords cw1'-$j$ of data codeword stream CW1', and channel decoder CD1 may decode data codewords cw1'-$j$ of data codeword stream CW1' to provide transport blocks b1'-$j$ of stream B1'. Transport block generator 607 may then pass transport blocks b1'-$j$ of stream B1' as a data stream. During rank one reception, demodulators/deinterleavers DM2, DM3, and DM4 and channel decoders CD2, CD3, and CD4 may be unused.

For rank two reception, layer decoder 601 may generate decoded symbol layers X1' and X2'. Layer demapper 603 may demap symbols of decoded symbol layer X1' blocks x1'-$j$ directly to symbols of unmapped symbol layer D1' blocks d1'-$j$, and layer demapper 603 may demap symbols of decoded symbol layer X2' blocks x3'-$j$ directly to symbols of unmapped symbol layer D2' blocks d2'-$j$. Demodulator/deinterleaver DM-1 may demodulate/deinterleave unmapped symbol layer blocks d1'-$j$ to provide data codewords cw1'-$j$ of data codeword stream CW1', and demodulator/deinterleaver DM-2 may demodulate/deinterleave unmapped symbol layer blocks d2'-$j$ to provide data codewords cw2'-$j$ of data codeword stream CW2'. Channel decoder CD1 may decode data codewords cw1'-*j* of data codeword stream CW1' to provide transport blocks b1'-*j* of stream B1', and channel decoder CD2 may decode data codewords cw2'-*j* of data codeword stream CW2' to provide transport blocks b2'-*j* of stream B2'. Transport block generator 607 may then combine transport blocks b1'-*j* and b2'-*j* of streams B1' and B2' as a data stream. During rank two reception, demodulators/deinterleavers DM3 and DM4 and channel decoders CD3 and CD4 may be unused.

For rank three reception, layer decoder 601 may generate decoded symbol layers X1', X2', and X3'. Layer demapper 603 may demap symbols of decoded symbol layer X1' blocks x1'-*j* directly to symbols of unmapped symbol layer D1' blocks d1'-*j*, layer demapper 603 may demap symbols of decoded symbol layer X2' blocks x3'-*j* directly to symbols of unmapped symbol layer D2' blocks d2'-*j*, and layer demapper 603 may demap symbols of decoded symbol layer X3' blocks x3'-j directly to symbols of unmapped symbol layer D3' blocks d3' j. Demodulator/deinterleaver DM-1 may demodulate/deinterleave unmapped symbol layer blocks d1'-*j* to provide data codewords cw1'-*j* of data codeword stream CW1', demodulator/deinterleaver DM-2 may demodulate/deinterleave unmapped symbol layer blocks d2'-*j* to provide data codewords cw2'-*j* of data codeword stream CW2', and demodulator/deinterleaver DM-3 may demodulate/deinterleave unmapped symbol layer blocks d3'-*j* to provide data codewords cw3'-*j* of data codeword stream CW3'. Channel decoder CD1 may decode data codewords cw1'-*j* of data codeword stream CW1' to provide transport blocks b1'-*j* of stream B1', channel decoder CD2 may decode data codewords cw2'-*j* of data codeword stream CW2' to provide transport blocks b2'-*j* of stream B2', and channel decoder CD3 may decode data codewords cw3'-*j* of data codeword stream CW3' to provide transport blocks b3'-*j* of stream B3'. Transport block generator 607 may then combine transport blocks b1'-*j*, b2'-*j*, and b3'-*j* of streams B1', B2', and B3' as a data stream. During rank three reception, demodulator/deinterleaver DM4 and channel decoder CD4 may be unused. For rank three reception, a first HARQ process/codeword may be applied to the first data reception layer DRL1, and a second HARQ process/codeword may be shared between data reception layers DRL2 and DRL3.

For rank four reception, layer decoder 601 may generate decoded symbol layers X1', X2', X3', X4'. Layer demapper 603 may demap symbols of decoded symbol layer X1' blocks x1'-*j* directly to symbols of unmapped symbol layer D1' blocks d1' j, layer demapper 603 may demap symbols of decoded symbol layer X2' blocks x3'-*j* directly to symbols of unmapped symbol layer D2' blocks d2'-*j*, and layer demapper 603 may demap symbols of decoded symbol layer X3' blocks x3'-j directly to symbols of unmapped symbol layer D3' blocks d3'-*j*, and layer demapper 603 may demap symbols of decoded symbol layer X4' blocks x4'-j directly to symbols of unmapped symbol layer D4' blocks d3'-*j*. Demodulator/deinterleaver DM-1 may demodulate/deinterleave unmapped symbol layer blocks d1'-*j* to provide data codewords cw1'-*j* of data codeword stream CW1', demodulator/deinterleaver DM-2 may demodulate/deinterleave unmapped symbol layer blocks d2'-*j* to provide data codewords cw2'-*j* of data codeword stream CW2', demodulator/deinterleaver DM-3 may demodulate/deinterleave unmapped symbol layer blocks d3'-*j* to provide data codewords cw3'-*j* of data codeword stream CW3', and demodulator/deinterleaver DM-4 may demodulate/deinterleave unmapped symbol layer blocks d3'-*j* to provide data codewords cw4'-*j* of data codeword stream CW4'. Channel decoder CD1 may decode data codewords cw1'-*j* of data codeword stream CW1' to provide transport blocks b1'-*j* of stream B1', channel decoder CD2 may decode data codewords cw2'-*j* of data codeword stream CW2' to provide transport blocks b2'-*j* of stream B2', channel decoder CD3 may decode data codewords cw3'-*j* of data codeword stream CW3' to provide transport blocks b3'-*j* of stream B3', and channel decoder CD4 may decode data codewords cw4'-*j* of data codeword stream CW4' to provide transport blocks b4'-*j* of stream B4'. Transport block generator 607 may then combine transport blocks b1'-*j*, b2'-*j*, b3'-*j*, and b4'-*j* of streams B1', B2', B3', and B4' as a data stream. For rank four reception, a first HARQ process/codeword may be shared between data reception layers DRL1 and DRL4, and a second HARQ process/codeword may be shared between data reception layers DRL2 and DRL3.

As further shown in FIG. 5, a respective soft buffer SB1, SB2, SB3, and SB4 may be provided for each stream of received data, and each decoder CD1, CD2, CD3, and CD4 may be configured to determine whether each decoded transport data block passes or fails decoding. In greater detail, each undecoded transport data block generated by a demodulator/decoder DM may be saved in the respective soft buffer SB until a decoding result is determined by the channel decoder CD. If the transport data block passes decoding, an ACK (acknowledge message) may be generated and provided as feedback for the base station, and retransmission of the successfully decoded (passed) data block is not required. If the transport data block does not pass decoding, a NACK (negative acknowledge message) may be generated and provided as feedback for the base station, and the undecoded output of the demodulator/deinterleaver (also referred to as soft bits) may be saved in soft buffer SB. Responsive to the NACK, the base station may retransmit the failed transport data block (together with a HARQ ID identifying the associated HARQ process), and wireless terminal 200 may use the retransmitted data block together with the previously undecoded output of the demodulator/deinterleaver (that is saved in the respective soft buffer) to decode the retransmitted data block on the second pass. By using the soft buffer to combine first and second versions of the demodulated data block, a likelihood of successful decoding may be increased after retransmission.

As shown in FIG. 5, layer decoder 601 (e.g., including a MIMO detector such as a minimum mean squared error or MMSE receiver), may reduce interference from the multipath channel and/or may reduce other antenna interference. After dispreading, demapping, demodulating, and/or deinterleaving, wireless terminal 200 may attempt to decode the coded bits of a transport data block using a respective channel decoder. If the decoding attempt fails, wireless terminal 200 buffers the received soft bits of the transport data block in the respective soft buffer, and requests retransmission of the transport data block by transmitting a NACK message (e.g., as a part of an HARQ-ACK codeword, also referred to as a HARQ codeword). Once the retransmission is received (and subjected to decoding, demapping, demodulating, and/or deinterleaving) by wireless terminal 200, wireless terminal may combine the buffered soft bits with the received soft bits from the retransmission and attempt to decode the combination using a respective channel decoder.

For soft combining to operate properly, the wireless terminal may need to know whether a received transmission is a new transmission of a transport data block or a retransmission of a previously transmitted transport data block. For this purpose, the downlink control signaling may include data indicators (also referred to as indicators, new data indicators, new/old data indicators, etc.), HARQ IDs, and redundancy version indicators that are used by the wireless terminal to control whether a soft buffer should be cleared or whether soft combining of a soft buffer and received soft bits should take place. For a given transmission/retransmission to wireless terminal 200, the data indicator may thus have one value to indicate an initial transmission of new data and another value to indicate a retransmission of previously transmitted data. Whenever a current transmission is not a retransmission, a NodeB base station MAC-ehs element of base station processor 101 may increment a single bit data indicator associated with a HARQ ID. Accordingly, the data indicator may be toggled each time a new transport data block is transmitted over a MIMO layer. The data indicator can thus be used by wireless terminal processor 201 to clear the soft buffer/buffers for each initial transmission because no soft combining should be done for new/initial transmissions. The indicator may also be used to detect error cases in the status signaling. If the data indicator is not toggled despite the fact that the previous data for the HARQ process in question was correctly decoded and acknowledged (using an ACK message), for example, an error in the uplink signaling has most likely occurred. Similarly, if the indicator is toggled but the previous data for the HARQ process was not correctly decoded, the wireless terminal may replace the data previously in the soft buffer for the HARQ process with the new received data.

For rank four transmissions, wireless terminal 200 may thus receive up to four transport data blocks in a same TTI/TFRE to support four streams of transport data blocks. After decoding four data blocks for a TTI/TFRE during a rank 4 transmission, each decoder CD1, CD2, CD3, and CD4 may generate a respective local ACK or NACK depending on whether the respective transport data block passed or failed decoding. In a rank 4 transmission, decoders CD1 and CD4 may be mapped to the first HARQ ID so that the resulting HARQ ACK/NACK message is an ACK only if both decoders CD1 and CD4 generate a local ACK and the resulting HARQ AKC/NACK message is a NACK if either decoder CD1 or CD4 generates a local NACK; and decoders CD2 and CD3 may be mapped to the second HARQ ID so that the resulting HARQ ACK/NACK message is an ACK only if both decoders CD2 and CD3 generate a local ACK and the resulting HARQ AKC/NACK message is a NACK if either decoder CD2 or CD3 generates a local NACK.

For rank three transmissions, wireless terminal 200 may thus receive up to three transport data blocks in a same TTI/TFRE. After decoding three data blocks for a TTI/TFRE during a rank 3 transmission, each decoder CD1, CD2, and CD3 may generate a respective local ACK or NACK depending on whether the respective transport data block passed or failed decoding. In a rank 3 transmission, decoder CD1 may be mapped to the first HARQ ID so that the resulting HARQ ACK/NACK message is an ACK only if decoder CD1 generates a local ACK and the resulting HARQ AKC/NACK message is a NACK if decoder CD1 generates a local NACK; and decoders CD2 and CD3 may be mapped to the second HARQ ID so that the resulting HARQ ACK/NACK message is an ACK if both decoders CD2 and CD3 generate a local ACK and the resulting HARQ AKC/NACK message is a NACK if either of decoders CD2 or CD3 generates a local NACK.

For rank two transmissions, wireless terminal 200 may receive up to two transport data blocks in a same TTI/TFRE. After decoding two data blocks for a TTI/TFRE during a rank 2 transmission, each decoder CD1 and CD2 may generate a respective ACK or NACK depending on whether the respective transport data block passed or failed decoding. In a rank two transmission, decoder CD1 may be mapped to the first HARQ ID so that the resulting HARQ ACK/NACK message is an ACK only if decoder CD1 generates a local ACK and the resulting HARQ AKC/NACK message is a NACK if decoder CD1 generates a local NACK; and decoder CD2 may be mapped to the second HARQ ID so that the resulting HARQ ACK/NACK message is an ACK if decoder CD2 generates a local ACK and the resulting HARQ AKC/NACK message is a NACK if decoder CD2 generates a local NACK.

For rank one transmissions, wireless terminal 200 may thus receive one transport data block in a TTI/TFRE. After decoding one data block for a TTI/TFRE during a rank 1 transmission, decoder CD1 may generate a respective local ACK or NACK depending on whether the transport data block passed or failed decoding. In a rank one transmission, decoder CD1 may be mapped to the first HARQ ID so that the resulting HARQ ACK/NACK message is an ACK if decoder CD1 generates a local ACK and the resulting HARQ AKC/NACK message is a NACK if decoder CD1 generates a local NACK.

According to some other embodiments, first transmission/reception layers TL1/RL1 may be used during rank 1 transmission/reception, and HARQ process HARQ-1 may be mapped to a data block of the first transmission/reception layers TL1/RL1 during rank 1 transmission/reception. First and second transmission/reception layers TL1/RL1 and TL2/RL2 may be used during rank 2 transmission/reception, HARQ process HARQ-1 may be mapped to a data block of the first transmission/reception layers TL1/RL1 during rank 2 transmission/reception, and HARQ process HARQ-2 may be mapped to a data block of the second transmission/reception layers TL2/RL2 during rank 2 transmission/reception. First, second, and third transmission/reception layers TL1/RL1, TL2/RL2, and TL3/RL3 may be used during rank 3 transmission/reception, HARQ process HARQ-1 may be mapped to a data block of the first transmission/reception layers TL1/RL1 during rank 3 transmission/reception, and HARQ process HARQ-2 may be mapped to data blocks of the second and third transmission/reception layers TL2/RL2 and TL3/RL3 during rank 3 transmission/reception. First, second, third, and fourth transmission/reception layers TL1/RL1, TL2/RL2, TL3/RL3, and TL4/RL4 may be used during rank 4 transmission/reception, HARQ process HARQ-1 may be mapped to data blocks of the first and fourth transmission/reception layers TL1/RL1 and TL4/RL4 during rank 4 transmission/reception, and HARQ process HARQ-2 may be mapped to data blocks of the second and third transmission/reception layers TL2/RL2 and TL3/RL3 during rank 4 transmission/reception. A MIMO layer (supported by respective transmission/reception layers) may thus define a logical channel over which a data block (or a stream of data blocks) is transmitted.

Figure 6A:
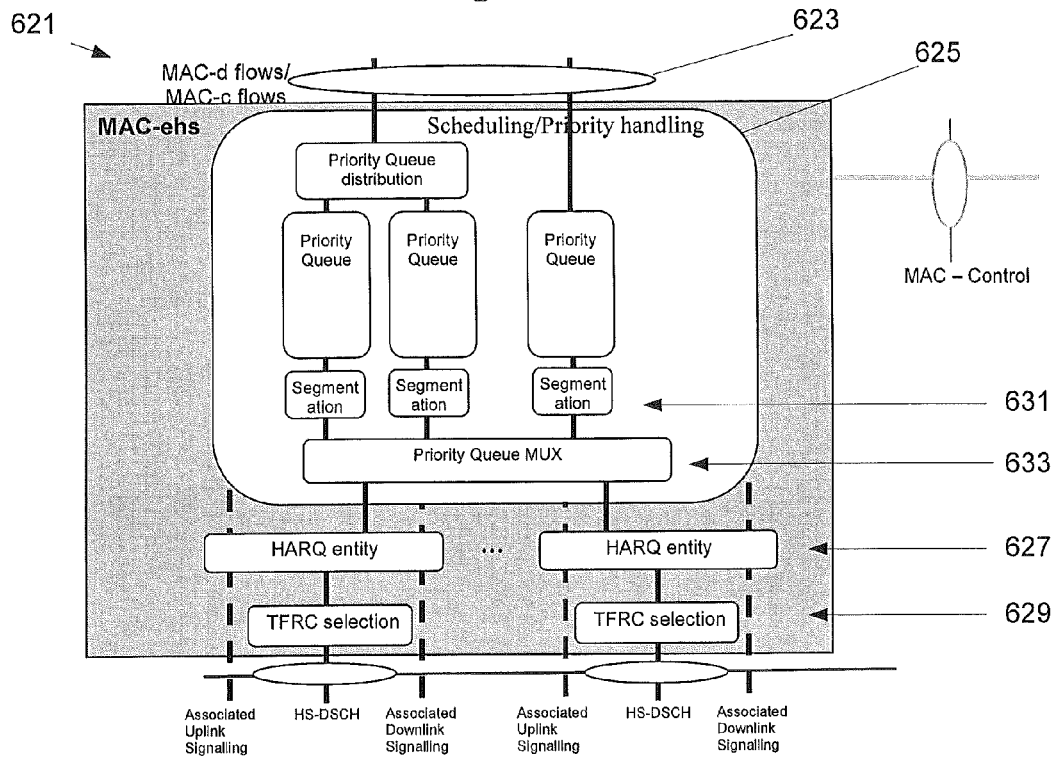
FIGS. 6A and 6B illustrate schematically a medium access control (MAC) entities in base stations and wireless terminals.

According to embodiments of present inventive concepts, a HARQ process in a MAC-ehs of a base station processor 101 may provide MAC functionality illustrated in FIG. 6A. FIG. 6A illustrates MAC (Media Access Control) functionality at base station 100. As shown in FIG. 6A, the MAC-ehs may handle data transmitted on a configured HS-DSCH (High Speed Downlink Shared Channel), and one MAC-ehs entity may be provided for each cell and/or base station that supports HS-DSCH transmission. A same MAC-ehs entity, for example, may support HS-DSCH transmissions in more than one cell served by a same eNodeB. Moreover, priority handling per MAC-ehs SDU in the MAC-ehs may be provided.

As discussed in greater detail below with respect to FIG. 6A, a base station MAC-ehs 621 may include flow control unit/function 623, scheduling/priority handling unit/function 625, HARQ entity(ies)/function(s) 627, TFRC (Transport Format Resource Combination) selection entity(ies)/function(s) 629, segmentation entity(ies)/function(s) 631, and priority queue multiplexer entity/function 633. Operations of a base station MAC-ehs are discussed, by way of example, in TS 3GPP 25.321, "Medium Access Control Protocol," Revision 11.0.0, November 2012, the disclosure of which is hereby incorporated herein in its entirety by reference.

Flow control unit/function 623 may limit/reduce layer 2 signaling latency and reduce discarded and retransmitted data as a result of HS-DSCH congestion.

Scheduling/Priority handling unit/function 625 may manage HS-DSCH resources between HARQ entities and data flows according to respective priority classes. Scheduling/Priority handling unit/function 625 may determine for each TTI/TFRE if single or dual/multiple stream transmission should be used. Based on status reports from associated uplink signaling, either new transmission or retransmission is determined when operating in a CELL_DCH (cell dedicated channel) state. In FDD (Frequency Division Duplex), when operating in CELL_FACH (cell forward access channel), CELL_PCH (cell paging channel), and/or URA_PCH (UTRAN registration area paging channel) state HS-DSCH (High Speed Downlink Shared Channel) reception, MAC-ehs 621 may perform retransmission without uplink signaling. Further, MAC-ehs 621 may set logical channel identifiers for each new reordering SDU (service data unit) and TSNs (transmission sequence number) for each new reordering PDU (protocol data unit) being serviced. To maintain proper transmission priority, a new transmission can be initiated on a HARQ process at any time. The TSN is unique to each MAC-ehs Queue ID within an HS-DSCH. The MAC-ehs may be prevented from scheduling new transmissions (including retransmissions originating in the RLC or Radio Link Protocol layer) along with retransmissions originating from the HARQ layer within a same TTI/TFRE over the same HS-DSCH and HARQ process identification (FDD only).

One HARQ entity(ies)/function(s) 627 may handle hybrid ARQ functionality for one user (wireless terminal 200) and per HS-DSCH transport channel (FDD only). One HARQ entity/function may be capable of supporting multiple instances (HARQ processes) of stop and wait HARQ protocols. There may/shall be one HARQ entity/function per HS-DSCH, one HARQ process per HS-DSCH per TTI/TFRE for single stream transmission (if Rank Indicator RI is set to rank 1); two HARQ processes per HS-DSCH per TTI/TFRE for dual stream transmission (if Rank Indicator RI is set to Rank 2); three HARQ processes per HS-DSCH per TTI/TFRE for three stream transmission (if Rank Indicator RI is set to Rank 3); and four HARQ processes per HS-DSCH per TTI/TFRE for four stream transmission (if Rank Indicator RI is set to Rank 4).

TFRC selection entity(ies)/function(s) 629 may provide selection of an appropriate transport format and resource for data to be transmitted on HS-DSCH. Transport block size may be derived from a TFRI (Transport Format Resource Indicator) value signaled on the HS-SCCH (High Speed Shared Control Channel). If the Rank Indicator RI is set to rank 1, then only one TFRI value is signaled on HS-SCCH, and if RI is set to rank 2, rank 3, or rank 4, then two TFRI values are signaled on HS-SCCH.

Segmentation entity(ies)/function(s) 631 may perform segmentation of MAC-ehs SDUs. Priority queue multiplexer entity/function 633 may determine a number of octets to be included in a MAC-ehs PDU from each priority queue based on scheduling decisions and available TFRC for this entity/function.

Figure 6B:
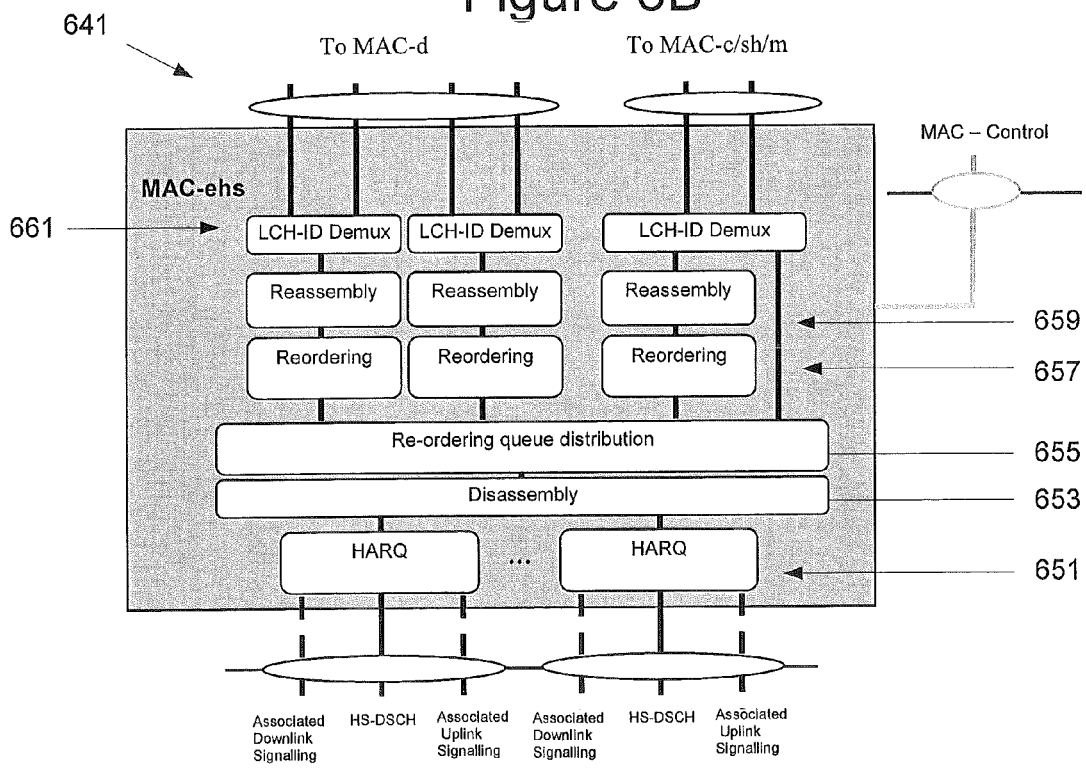

According to embodiments of present inventive concepts, a HARQ process in a MAC-ehs 641 of a wireless terminal processor 201 may provide MAC functionality illustrated in FIG. 6B. FIG. 6B illustrates MAC (Media Access Control) functionality at wireless terminal 200. As shown in FIG. 6B, the MAC-ehs may handle data transmitted on a configured HS-DSCH (High Speed Downlink Shared Channel). The downlink control channel may carry the HS-DSCH operation related information transmitted from base station 100, and the uplink control channel may carry the feedback information transmitted from wireless terminal 200.

As discussed in greater detail below with respect to FIG. 6B, a wireless terminal 200 MAC-ehs 641 may include HARQ entity(ies)/function(s) 651, disassembly entity/function 653, reordering queue distribution entity/function 655, reordering entity(ies)/function(s) 657, reassembly entity(ies)/function(s) 659, and LCH-ID (logical channel identifier) demultiplexing entity(ies)/function(s) 661. Operations of a wireless terminal MAC-ehs are discussed, by way of example, in TS 3GPP 25.321, "Medium Access Control Protocol," Revision 11.0.0, November 2012, the disclosure of which is hereby incorporated herein in its entirety by reference.

HARQ entity(ies)/function(s) 651 may be responsible for handling HARQ protocols at wireless terminal 200. There may/shall be one HARQ process per HS-DSCH per TTI/TFRE for single stream transmission and two HARQ processes per HS-DSCH per for dual/multiple stream downlink transmission/reception, and there may/shall be one HARQ entity/function per HS-DSCH (FDD only). HARQ entity(ies)/function(s) 651 may handle tasks that are required/used for hybrid ARQ at wireless terminal 200, such as generating ACKs and/or NACKs.

Disassembly entity/function 653 may disassemble MAC-ehs PDUs by removing MAC-ehs headers and/or padding. Reordering queue distribution entity/function 655 may route received reordering PDUs to correct reordering queues based on the received logical channel identifier.

Reordering entity(ies)/function(s) 657 may organize received reordering PDUs according to received TSNs (transmission sequence numbers). Data blocks with consecutive TSNs may be delivered to reassembly entity(ies)/function(s) 659 upon reception. A timer mechanism may determine delivery of non-consecutive data blocks to higher layers, and one reordering entity/function may be provided for each MAC-ehs Queue ID configured at the UE.

Reassembly entity(ies)/function(s) 659 may reassemble segmented MAC-ehs SDUs (corresponding to either MAC-c or MAC-d PDUs) and forward the MAC PDUs to LCH-ID demultiplexing entity(ies)/function(s) 661. LCH-ID demultiplexing entity(ies)/function(s) 661 may route MAC-ehs SDUs to a correct logical channel(s) based on the received logical channel identifier(s).

One HARQ entity/function 627 of base station processor 101 may handle hybrid ARQ functionality for one user (e.g., wireless terminal UE 200) per HS-DSCH transport channel. One HARQ entity/function may be capable of supporting multiple HARQ processes (also referred to as HARQ instances) of stop and wait HARQ protocols. There may/shall be one HARQ entity/function per HS-DSCH, one HARQ process per TTI/TFRE for single stream transmissions and two HARQ processes per TTI/TFRE for dual stream downlink transmissions. For a four branch/antenna MIMO system, three HARQ processes may be provided for rank 3 downlink transmissions, and four HARQ processes may be provided for rank 4 downlink transmissions.

More particularly, a first HARQ process HARQ-1 is applied to a first downlink data transmission layer DTL1 for data transmitted using TB1, CE1, and/or IM1 and to a corresponding first downlink reception layer DRL1 for data received using DM1, SB$_1$, and CD1; a second HARQ process HARQ-2 is applied to a second downlink data transmission layer DTL2 for data transmitted using TB2, CE2, and/or IM2 and to a corresponding first downlink reception layer DRL2 for data received using DM2, SB2, and CD2; a third HARQ process HARQ-3 is applied to a third downlink data transmission layer DTL3 for data transmitted using TB3, CE3, and/or IM3 and to a corresponding third downlink reception layer DRL3 for data received using DM3, SB3, and CD3; and a fourth HARQ process HARQ-4 is applied to a fourth downlink data transmission layer DTL4 for data transmitted using TB4, CE4, and/or IM4 and to a corresponding first downlink reception layer DRL4 for data received using DM4, SB4, and CD4.

As shown in FIG. 7, only two HARQ process identifications or IDs (HAR-ID-1 and HARQ-ID-2) may be provided for feedback and/or downlink signaling channels. Accordingly, a HARQ process ID may be used to identify a single unbundled HARQ process, or to identify two bundled HARQ processes. Stated in other words, base station processor 101 and wireless terminal processor 201 may provide/operate a HARQ process for each downlink data stream, but for rank 3 and rank 4 transmissions, a single HARQ Process ID may be mapped to two bundled HARQ processes. As shown in FIGS. 7 and 8, first HARQ process ID HARQ-ID-1 may map to HARQ process HARQ-1 for data transmission/reception layers DTL1/DRL1 and soft buffer SB1 for rank 1, rank 2, and rank 3 downlink transmission/reception, and to HARQ processes HARQ-1 and HARQ-4 for data transmission/reception layers DTL1/DRL1 and DTL4/DRL4 and soft buffers SB1 and SB4 for rank 4 downlink transmission/reception. As further shown in FIGS. 7 and 8, second HARQ process ID HARQ-ID-2 may map to HARQ process HARQ-2 for data transmission/reception layers DTL2/DRL2 and soft buffer SB2 for rank 2 downlink transmission/reception, and to HARQ processes HARQ-2 and HARQ-3 for data transmission/reception layers DTL2/DRL2 and DTL3/DRL3 and soft buffers SB2 and SB3 for rank 3 and rank 4 downlink transmission/reception.

For rank 1 downlink transmission/reception HARQ process HARQ-1 is thus applied to data transmission/reception layers DTL1 and DRL1 and HARQ-ID-1 is mapped to HARQ-1 only and to SB1 only. For rank 2 downlink transmission/reception HARQ process HARQ-1 is applied to data transmission/reception layers DTL1 and DRL1; HARQ-ID-1 is mapped to HARQ-1 only and to SB1 only; transmission/reception HARQ process HARQ-2 is applied to data transmission/reception layers DTL2 and DRL2; and HARQ-ID-2 is mapped to HARQ-2 only and to SB2 only. For rank 3 downlink transmission/reception, HARQ process HARQ-1 is applied to data transmission/reception layers DTL1 and DRL1; HARQ-ID-1 is mapped to HARQ-1 only and to SB1 only; transmission/reception HARQ process HARQ-2 is applied to data transmission/reception layers DTL2 and DRL2; transmission/reception HARQ process HARQ-3 is applied to data transmission/reception layers DTL3 and DRL3; and HARQ-ID-2 is mapped to HARQ-2 and HARQ-3 and to SB2 and SB3. For rank 4 downlink transmission/reception, HARQ process HARQ-1 is applied to data transmission/reception layers DTL1 and DRL1; HARQ process HARQ-4 is applied to data transmission/reception layers DTL4 and DRL4; HARQ-ID-1 is mapped to HARQ-1 and HARQ-4 and to SB1 and SB4; transmission/reception HARQ process HARQ-2 is applied to data transmission/reception layers DTL2 and DRL2; transmission/reception HARQ process HARQ-3 is applied to data transmission/reception layers DTL3 and DRL3; and HARQ-ID-2 is mapped to HARQ-2 and HARQ-3 and to SB2 and SB3.

FIG. 9 provides a mapping of HARQ process results (also referred to as local HARQ process results) to respective HARQ ID results for a four branch/antenna MIMO system according to some embodiments of present inventive concepts. For rank 1 downlink transmission/reception, wireless terminal processor 201 operates first HARQ process HARQ-1 identified by HARQ-ID-1 corresponding to a single stream of data transmitted/received using data transmission/reception layers DTL1/DRL1. For rank 1 downlink transmission/reception, HARQ-1 generates a local ACK if the data of the stream of the TTI/TFRE is successfully decoded at CD1, and HARQ-1 generates a local NACK if the data of the stream of the TTI/TFRE is not successfully decoded at CD1. For rank 1 downlink transmission/reception, the HARQ ID result for HARQ-ID-1 is the same as the local ACK/NACK result generated by HARQ-1 for the TTI/TFRE.

For rank 2 downlink transmission/reception, wireless terminal processor 201 operates first HARQ process HARQ-1 identified by HARQ-ID-1 corresponding to a first stream of data transmitted/received using data transmission/reception layers DTL1/DRL1, and second HARQ process HARQ-2 identified by HARQ-ID-2 corresponding to a second stream of data transmitted/received using data transmission/reception layers DTL2/DRL2. For rank 2 downlink transmission/reception, HARQ-1 generates a local ACK if the data of the first stream of the TTI/TFRE is successfully decoded at CD1, and HARQ-1 generates a local NACK if the data of the first stream of the TTI/TFRE is not successfully decoded at CD1, and HARQ-2 generates a local ACK if the data of the second stream of the TTI/TFRE is successfully decoded at CD2, and HARQ-2 generates a local NACK if the data of the second stream of the TTI/TFRE is not successfully decoded at CD2. For rank 2 downlink transmission/reception, the HARQ ID result for HARQ-ID-1 is the same as the local ACK/NACK result generated by HARQ-1 for the TTI/TFRE, and the HARQ ID result for HARQ-ID-2 is the same as the local ACK/NACK result generated by HARQ-2 for the TTI/TFRE.

For rank 3 downlink transmission/reception, wireless terminal processor 201 operates first HARQ process HARQ-1 identified by HARQ-ID-1 corresponding to a first stream of data transmitted/received using data transmission/reception layers DTL1/DRL1, and second and third HARQ processes HARQ-2 and HARQ-3 identified by HARQ-ID-2 corresponding to second and third streams of data transmitted/received using data transmission/reception layers DTL2/DRL2 and DTL3/DRL3. For rank 3 downlink transmission/reception, HARQ-1 generates an ACK if the data of the first stream of the TTI/TFRE is successfully decoded at CD1, HARQ-1 generates a NACK if the data of the first stream of the TTI/TFRE is not successfully decoded at CD1, HARQ-2 generates an ACK if the data of the second stream of the TTI/TFRE is successfully decoded at CD2, HARQ-2 generates a NACK if the data of the second stream of the TTI/TFRE is not successfully decoded at CD2, HARQ-3 generates a local ACK if the data of the third stream of the TTI/TFRE is successfully decoded at CD3, and HARQ-3 generates a local NACK if the data of the third stream of the TTI/TFRE is not successfully decoded at CD3. For rank 3 downlink transmission/reception, the HARQ ID result for HARQ-ID-1 is the same as the local ACK/NACK result generated by HARQ-1 for the TTI/TFRE. For rank 3 downlink transmission/reception, the HARQ ID result for HARQ-ID-2 is ACK only if both HARQ processes HARQ-2 and HARQ-3 generate local ACKs, and the HARQ ID result for HARQ-ID-2 is NACK if either of HARQ processes HARQ-2 or HARQ-3 generates a local NACK.

For rank 4 downlink transmission/reception, wireless terminal processor 201 operates first and fourth HARQ processes HARQ-1 and HARQ-4 identified by HARQ-ID-1 corresponding to first and fourth streams of data transmitted/received using data transmission/reception layers DTL1/DRL1 and DTL4/DRL4, and second and third HARQ process HARQ-2 and HARQ-3 identified by HARQ-ID-2 corresponding to second and third streams of data transmitted/received using data transmission/reception layers DTL2/DRL2 and DTL3/DRL3. For rank 2 downlink transmission/reception, HARQ-1 generates a local ACK if the data of the first stream of the TTI/TFRE is successfully decoded at CD1, HARQ-1 generates a local NACK if the data of the first stream of the TTI/TFRE is not successfully decoded at CD1, HARQ-2 generates a local ACK if the data of the second stream of the TTI/TFRE is successfully decoded at CD2, HARQ-2 generates a local NACK if the data of the second stream of the TTI/TFRE is not successfully decoded at CD2, HARQ-3 generates a local ACK if the data of the third stream of the TTI/TFRE is successfully decoded at CD3, HARQ-3 generates a local NACK if the data of the third stream of the TTI/TFRE is not successfully decoded at CD3, HARQ-4 generates a local ACK if the data of the fourth stream of the TTI/TFRE is successfully decoded at CD4, and HARQ-4 generates a local NACK if the data of the fourth stream of the TTI/TFRE is not successfully decoded at CD4. For rank 4 downlink transmission/reception, the HARQ ID result for HARQ-ID-1 is ACK only if both HARQ processes HARQ-1 and HARQ-4 generate local ACKs, and the HARQ ID result for HARQ-ID-1 is NACK if either of HARQ processes HARQ-1 or HARQ-4 generate a local NACK. For rank 4 downlink transmission/reception, the HARQ ID result for HARQ-ID-2 is ACK only if both HARQ processes HARQ-2 and HARQ-3 generate local ACKs, and the HARQ ID result for HARQ-ID-2 is NACK if either of HARQ processes HARQ-2 or HARQ-3 generates a local NACK.

One HARQ process HARQ-1 is thus provided for each rank 1 downlink transmission/reception TTI/TFRE using transmission/reception layers DTL1/DRL1. Two HARQ processes HARQ-1 and HARQ-2 are provided for each rank 2 downlink transmission/reception TTI/TFRE using transmission/receptions layers DTL1/DRL1 and DTL2/DRL2. Three HARQ processes HARQ-1, HARQ-2, and HARQ-3 are provided for each rank 3 downlink transmission/reception TTI/TFRE using transmission/receptions layers DTL1/DRL1, DTL2/DRL2, and DTL3/DRL3. Four HARQ processes HARQ-1, HARQ-2, HARQ-3, and HARQ-4 are provided for each rank 4 downlink transmission/reception TTI/TFRE using transmission/receptions layers DTL1/DRL1, DTL2/DRL2, DTL3/DRL3, and DTL4/DRL4. For rank 3 and rank 4 downlink transmission/reception, however, HARQ processes HARQ-2 and HARQ-3 are bundled to the same identification HARQ-ID-2. Similarly, HARQ processes HARQ-1 and HARQ-4 are bundled to the same identification HARQ-ID-1 for rank 4 downlink transmission/reception.

Even though four HARQ processes (HARQ-1, HARQ-2, HARQ-3, and HARQ-4) may be supported at base station processor 101 and wireless terminal processor 201, the downlink control channel may carry information for only two HARQ process identifications (HARQ-ID-1 and HARQ-ID-2). Stated in other words, multiple HARQ processes may be supported by a lesser number of HARQ process IDs. Accordingly, individual HARQ processes may be mapped to the HARQ process identifications of two HARQ codewords in accordance with the table of FIG. 7.

As discussed above, downlink transmission/reception layers DTL2/DRL2 and DTL3/DRL3 and respective HARQ processes HARQ-2 and HARQ-3 are bundled (sharing a same HARQ process identification HARQ-ID-2) for rank 3 and rank 4 downlink transmission/reception, and downlink transmission/reception layers DTL1/DRL1 and DTL4/DRL4 and respective HARQ processes HARQ-1 and HARQ-4 are bundled (sharing a same HARQ process identification HARQ-ID-1) for rank 4 downlink transmission/reception. In addition, bundled transmission/reception layers share a same transport format resource combination (TFRC) defining a same transport block size for each TTI/TFRE for which the transmission/reception layers are bundled.

For rank 3 transmission/reception during a rank 3 TTI/TFRE, transmission/reception layers DTL1/DRL1 are unbundled, and transmission/reception layers DTL2/DRL2 and DTL3/DRL3 are bundled. Accordingly, base station processor 101 may assign a first transport block size TBS1 (responsive to a first transport format resource indictor or TFRI) and a first transmission sequence number TSN-1 to a first transport block TB1. Base station processor 101 may assign a second transport block size TBS2 (responsive to a second transport format resource indicator TFRI) to second and third transport blocks TB2 and TB3, and base station processor 101 may assign respective second and third transmission sequence numbers TSN-2 and TSN-3 to the second and third transport blocks TB2 and TB3. Base station processor 101 may then transmit transport blocks TB1, TB2, and TB3 over respective data transmission layers DTL1, DTL2, and DTL3 (with data transmission layers DTL2 and DTL3 being bundled) during the rank 3 TTI/TFRE, and wireless terminal processor 201 can receive transport blocks TB1, TB2, and TB3 over respective data reception layers DRL1, DRL2, and DRL3 (with data reception layers DRL2 and DRL3 being bundled) during the rank 3 TTI/TFRE. Bundled transport blocks TB2 and TB3 may/should thus have the same block size TBS2, but a block size TBS1 of unbundled transport block TB1 may be determined independently of TBS2 (e.g., TBS1 and TBS2 may be different). Moreover, a different TSN may be assigned to each downlink transport block of the rank 3 TTI/TFRE.

For rank 4 transmission/reception during a rank 4 TTI/TFRE, transmission/reception layers DTL1/DRL1 and DTL4/TRL4 are bundled, and transmission/reception layers DTL2/DRL2 and DTL3/DRL3 are bundled. Accordingly, base station processor 101 may assign a first transport block size TBS1 (responsive to a first transport format resource indicator TFRI) to first and fourth transport blocks TB1 and TB4, and base station processor 101 may assign respective first and fourth transmission sequence numbers TSN-1 and TSN-4 to the first and fourth transport blocks TB1 and TB4. Base station processor 101 may assign a second transport block size TBS2 (responsive to a second transport format resource indicator TFRI) to second and third transport blocks TB2 and TB3, and base station processor 101 may assign respective second and third transmission sequence numbers TSN-2 and TSN-3 to the second and third transport blocks TB2 and TB3. Base station processor 101 may then transmit transport blocks TB1, TB2, TB3, and TB4 over respective data transmission layers DTL1, DTL2, DTL3, and DTL4 (with data transmission layer DTL1 and DTL4 being bundled and with data transmission layers DTL2 and DTL3 being bundled) during the rank 4 TTI/TFRE, and wireless terminal processor 201 can receive transport blocks TB1, TB2, TB3, and TB4 over respective data reception layers DRL1, DRL2, DRL3, and DRL4 (with data reception layers DRL1 and DRL4 being bundled and with data reception layers DRL2 and DRL3 being bundled) during the rank 4 TTI/TFRE. Bundled transport blocks TB1 and TB4 may/should thus have the same block size TBS1, and bundled transport blocks TB2 and TB3 may/should have the same block size TBS2. A block size TBS1 of bundled transport blocks TB1 and TB4, however, may be determined independently of a block size TBS2 of bundled transport blocks TB2 and TB3 (e.g., TBS1 and TBS2 may be different). Moreover, a different TSN may be assigned to each downlink transport block (i.e., TB1, TB2, TB3, and TB4) of the rank 4 TTI/TFRE. Accordingly, different transport blocks sharing a same HARQ process identification during a same TTI/TFRE (also referred to as bundled transport blocks) may/should have the same transport block size.

In addition, each HARQ process may control a redundancy version of each HARQ process identification. In a two HARQ codeword system supporting up to four MIMO transmission/reception layers/ranks, the downlink control channel carries redundancy version information for the two HARQ process identifications. Accordingly, a same redundancy version may/should be applied to bundled transport blocks transmitted/received during a same downlink TTI/TFRE. For example, one of four redundancy versions (i.e., 0, 1, 2, or 3) may be provided with a HARQ process identification to identify whether the associated transport block or blocks is being transmitted a first time (redundancy version 0), a second time (redundancy version 1), a third time (redundancy version 2), or a fourth time (redundancy version 3). For rank 1 downlink transmission/reception, a redundancy version RV may be applied to unbundled transport block TB1. For rank 2 downlink transmission/reception, a first redundancy version RV-1 may be applied to unbundled transport block TB1, a second redundancy version RV-2 may be applied to unbundled transport block TB2, and redundancy versions RV-1 and RV-2 may be determined independently (e.g., RV-1 and RV-2 may be different). For rank 3 downlink transmission/reception, a first redundancy version RV-1 may be applied to unbundled transport block TB1, a second redundancy version RV-2 may be applied to bundled transport blocks TB2 and TB3, and redundancy versions RV-1 and RV-2 may be determined independently (e.g., RV-1 and RV-2 may be different), so that the same redundancy version RV-2 is applied to bundled transport blocks TB2 and TB3. For rank 4 downlink transmission/reception, a first redundancy version RV-1 may be applied to bundled transport blocks TB1 and TB4, a second redundancy version RV-2 may be applied to bundled transport blocks TB2 and TB3, and redundancy versions RV-1 and RV-2 may be determined independently (e.g., RV-1 and RV-2 may be different), so that the same redundancy version RV-1 is applied to bundled transport blocks TB1 and TB4, and so that the same redundancy version RV-2 is applied to bundled transport blocks TB2 and TB3.

In a two HARQ codeword system supporting up to four MIMO transmission/reception layers/ranks, the downlink control channel carries modulation and coding schemes (MCSs) for the two HARQ process identifications. Accordingly, a same modulation and coding scheme may/should be applied to bundled transport blocks transmitted/received during a same downlink TTI/TFRE. For rank 1 downlink transmission/reception, a modulation and coding schemes MCS may be applied to unbundled transport block TB1. For rank 2 downlink transmission/reception, a first modulation and coding schemes MCS-1 may be applied to unbundled transport block TB1, a second modulation and coding schemes MCS-2 may be applied to unbundled transport block TB2, and modulation and coding schemes MCS-1 and MCS-2 may be determined independently (e.g., MCS-1 and MCS-2 may be different). For rank 3 downlink transmission/reception, a first modulation and coding schemes MCS-1 may be applied to unbundled transport block TB1, a second modulation and coding schemes MCS-2 may be applied to bundled transport blocks TB2 and TB3, and modulation and coding schemes MCS-1 and MCS-2 may be determined independently (e.g., MCS-1 and MCS-2 may be different). For rank 4 downlink transmission/reception, a first modulation and coding schemes MCS-1 may be applied to bundled transport blocks TB1 and TB4, a second modulation and coding schemes MCS-2 may be applied to bundled transport blocks TB2 and TB3, and modulation and coding schemes MCS-1 and MCS-2 may be determined independently (e.g., MCS-1 and MCS-2 may be different).

In a 2 HARQ codeword four branch/antenna MIMO system, the uplink control channel (transmitted from wireless terminal 200 to base station 100) may carry ACK/NACK information for each HARQ codeword corresponding to each HARQ process identification in accordance with the mapping of FIG. 9. If an ACK is received at base station processor 101 for a HARQ process identification (or HARQ codeword), the ACK is applied to each transmission layer(s) associated with the HARQ process identification for the TTI/TFRE, and new data may be transmitted on each transmission layer(s) associated with the HARQ process identification. If a NACK is received at base station processor 101 for a HARQ process identification (or HARQ codeword), the NACK is applied to each transmission layer(s) associated with the HARQ process identification and retransmission is performed on each associated transmission layer(s). Stated in other words, an ACK/NACK that is received at base station processor 101 for bundled data transmission layers may be replicated for the bundled transmission layers so that the bundled transmission layers both transmit new data transport blocks responsive to an ACK or retransmit previously transmitted data transport blocks (with a new redundancy version) responsive to a NACK. An ACK or a NACK belonging to a same HARQ process identification may thus be applied to both/all transmission layers associated with the HARQ process identification when transmission layers and/or HARQ processes are bundled.

For rank 1 downlink transmission/reception, wireless terminal processor 201 may transmit an ACK or a NACK for HARQ-ID-1 over an uplink control channel HS-DPCH responsive to transport block TB1 passing or failing decoding at CD1, and base station processor 101 may transmit a new transport block TB1' responsive to an ACK or retransmit the previous transport block TB1 responsive to a NACK.

For rank 2 downlink transmission/reception, wireless terminal processor 201 may transmit an ACK or a NACK for HARQ-ID-1 over an uplink control channel HS-DPCH responsive to transport block TB1 passing or failing decoding at CD1, and wireless terminal processor 201 may transmit an ACK or a NACK for HARQ-ID-2 over the uplink control channel HS-DPCH responsive to transport block TB2 passing or failing decoding at CD2. For rank 2 downlink transmission/reception, base station processor 101 may transmit new transport blocks TB1' and/or TB2' responsive to a respective ACK or ACKs, and/or base station processor 101 may retransmit a previous transport block TB1 and/or TB2 responsive to a respective NACK or NACKs.

For rank 3 downlink transmission/reception, wireless terminal processor 201 may transmit an ACK or a NACK for HARQ-ID-1 over an uplink control channel HS-DPCH responsive to transport block TB1 passing or failing decoding at CD1, and wireless terminal processor 201 may transmit an ACK or a NACK for HARQ-ID-2 over the uplink control channel HS-DPCH responsive to transport blocks TB2/TB3 passing or failing decoding at CD2/CD3 as discussed above with respect to FIG. 9. For rank 3 downlink transmission/reception, base station processor 101 may transmit new transport block TB1' responsive to an ACK associated with HARQ-ID-1, or base station processor 101 may retransmit a previous transport block TB1 responsive to a NACK associated with HARQ-ID-1, For rank 3 downlink transmission/reception, base station processor 101 may transmit new transport blocks TB2' and TB3' responsive to an ACK associated with HARQ-ID-2, or base station processor 101 may retransmit previous transport blocks TB2 and TB3 responsive to a NACK associated with HARQ-ID-2.

For rank 4 downlink transmission/reception, wireless terminal processor 201 may transmit an ACK or a NACK for HARQ-ID-1 over an uplink control channel HS-DPCH responsive to transport blocks TB1/TB4 passing or failing decoding at CD1/CD4 as discussed above with respect to FIG. 9, and wireless terminal processor 201 may transmit an ACK or a NACK for HARQ-ID-2 over the uplink control channel HS-DPCH responsive to transport blocks TB2/TB3 passing or failing decoding at CD2/CD3 as discussed above with respect to FIG. 9. For rank 4 downlink transmission/reception, base station processor 101 may transmit new transport blocks TB1' and TB4' responsive to an ACK associated with HARQ-ID-1, or base station processor 101 may retransmit previous transport blocks TB1 and TB4 responsive to a NACK associated with HARQ-ID-1. For rank 4 downlink transmission/reception, base station processor 101 may transmit new transport blocks TB2' and TB3' responsive to an ACK associated with HARQ-ID-2, or base station processor 101 may retransmit previous transport blocks TB2 and TB3 responsive to a NACK associated with HARQ-ID-2.

During a downlink TTI/TFRE, wireless terminal 200 may thus receive one or more transport data blocks over respective downlink layers as well as respective downlink signaling such as HARQ ID(s), data indicator(s), redundancy version(s), etc. Because fewer HARQ IDs than data reception layers may be supported according to some embodiments (e.g., only two HARQ IDs may be supported in four branch/antenna MIMO systems), HARQ ID(s), data indicator(s), redundancy version(s), transport block size(s), modulation and coding scheme(s), etc. may be mapped to multiple data receptions layers when the number of reception layers exceeds the supported number of HARQ ID(s). In a four branch/antenna MIMO system, for example, HARQ ID(s), data indicator(s), redundancy version(s), transport block size(s), modulation and coding scheme(s), etc., may be mapped to data reception layers DRL1, DRL2, DRL3, and DRL4 and respective soft buffers SB1, SB2, SB3, and SB4 as discussed above with respect to FIGS. 7 and 8.

For rank 1 reception, HARQ-ID-1 (and respective data indicator(s), redundancy version(s), transport block size(s), modulation and coding scheme(s), etc.) is/are mapped to data reception layer DRL1 and soft buffer SB1. For rank 2 reception, HARQ-ID-1 (and respective data indicator(s), redundancy version(s), transport block size(s), modulation and coding scheme(s), etc.) is/are mapped to data reception layer DRL1 and soft buffer SB1, and HARQ-ID-2 (and respective data indicator(s), redundancy version(s), transport block size(s), modulation and coding scheme(s), etc.) are mapped to data reception layer DRL2 and soft buffer SB2. For rank 3 reception, HARQ-ID-1 (and respective data indicator(s), redundancy version(s), transport block size(s), modulation and coding scheme(s), etc.) is/are mapped to data reception layer DL1 and soft buffer SB1, and HARQ-ID-2 (and respective data indicator(s), redundancy version(s), transport block size(s), modulation and coding scheme(s), etc.) is/are mapped to bundled data reception layers DRL2 and DRL3 and bundled soft buffers SB2 and SB3. For rank 4 reception, HARQ-ID-1 (and respective data indicator(s), redundancy version(s), transport block size(s), modulation and coding scheme(s), etc.) is/are mapped to bundled data reception layers DRL1 and DRL4 and bundled soft buffers SB1 and SB4, and HARQ-ID-2 (and respective data indicator(s), redundancy version(s), transport block size(s), modulation and coding scheme(s), etc.) is/are mapped to bundled data reception layer DRL2 and DRL3 and bundled soft buffers SB2 and SB3.

Accordingly, data reception layers DRL2 and DRL3 and respective soft buffers SB2 and SB3 may be bundled during rank 3 and rank 4 TTIs/TFREs, and data reception layers DRL1 and DRL4 and respective soft buffers SB1 and SB4 may be bundled during rank 4 TTIs/TFREs. For bundled data reception layers (e.g., DRL2 and DRL3 during rank 3 and rank 4 TTIs/TFREs, and DRL1 and DRL4 during rank 4 TTIs/TFREs), a same transport block size, a same modulation and coding scheme, a same redundancy version, and a same data indicator are used for the bundled data reception layers. Accordingly, both soft buffers of the bundled data reception layers are either cleared if the bundled data indicator indicates receipt of new data, or both soft buffers of the bundled data reception layers are maintained for combining with retransmitted data if the bundled data indictor indicates receipt of a retransmission. Moreover, wireless terminal processor 101 may map HARQ process ACK/NACK results to HARQ process IDs as discussed above with respect to FIG. 9.

Some embodiments of present inventive concepts may provide mechanisms to choose two transport blocks for two HARQ codewords in four antenna/branch MIMO systems. Some embodiments of present inventive concepts may provide mechanisms to map transport blocks to HARQ processes and/or identifications, and/or to choose two transport blocks for two codeword MIMO in four antenna/branch MIMO systems. Some embodiments of present inventive concepts may provide mechanisms to map HARQ ACKs/NACKs to HARQ process IDs in four antenna/branch MIMO systems. Some embodiments of present inventive concepts may provide mechanisms to map soft buffers to two HARQ process IDs in four branch/antenna MIMO systems.

A HARQ identification (e.g., HARQ-ID-1 or HARQ-ID-2) may be used to support downlink transmissions/retransmissions from base station 100 to wireless terminal 200, and two HARQ identifications may support HARQ ACK/NACK signaling for 4 antenna MIMO systems supporting up to 4 layer/stream downlink transmissions (and/or higher antenna systems supporting higher rank/layer transmissions). For rank 1 transmissions, first HARQ identification HARQ-ID-1 maps to a first transmission/reception layer (e.g., including TB1, CE1, IM1, DM1, SB1, and/or CD1). For rank 2 transmissions, first HARQ identification HARQ-ID-1 maps to the first transmission/reception layer, and second HARQ identification HARQ-ID-2/maps to a second transmission/reception layer (e.g., including TB2, CE2, IM2, DM2, SB2, and/or CD2). For rank 3 transmissions, first HARQ identification HARQ-ID-1 maps to the first transmission/reception layer, and second HARQ identification HARQ-ID-2 maps to the second transmission/reception layer and to a third transmission/reception layers (e.g., including TB3, CE3, IM3, DM3, SB3, and/or CD3). For rank 4 transmissions, first HARQ identification HARQ-ID-1 maps to the first transmission/reception layer and to a fourth transmission/reception layer (e.g., including TB4, CE4, IM4, DM4, SB4, and/or CD4), and second HARQ identification HARQ-ID-2 maps to the second and third transmission/reception layers.

Because of the delay between base station 100 transmitting a first data block(s) to wireless terminal 200 during a first downlink TTI/TFRE and receiving a HARQ ACK/NACK response(s) for the first data block(s) from wireless terminal 200, second data block(s) may be transmitted to wireless terminal 200 during a second downlink TTI/TFRE before receiving the HARQ ACK/NACK response(s) for the first data block(s). Accordingly, different HARQ process identifications may be used by base station 100 to distinguish between different HARQ ACK/NACK responses for different data blocks of different downlink TTIs/TFREs transmitted to the same wireless terminal 200. Stated in other words, HARQ process identifications may be used to match HARQ ACK/NACK responses with the appropriate data block(s) and TTI/TFRE. HARQ process identifications may also be used by wireless terminal 100 to match the data block/blocks with the appropriate soft bits from respective soft buffer/buffers.

A same HARQ process identification may thus be used for the initial transmission and for each retransmission of a data block/blocks to wireless terminal 200 until either the data block/blocks is/are successfully received/decoded by wireless terminal 200 (as indicated by an ACK) or until a maximum allowed number of retransmissions have occurred. Once the data block/blocks have been successfully received/decoded or a maximum number of retransmissions has occurred, the HARQ process identification for the data block/blocks may be destroyed, meaning that the HARQ process identification may then be reused for a new data block/blocks.

According to some embodiments, a value for a HARQ process identification may be selected from one of eight values (e.g., 1, 2, 3, 3, 5, 6, 7, or 8). For rank 1, 2, and 3 downlink transmissions to wireless terminal 200, HARQ process identification HARQ-ID-1_a is mapped to local HARQ process HARQ-1 for layer 1 transmission using the first transmission/reception layer (e.g., including TB1, CE1, IM1, DM1, SB1, and/or CD1). For rank 4 downlink transmissions to wireless terminal, HARQ process identification HARQ-ID-1 is mapped to local HARQ processes HARQ-1 and HARQ-4 for layer 1 and 4 transmissions using the first and fourth transmission/reception layers. For rank 2 downlink transmissions to wireless terminal 200, HARQ process identification HARQ-ID-2 is mapped to local HARQ process HARQ-2 for layer 2 transmission using the second transmission/reception layer. For rank 3 and 4 downlink transmissions to wireless terminal, HARQ process identification HARQ-ID-2 is mapped to local HARQ processes HARQ-2 and HARQ-3 for layer 2 and 3 transmissions using the second and third transmission/reception layers. Accordingly, HARQ process identification HARQ-ID-1 is used for rank 1, 2, 3, and 4 transmissions, and HARQ process identification HARQ-ID-2 is used for rank 2, 3, and 4 transmissions.

For an initial rank 1 transmission of a data block, a currently unused identification value (e.g., selected from 1-8) is assigned to HARQ-ID-1 for local HARQ process HARQ-1, and HARQ-ID-1 is used to identify the instance of HARQ-1 that is applied to transmissions/retransmissions of the layer 1 data block and that is applied to HARQ ACK/NACK responses corresponding to the layer 1 data block.

For an initial rank 2, 3, or 4 transmission of data blocks using both HARQ process identifications HARQ-ID-1 and HARQ-ID-2 during a same TTI/TFRE, a currently unused identification value (e.g., selected from 1-8) is assigned to HARQ-ID-1, and another identification value is assigned to HARQ-ID-2 (e.g., as a function of H_a). Accordingly, HARQ-ID-1_a is used to identify the instance of HARQ-1/HARQ-4 that is applied to transmissions/retransmissions of layer 1/4 data block/blocks (for layer 1 and/or 4 transmissions/retransmissions) and that is applied to HARQ ACK/NACK responses corresponding to the layer 1/4 data blocks, and HARQ-ID-2 is used to identify the instance of HARQ-2/HARQ-3 that is applied to transmissions/retransmissions of the layer 2/3 data block/blocks (for layer 2 and/or 3 transmissions/retransmissions) and that is applied to HARQ ACK/NACK responses corresponding to the layer 2/3 data block/blocks.

According to some embodiments, a value of HARQ process identification HARQ-ID-2 may be assigned as a function of a value of the corresponding HARQ process identification HARQ-ID-1. With eight different HARQ process identification values from one to eight, for example, identification HARQ-ID-2 may be assigned according to the following formula:

$$HARQ\text{-}ID\text{-}2 = (HARQ\text{-}ID\text{-}1 + N/2) \bmod(N),$$

where N is the number of HARQ process identifications as configured by higher layers and/or by the radio network controller. With two HARQ process identifications and eight different HARQ process identification values, identification HARQ-ID-2 may be selected as a function of HARQ-ID-1 according to the following table:

| HARQ-ID-1 | HARQ-ID-2 |
|---|---|
| 1 | 5 |
| 2 | 6 |
| 3 | 7 |
| 4 | 8 |
| 5 | 1 |
| 6 | 2 |
| 7 | 3 |
| 8 | 4 |

Accordingly, only one of the HARQ process identifications (e.g., HARQ-ID-1) may need to be transmitted between base station 100 and wireless terminal 200, with the other HARQ process identification (e.g., HARQ-ID-2) being derived at the receiving device using HARQ-ID-1.

If the Node B (base station) schedules three transport blocks in any transmission (i.e., rank 3), for retransmissions, the second transport block and the third transport block are retransmitted with the same HARQ process identifier (that was shared by the second and third transport blocks for the initial transmission) as discussed above. If the Node B schedules four transport blocks in any transmission, for retransmissions, the primary transport block and the fourth transport block are re-transmitted with the same HARQ process identifier (that was shared by the primary and fourth transport blocks for the initial transmission), and the second and third transport blocks are re-transmitted with the same HARQ process identifier (that was shared by the second and third transport blocks for the initial transmission), as discussed above.

Operations of base station 100 (including base station processor 101 and base station transceiver 109) communicating with wireless terminal 200 are discussed in greater detail below with respect to FIGS. 10 and 11A-D. As shown in FIG. 10, base station processor 101 may wait at block 1001 until data is available for downlink transmission to wireless terminal 200 at block 1001, and base station processor 101 may determine at block 1003 a transmission rank and if the available data for the downlink transmission is for initial transmission and/or retransmission based on ACK/NACK and CQI feedback received from the wireless terminal. By way of example, one data block may be available for a rank 1 downlink transmission over a first DL transmission/reception layer, and the one data block may be for an initial transmission or for a retransmission. For a rank 2 DL transmission over first and second DL transmission/reception layers, a first data block may be available for initial transmission or retransmission over the first DL transmission/reception layer, and a second data block may be available for initial transmission or retransmission over the second DL transmission/reception layer. For rank 1 and rank 2 DL transmission/reception, a HARQ process and a HARQ process identification is mapped directly to only one data block and transmission layer.

For rank 3 and rank 4 DL transmission/reception, however, a HARQ process and a HARQ process identification may map to more than one data block and transmission layer. For a rank 3 DL transmission over first, second, and third DL transmission/reception layers, a first data block may be available for initial transmission or retransmission over the first DL transmission/reception layer, a second data block may be available for initial transmission or retransmission over the second DL transmission/reception layer, and a third data block may be available for initial transmission or retransmission over the third DL transmission/reception layer. Because the second and third data blocks and transmission/reception layers share a HARQ process and a HARQ process identification ID for a rank 3 transmission, the second and third data blocks are either both initial transmissions or both retransmissions. For a rank 4 DL transmission over first, second, third, and fourth DL transmission/reception layers, a first data block may be available for initial transmission or retransmission over the first DL transmission/reception layer, a second data block may be available for initial transmission or retransmission over the second DL transmission/reception layer, a third data block may be available for initial transmission or retransmission over the third DL transmission/reception layer, and a fourth data block may be available for initial transmission or retransmission over the fourth DL transmission/reception layer. Because the first and fourth data blocks and transmission/reception layers share a first HARQ process and a first HARQ process identification ID for a rank 4 transmission and because the second and third data blocks and transmission/reception layers share a second HARQ process and a second HARQ process identification ID for a rank 4 transmission, the first and fourth data blocks are either both initial transmissions or both retransmissions, and the second and third data blocks are either both initial transmissions or both retransmissions.

Based on the transmission rank for the DL transmission/retransmission, base station processor 101 may select operations at block 1007 according to rank 1 at block 1009, rank 2 at block 1011, rank 3 at block 1013, or rank 4 at block 1015. For rank 1 operations at block 1009, base station processor 101 may proceed with operations of FIG. 11A. For rank 2 operations at block 1011, base station processor 101 may proceed with operations of FIG. 11B. For rank 3 operations at block 1013, base station processor 101 may proceed with operations of FIG. 11C. For rank 4 operations at block 1015, base station processor 101 may proceed with operations of FIG. 11D.

Base station 100 operations for rank 1 transmission are discussed in greater detail below with respect to FIG. 11A for transmission of a data block over a MIMO transmission layers (e.g., MIMO transmission/reception layer 1) for a rank 1 TTI. More particularly: blocks 1101, 1103, and 1105 relate to the initial transmission of new data using one data block over one MIMO transmission layer; and blocks 1011, 1013, and 1015 relate to the retransmission of previously transmitted data using the data block over the MIMO transmission layer.

If the data block of the rank 1 DL transmission is for an initial transmission of data at block 1100, processor 101 may assign a new value for the first HARQ process HARQ-ID-1 at block 1101, determine an initial redundancy version (indicating an initial transmission) for the first HARQ process ID HARQ-ID-1 at block 1103, and determine a transport block size TBS, a transport sequence number TSN, and a modulation/coding scheme MCS for the data block at block 1105. The transport block size and the modulation/coding scheme may be determined for the data block and MIMO layer responsive to CQI feedback provided by wireless terminal 200, and the transport sequence number for the data block may be used to indicate an order of the data block in the stream of data blocks transmitted to the wireless terminal 200. If the data block of the rank 2 DL transmission is for a retransmission at block 1100, processor 101 may reuse the previous value for the first HARQ process HARQ-ID-1 at block 1011, increment the redundancy version (indicating a retransmission) for the first HARQ process ID HARQ-ID-1 at block 1013, and reuse the transport block size TBS, transport sequence number TSN, and modulation/coding scheme MCS for the data block at block 1015. For retransmissions, the modulation/coding scheme MCA, the transport block size TBS, and the transport sequence number are reused from the previous transmission to support retransmission of the same data of the data block over the first MIMO layer to wireless terminal 200.

At block 1017, base station processor 101 transmits the downlink signaling for the data block through transceiver 109 to wireless terminal 200 for a transmission time interval TTI, with the downlink signaling including the modulation/coding scheme, transport block size, HARQ process ID, redundancy version, and transport sequence number for the data block. At block 1018, base station processor 101 transmits the first data block over the MIMO layer for the transmission time interval TTI. The data block is thus transmitted using the first HARQ process ID over the first MIMO layer in accordance with the modulation/coding scheme and the first transport block size.

Once the data block is initially transmitted over the first MIMO layer during an initial TTI using the first HARQ process ID, the modulation/coding scheme MCS, the transport block size TBS, and the transport sequence number TSN, if a NACK is received for HARQ-ID-1, the data block including the same data is retransmitted during subsequent TTI(s) using the same modulation/coding scheme MCS, the same transport block size TBS, and the same transport sequence number TSN until either an ACK for HARQ-ID-1 is received from wireless terminal 200 (indicating successful decoding of the first data block) or a maximum number of retransmissions has been attempted. To track the number of transmissions/retransmissions, the redundancy version for the data block is incremented for each retransmission.

Figure 11B:
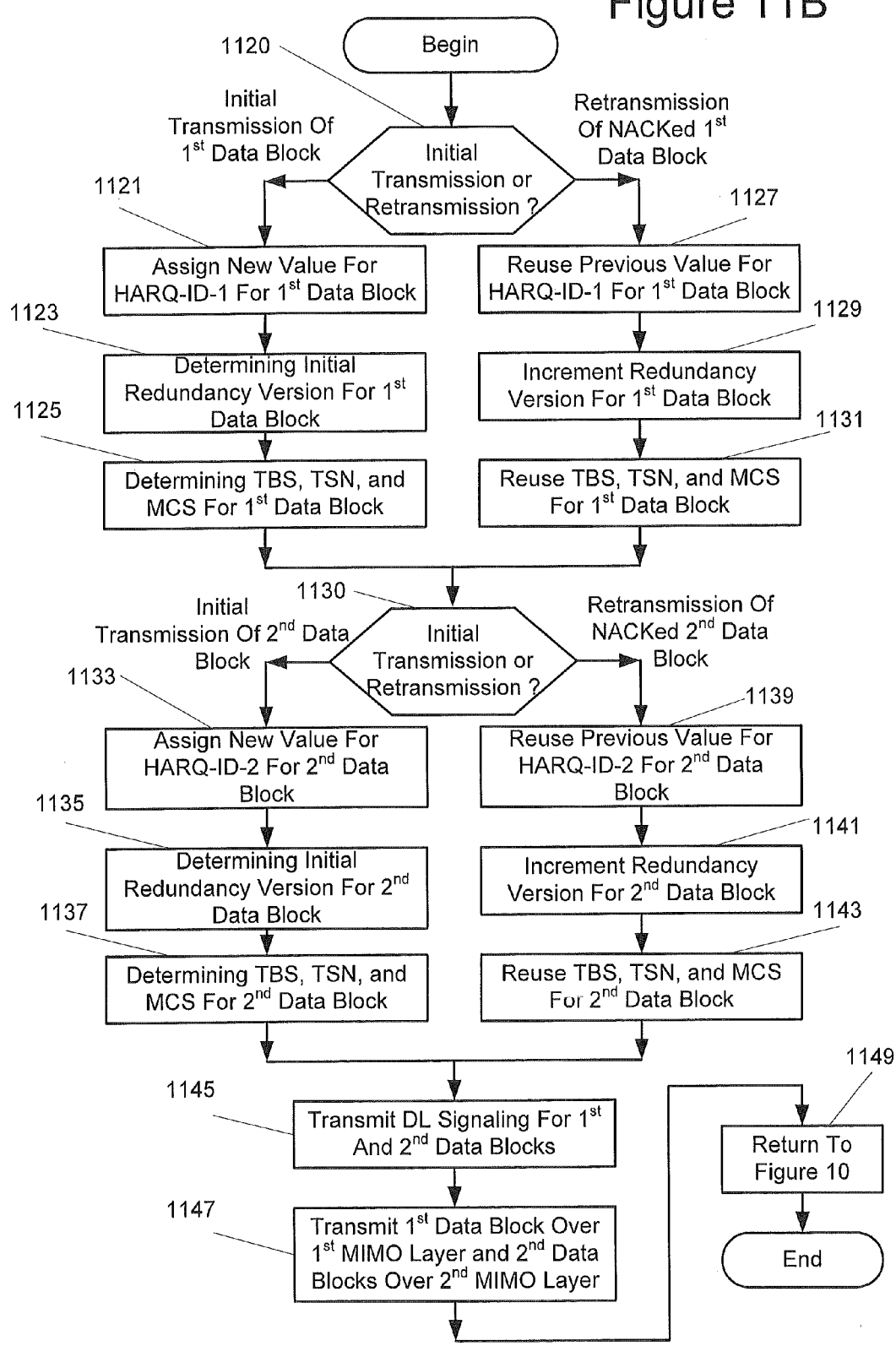

Base station 100 operations for rank 2 transmission are discussed in greater detail below with respect to FIG. 11B for transmission of first and second data blocks over respective first and second MIMO transmission layers for a rank 2 TTI. More particularly: blocks 1121, 1123, and 1125 relate to the initial transmission of new data using a first data block over the first MIMO transmission layer; blocks 1127, 1129, and 1131 relate to the retransmission of previously transmitted data using the first data block over the first MIMO transmission layer; blocks 1133, 1135, and 1137 relate to the initial transmission of new data using the second data block over the second MIMO transmission layers; and blocks 1139, 1141, and 1143 relate to the retransmission of previously transmitted data using the second data block over the second MIMO transmission layer.

If the first data block of the rank 2 DL transmission is for an initial transmission of data at block 1120, processor 101 may assign a new value for the first HARQ process HARQ-ID-1 at block 1121, determine an initial redundancy version (indicating an initial transmission) for the first HARQ process ID HARQ-ID-1 at block 1123, and determine a transport block size TBS, a transport sequence number TSN, and a modulation/coding scheme MCS for the first data block at block 1125. The transport block size and the modulation/coding scheme may be determined for the first data block and first MIMO layer responsive to CQI feedback provided by wireless terminal 200, and the transport sequence number for the first data block may be used to indicate an order of the first data block in the stream of data blocks transmitted to the wireless terminal 200. If the first data block of the rank 2 DL transmission is for a retransmission at block 1120, processor 101 may reuse the previous value for the first HARQ process HARQ-ID-1 at block 1127, increment the redundancy version (indicating a retransmission) for the first HARQ process ID HARQ-ID-1 at block 1129, and reuse the transport block size TBS, transport sequence number TSN, and modulation/coding scheme MCS for the first data block at block 1131. For retransmissions, the modulation/coding scheme MCA, the transport block size TBS, and the transport sequence number are reused from the previous transmission to support retransmission of the same data of the first data block over the first MIMO layer to wireless terminal 200.

If the second data block of the rank 2 DL transmission is for an initial transmission of data at block 1130, processor 101 may assign a new value for the second HARQ process HARQ-ID-2 at block 1133, determine an initial redundancy version (indicating an initial transmission) for the second HARQ process ID HARQ-ID-2 at block 1135, and determine a transport block size TBS, a transport sequence number TSN, and a modulation/coding scheme MCS for the second data block at block 1137. The transport block size and the modulation/coding scheme may be determined for the second data block and second MIMO layer responsive to CQI feedback provided by wireless terminal 200, and the transport sequence number for the second data block may be used to indicate an order of the second data block in the stream of data blocks transmitted to the wireless terminal 200. If the second data block of the rank 2 DL transmission is for a retransmission at block 1130, processor 101 may reuse the previous value for the second HARQ process HARQ-ID-2 at block 1139, increment the redundancy version (indicating a retransmission) for the second HARQ process ID HARQ-ID-2 at block 1141, and reuse the transport block size TBS, transport sequence number TSN, and modulation/coding scheme MCS for the second data block at block 1143. For retransmissions, the modulation/coding scheme MCA, the transport block size TBS, and the transport sequence number are reused from the previous transmission to support retransmission of the same data of the second data block over the second MIMO layer to wireless terminal 200.

For rank two transmissions, a first modulation/coding scheme, a first transport block size, and a first HARQ process ID may be used for the first data block transmitted/retransmitted over the first MIMO layer, and a second modulation/coding scheme, a second transport block size, and a second HARQ process ID may be used for the second data block transmitted/retransmitted over the second MIMO layer. The first and second modulation/coding schemes and the first and second transport block sizes may be the same or different. For rank twp transmissions, different first and second transport sequence numbers may be used for the respective first and second data blocks so that separate ordering information is provided for each data block allowing the wireless terminal to reassemble each data block in a correct order of the stream of data blocks.

At block 1145, base station processor 101 transmits the downlink signaling for the first and second data blocks through transceiver 109 to wireless terminal 200 for a transmission time interval TTI, with the downlink signaling including the modulation/coding schemes, transport block sizes, HARQ process IDs, redundancy versions, and transport sequence numbers for the first and second data blocks. At block 1147, base station processor 101 transmits the first and second data blocks over the first and second MIMO layers, respectively, for the transmission time interval TTI. The first data block is thus transmitted using the first HARQ process ID over the first MIMO layer in accordance with the first modulation/coding scheme and the first transport block size, and the second data block is transmitted using the second HARQ process ID over the second MIMO layer in accordance with the second modulation/coding scheme, and the second transport block size. A different transport sequence number is provided for each of the first and second data blocks of a rank 2 transmission (during a rank 2 TTI) to support ordering thereof to facilitate recreation of a data stream at wireless terminal 200.

Once a first data block is initially transmitted over the first MIMO layer during an initial TTI using the first HARQ process ID, the first modulation/coding scheme MCS, the first transport block size TBS, and the first transport sequence number TSN, if a NACK is received for HARQ-ID-1, the first data block including the same data is retransmitted during subsequent TTI(s) using the same first modulation/coding scheme MCS, the same first transport block size TBS, and the same first transport sequence number TSN until either an ACK for HARQ-ID-1 is received from wireless terminal 200 (indicating successful decoding of the first data block) or a maximum number of retransmissions has been attempted. To track the number of transmissions/retransmissions, the redundancy version for the first data block is incremented for each retransmission.

Once a second data block is initially transmitted over the second MIMO layer during the initial TTI using the second HARQ process ID, the second modulation/coding scheme MCS, the second transport block size TBS, and the respective transport sequence numbers, if a NACK is received for HARQ-ID-2, the second data block (including the same data as before) is retransmitted during subsequent TTIs using the same second modulation/coding scheme MCS, the same second transport block size TBS, and the same second transport sequence number until either an ACK is received from wireless terminal 200 (indicating successful decoding of the second data block) or a maximum number of retransmissions has been attempted. To track the number of transmissions/retransmissions, the redundancy version for the second and third data blocks is incremented for each transmission/retransmission.

Figure 11C:
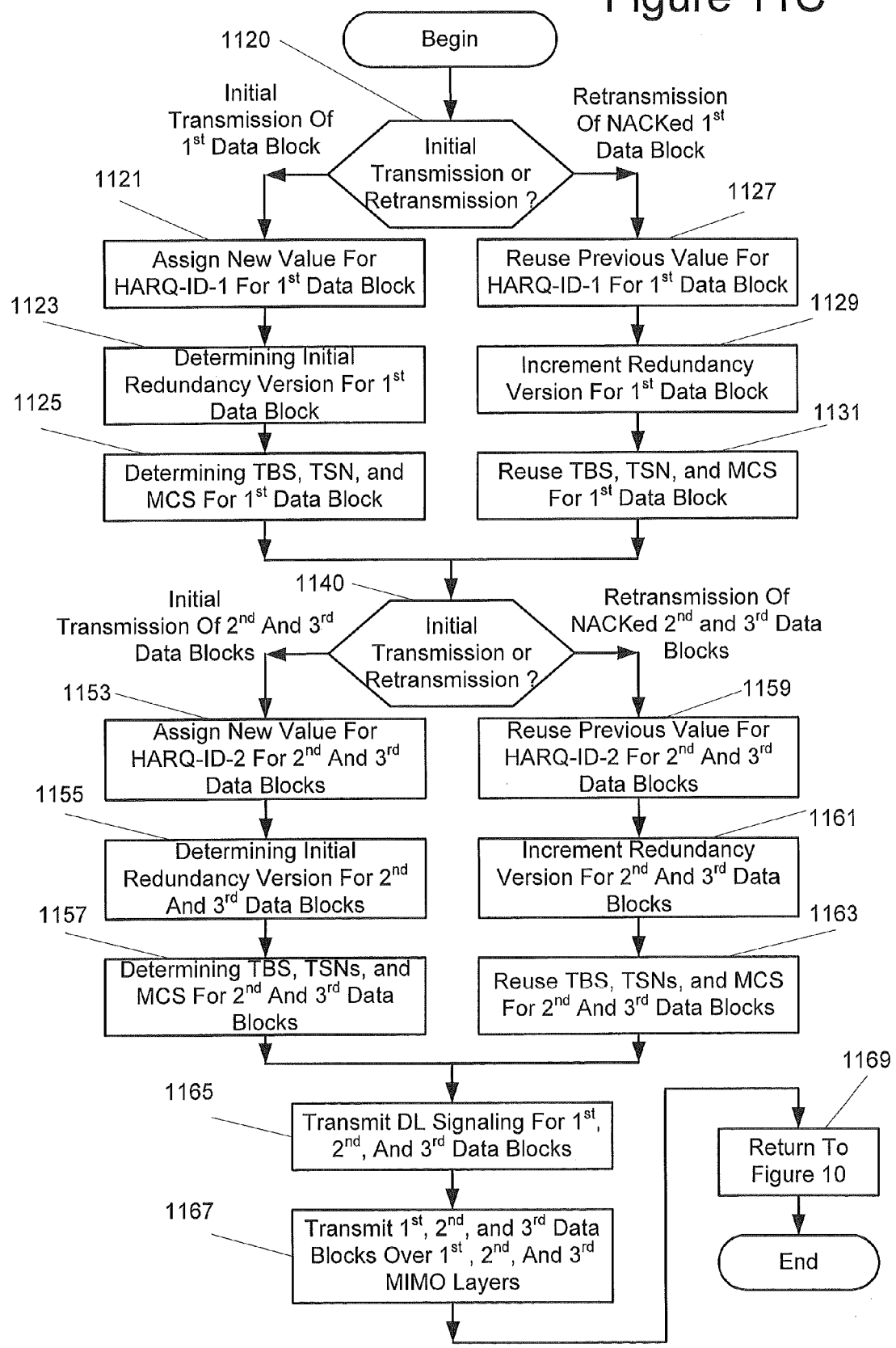

Base station 100 operations for rank 3 transmission are discussed in greater detail below with respect to FIG. 11C for transmission of first, second, and third data blocks over respective first, second, and third MIMO transmission layers. More particularly: blocks 1121, 1123, and 1125 relate to the initial transmission of new data using a first data block over the first MIMO transmission layer; blocks 1127, 1129, and 1131 relate to the retransmission of previously transmitted data using the first data block over the first MIMO transmission layer; blocks 1153, 1155, and 1157 relate to the initial transmission of new data using second and third data blocks over the second and third MIMO transmission layers, respectively; and blocks 1159, 1161, and 1163 relate to the retransmission of previously transmitted data using the second and third data blocks over the second and third MIMO transmission layers, respectively.

If the first data block of the rank 3 DL transmission is for an initial transmission of data at block 1120, processor 101 may perform operations of blocks 1121, 1123, and 1125 as discussed above with respect to the similar blocks of FIG. 11B. If the first data block of the rank 3 DL transmission is for a retransmission at block 1120, processor 101 may perform operations of blocks 1127, 1129, and 1131 as discussed above with respect to the similar blocks of FIG. 11B.

If the second and third data blocks of the rank 3 DL transmission are for initial transmissions of data at block 1140, processor 101 may assign a new value for the second HARQ process HARQ-ID-2 (mapped to the second and third MIMO layers) at block 1153, determine an initial redundancy version (indicating an initial transmission) for the second HARQ process ID HARQ-ID-2 at block 1155, and determine a transport block size TBS, transport sequence numbers TSNs, and a modulation/coding scheme MCS for the second and third data blocks at block 1157. The same transport block size and the same modulation/coding scheme may be determined for the second and third data blocks and second and third MIMO layer responsive to CQI feedback provided by wireless terminal 200, but different transport sequence numbers are determined for the second and third data blocks to indicate an order thereof in the stream of data blocks transmitted to the wireless terminal 200. If the second and third data blocks of the rank 3 DL transmission are for a retransmission of data at block 1140, processor 101 may reuse the previous value for the second HARQ process HARQ-ID-2 (mapped to the second and third MIMO layers) at block 1159, increment the initial redundancy version (indicating a retransmission) for the second HARQ process ID HARQ-ID-2 at block 1161, and reuse the transport block size TBS, transport sequence numbers TSNs, and a modulation/coding scheme MCS for the second and third data blocks at block 1163. For retransmissions, the modulation/coding scheme MCS, the transport block size TBS, and the transport sequence numbers are reused from the previous transmission to support retransmission of the same data of the second and third data blocks over the first MIMO layer to wireless terminal 200.

For rank three transmissions, a first modulation/coding scheme, a first transport block size, and a first HARQ process ID may be used for the first data block transmitted/retransmitted over the first MIMO layer, and a second modulation/coding scheme, a second transport block size, and a second HARQ process ID may be used for the second and third data blocks transmitted/retransmitted over the second and third MIMO layers. The first and second modulation/coding schemes and the first and second transport block sizes may be the same or different. For rank three transmissions, different first, second, and third transport sequence numbers may be used for the respective first, second, and third data blocks so that separate ordering information is provided for each data block allowing the wireless terminal to reassemble each data block in a correct order of the stream of data blocks.

At block 1165, base station processor 101 transmits the downlink signaling for the first, second, and third data blocks through transceiver 109 to wireless terminal 200 for a transmission time interval TTI, with the downlink signaling including the modulation/coding schemes, transport block sizes, HARQ process IDs, redundancy versions, and transport sequence numbers for the first, second, and third data blocks. At block 1167, base station processor 101 transmits the first, second, and third data blocks over the first, second, and third MIMO layers, respectively, for the transmission time interval TTI. The first data block is thus transmitted using the first HARQ process ID over the first MIMO layer in accordance with the first modulation/coding scheme and the first transport block size, and the second and third data blocks are transmitted using the second HARQ process ID over the second and third MIMO layers in accordance with the second modulation/coding scheme and the second transport block size. A different transport sequence number, however, is provided for each of the first, second, and third data blocks of a rank 3 transmission (during a rank 3 TTI) to support ordering thereof to facilitate recreation of a data stream at wireless terminal 200.

Once a first data block is initially transmitted over the first MIMO layer during an initial TTI using the first HARQ process ID, the first modulation/coding scheme MCS, the first transport block size TBS, and the first transport sequence number TSN, if a NACK is received for HARQ-ID-1, the first data block including the same data is retransmitted during subsequent TTI(s) using the same first modulation/coding scheme MCS, the same first transport block size TBS, and the same first transport sequence number TSN until either an ACK for HARQ-ID-1 is received from wireless terminal 200 (indicating successful decoding of the first data block) or a maximum number of retransmissions has been attempted. To track the number of transmissions/retransmissions, the redundancy version for the first data block is incremented for each retransmission.

Once second and third data blocks are initially transmitted over the second and third MIMO layers during the initial TTI using the second HARQ process ID, the second modulation/coding scheme MCS, the second transport block size TBS, and the respective transport sequence numbers, if a NACK is received for HARQ-ID-2, the second and third data blocks (including the same data as before) are retransmitted during subsequent TTIs using the same second modulation/coding scheme MCS, the same second transport block size TBS, and the same second transport sequence numbers until either an ACK is received from wireless terminal 200 (indicating successful decoding of both of the second and third data blocks) or a maximum number of retransmissions has been attempted. To track the number of transmissions/retransmissions, the redundancy version for the second and third data blocks is incremented for each transmission/retransmission.

Base station 100 operations for rank 4 transmission are discussed in greater detail below with respect to FIG. 11D for transmission of first, second, third, and fourth data blocks over respective first, second, third, and fourth MIMO transmission layers. More particularly: blocks 1181, 1183, and 1185 relate to the initial transmission of new data using a first and fourth data blocks over the first and fourth MIMO transmission layers; blocks 1187, 1189, and 1191 relate to the retransmission of previously transmitted data using the first and fourth data blocks over the first and fourth MIMO transmission layers; blocks 1153, 1155, and 1157 relate to the initial transmission of new data using second and third data blocks over the second and third MIMO transmission layers, respectively; and blocks 1159, 1161, and 1163 relate to the retransmission of previously transmitted data using the second and third data blocks over the second and third MIMO transmission layers, respectively.

If the first and fourth data blocks of the rank 4 DL transmission are for an initial transmission of data at block 1160, processor 101 may assign a new value for the first HARQ process HARQ-ID-1 at block 1181, determine an initial redundancy version (indicating an initial transmission) for the first HARQ process ID HARQ-ID-1 at block 1183, and determine a transport block size TBS, a transport sequence number TSN, and a modulation/coding scheme MCS for the first data block at block 1185. The transport block size and the modulation/coding scheme may be determined for the first and fourth data blocks and first and fourth MIMO layers responsive to CQI feedback provided by wireless terminal 200, and the transport sequence numbers for the first and fourth data blocks may be used to indicate an order of the first and fourth data blocks in the stream of data blocks transmitted to the wireless terminal 200. If the first and fourth data blocks of the rank 4 DL transmission are for a retransmission at block 1160, processor 101 may reuse the previous value for the first HARQ process HARQ-ID-1 at block 1187, increment the redundancy version (indicating a retransmission) for the first HARQ process ID HARQ-ID-1 at block 1189, and reuse the transport block size TBS, transport sequence numbers TSNs, and modulation/coding scheme MCS for the first and fourth data blocks at block 1191. For retransmissions, the modulation/coding scheme MCA, the transport block size TBS, and the transport sequence numbers are reused from the previous transmission to support retransmission of the same data of the first and fourth data blocks over the first and fourth MIMO layers to wireless terminal 200.

If the second and third data blocks of the rank 4 DL transmission are for initial transmissions of data at block 1140, processor 101 may perform operations of blocks 1153, 1155, and 1157 as discussed above with respect to the similar blocks of FIG. 11C. If the second and third data blocks of the rank 4 DL transmission are for a retransmission of data at block 1140, processor 101 may perform operations of blocks 1159, 1161, and 1163 as discussed above with respect to the similar blocks of FIG. 11C.

For rank four transmissions, a first modulation/coding scheme, a first transport block size, and a first HARQ process ID may be used for the first and fourth data blocks transmitted/retransmitted over the first and fourth MIMO layers, and a second modulation/coding scheme, a second transport block size, and a second HARQ process ID may be used for the second and third data blocks transmitted/retransmitted over the second and third MIMO layers. The first and second modulation/coding schemes and the first and second transport block sizes may be the same or different. For rank four transmissions, different first, second, third, and fourth transport sequence numbers may be used for the respective first, second, third, and fourth data blocks so that separate ordering information is provided for each data block allowing the wireless terminal to reassemble each data block in a correct order of the stream of data blocks.

At block 1195, base station processor 101 transmits the downlink signaling for the first, second, third, and fourth data blocks through transceiver 109 to wireless terminal 200 for a transmission time interval TTI, with the downlink signaling including the modulation/coding schemes, transport block sizes, HARQ process IDs, redundancy versions, and transport sequence numbers for the first, second, third, and fourth data blocks. At block 1197, base station processor 101 transmits the first, second, third, and fourth data blocks over the first, second, third, and fourth MIMO layers, respectively, for the transmission time interval TTI. The first and fourth data blocks are thus transmitted using the first HARQ process ID over the first and fourth MIMO layers in accordance with the first modulation/coding scheme and the first transport block size, and the second and third data blocks are transmitted using the second HARQ process ID over the second and third MIMO layers in accordance with the second modulation/coding scheme and the second transport block size. A different transport sequence number, however, is provided for each of the first, second, third, and fourth data blocks of a rank 4 transmission (during a rank 4 TTI) to support ordering thereof to facilitate recreation of a data stream at wireless terminal 200.

Once first and fourth data blocks are initially transmitted over the first and fourth MIMO layers during an initial TTI using the first HARQ process ID, the first modulation/coding scheme MCS, the first transport block size TBS, and the respective transport sequence numbers, if a NACK is received for HARQ-ID-1, the first and fourth data blocks including the same data are retransmitted during subsequent TTI(s) using the same first modulation/coding scheme MCS, the same first transport block size TBS, and the same transport sequence numbers until either an ACK for HARQ-ID-1 is received from wireless terminal 200 (indicating successful decoding of the first and fourth data blocks) or a maximum number of retransmissions has been attempted. To track the number of transmissions/retransmissions, the redundancy version for the first and fourth data blocks is incremented for each retransmission.

Once second and third data blocks are initially transmitted over the second and third MIMO layers during the initial TTI using the second HARQ process ID, the second modulation/coding scheme MCS, the second transport block size TBS, and the second and third transport sequence numbers, if a NACK is received for HARQ-ID-2, the second and third data blocks (including the same data as before) are retransmitted during subsequent TTIs using the same second modulation/coding scheme MCS, the same second transport block size TBS, and the same second transport sequence numbers until either an ACK is received from wireless terminal 200 (indicating successful decoding of both of the second and third data blocks) or a maximum number of retransmissions has been attempted. To track the number of transmissions/retransmissions, the redundancy version for the second and third data blocks is incremented for each transmission/retransmission.

Figure 12:
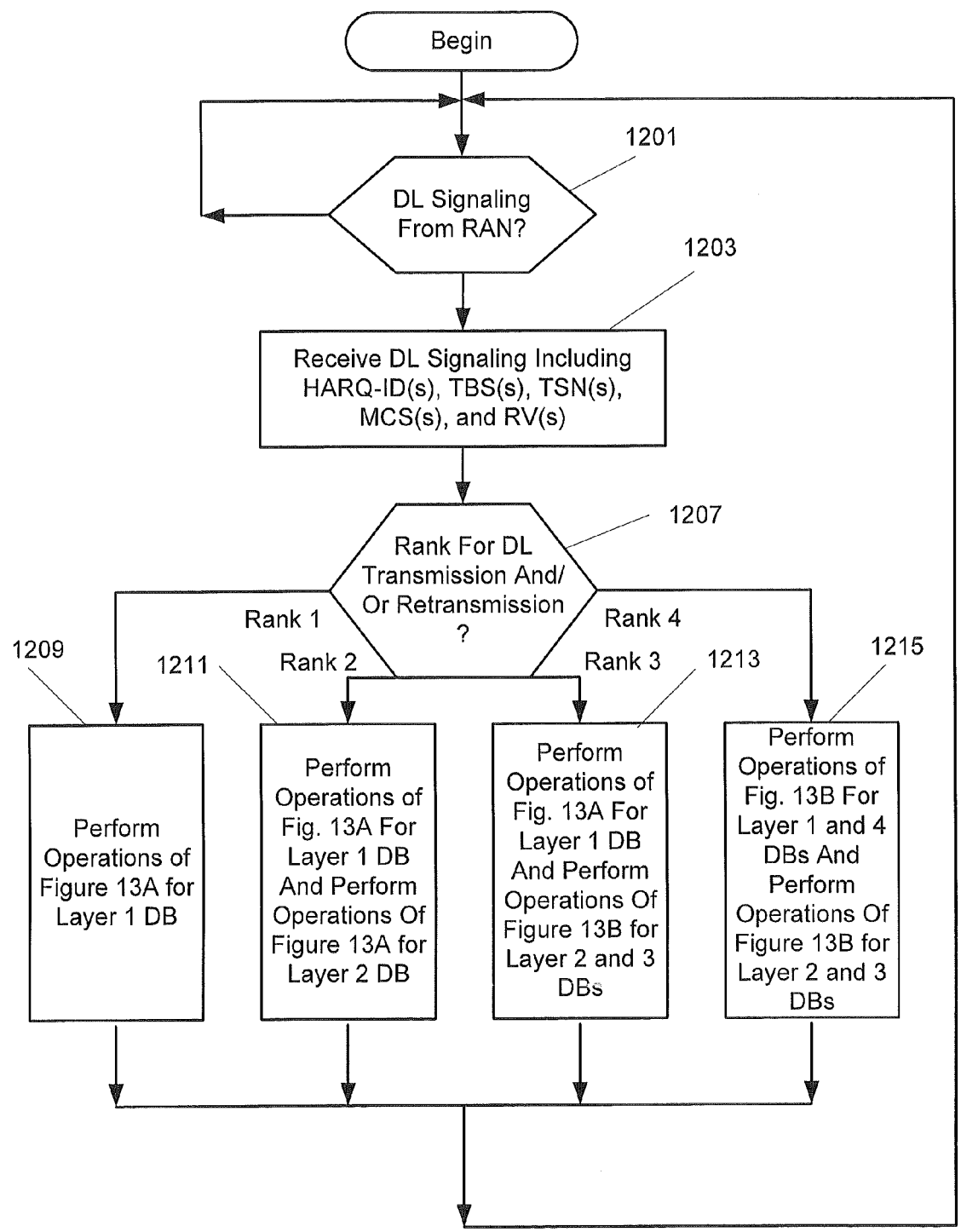

Operations of wireless terminal 200 (including wireless terminal processor 201 and wireless terminal transceiver 209) communicating with base station 100 are discussed in greater detail below with respect to FIGS. 12 and 13A-B. As shown in FIG. 12, wireless terminal processor 201 may wait at block 1201 until downlink signaling for a DL TTI is provided by base station 100 of the radio access network 60. At block 1203, wireless terminal processor 201 may receive the downlink signaling through transceiver 209, and as discussed above, the downlink signaling may include the HARQ ID(s), transport block size(s), transport sequence number(s), modulation/coding scheme(s), and redundancy version(s) for the downlink TTI. At blocks 1207 and 1209, processor 201 may process one data block of a rank 1 transmission/reception according to operations of FIG. 13A. At blocks 1207 and 1211, processor 201 may separately process first and second data blocks received over respective first and second MIMO layers of a rank 2 transmission/reception according to operations of FIG. 13A. At blocks 1207 and 1213, processor 201 may process a first data block received over a first MIMO layer of a rank 3 transmission/reception according to operations of FIG. 13A, and processor 201 may process second and third data blocks received over second and third MIMO layers of the rank 3 transmission/reception according to operations of FIG. 13B. At blocks 1207 and 1215, processor 201 may process first and fourth data block received over first and fourth MIMO layers of a rank 4 transmission/reception according to operations of FIG. 13B, and processor 201 may process second and third data blocks received over second and third MIMO layers of the rank 3 transmission/reception according to operations of FIG. 13B.

For a rank 1 TTI, base station 100 may transmit downlink signaling for one data block (including a first HARQ ID, a transport block size, a modulation/coding scheme, a redundancy version, and a transport sequence number, etc.) which is received (over the first MIMO layer) by wireless terminal processor 201 through transceiver 209 at block 1203. If the downlink signaling indicates that the data block is an initial transmission of a data block (based on the redundancy version) at block 1300 of FIG. 13A, processor 201 proceeds with operations of blocks 1301, 1303, 1305, and 1307 of FIG. 13A. More particularly, processor 201 generates symbols for the data block received over the first MIMO layer at block 1301, and demodulates the symbols at block 1303 to generate soft bits of the initial transmission of the data block. At block 1305, processor 201 clears/disregards any contents of soft buffering for the first MIMO layer, and at block 1307, processor 201 decodes the soft bits of the initial transmission of the data block. If the downlink signaling indicates that the data block is a retransmission of a data block (based on the redundancy version) at block 1300 of FIG. 13A, processor 201 proceeds with operations of blocks 1311, 1313, 1315, and 1317 of FIG. 13A. More particularly, processor 201 generates symbols for the data block received over the first MIMO layer at block 1311, and demodulates the symbols at block 1313 to generate soft bits of the retransmission of the data block. At block 1315, processor 201 combines soft bits of the retransmission and soft bits of a prior transmission of the data block (using bits from soft buffering for the first MIMO layer), and at block 1317, processor 201 decodes the soft bits of the retransmission of the data block using the combination of the soft bits of the retransmission and the prior transmission.

At block 1319, processor 201 determines the result of decoding (of either block 1307 or block 1317). If the decoding passes at block 1319 (i.e., the data block is successfully decoded), processor 201 transmits an ACK message through transceiver 209 to base station 100 at block 1321. If the decoding fails at block 1319 (i.e., the data block is successfully decoded), processor 201 transmits a NACK message through transceiver 209 to base station 100 at block 1323.

For a rank 2 TTI, base station 100 may transmit downlink signaling for a first data block to be transmitted/received over a first MIMO layer (including a first HARQ ID, a first transport block size, a first modulation/coding scheme, a first redundancy version, and a first transport sequence number, etc.) and for a second data block to be transmitted/received over a second MIMO layer (including a second HARQ ID, a second transport block size, a second modulation/coding scheme, a second redundancy version, and a second transport sequence number, etc.). In such a rank 2 TTI, operation of FIG. 13A may be performed separately for the first and second data blocks, with each of the first and second data blocks of the rank 2 TTI being an initial transmission or a retransmission. As discussed above, the first data block and the first MIMO layer may map to the first HARQ ID, and the second data block and the second MIMO layer may map to the second HARQ ID. Accordingly, an ACK or a NACK message for the first data block (depending on the success or failure of decoding the first data block 1307, 1317, 1319, 1321, and 1323) may be transmitted to the base station with the first HARQ ID, and an ACK or a NACK message for the second data block (depending on the success or failure of decoding the second data block 1307, 1317, 1319, 1321, and 1323) may be transmitted to the base station with the second HARQ ID.

For a rank 3 TTI, base station 100 may transmit downlink signaling for a first data block to be transmitted/received over a first MIMO layer (including a first HARQ ID, a first transport block size, a first modulation/coding scheme, a first redundancy version, and a first transport sequence number, etc.), and for second and third data blocks to be transmitted/received over second and third MIMO layers (including a second HARQ ID, a second transport block size, a second modulation/coding scheme, a second redundancy version, and second and third transport sequence numbers, etc.). In such a rank 3 TTI, operations of FIG. 13A may be performed for the first data block, with the first data block of the rank 3 ITT being an initial transmission or a retransmission.

In a rank 3 TTI, operations of FIG. 13B may be performed for the second and third data blocks, with both of the second and third data blocks being initial transmissions or with both of the second and third data blocks being retransmissions. If the downlink signaling indicates that the second and third data blocks are initial transmissions of the second and third data blocks (based on the second redundancy version) at block 1400 of FIG. 13B, processor 201 proceeds with operations of blocks 1401, 1403, 1405, and 1407 of FIG. 14A. More particularly, processor 201 generates symbols for the second and third data blocks received over the second and third MIMO layers at block 1401, and demodulates the symbols at block 1403 to generate soft bits of the initial transmission of the second and third data blocks. At block 1405, processor 201 clears/disregards any contents of soft buffering for the second and third MIMO layers, and at block 1407, processor 201 decodes the soft bits of the initial transmission of the second and third data blocks. If the downlink signaling indicates that the second and third data blocks are retransmissions (based on the second redundancy version) at block 1400 of FIG. 14A, processor 201 proceeds with operations of blocks 1411, 1413, 1415, and 1417 of FIG. 14A. More particularly, processor 201 generates symbols for the second and third data blocks received over the second and third MIMO layers at block 1411, and demodulates the symbols at block 1413 to generate soft bits of the retransmission of the second and third data blocks. At block 1415, processor 201 combines soft bits of the retransmission and soft bits of a prior transmission of the second and third data blocks (using bits from soft buffering for the second and third MIMO layers), and at block 1317, processor 201 decodes the soft bits of the retransmission of the second and third data blocks using the combination of the soft bits of the retransmission and the prior transmission.

At block 1419, processor 201 determines the result of decoding (of either block 1407 or block 1417) of both second and third data blocks. If the decoding passes at block 1319 (i.e., both of the second and third data blocks are successfully decoded), processor 201 transmits an ACK message through transceiver 209 to base station 100 at block 1321 for the second HARQ process ID. If the decoding fails at block 1319 (i.e., either or both of the second and third data blocks are not successfully decoded), processor 201 transmits a NACK message through transceiver 209 to base station 100 at block 1323 for the second HARQ process ID.

As discussed above, the first data block and the first MIMO layer may map to the first HARQ ID, and the second and third data blocks and the second and third MIMO layers may map to the second HARQ ID. Accordingly, an ACK or a NACK message for the first data block (depending on the success or failure of decoding the first data block at blocks 1307, 1317, 1319, 1321, and 1323) may be transmitted to the base station with the first HARQ ID, and an ACK or a NACK message for the second data block (depending on the success or failure of decoding the second and third data blocks at blocks 1407, 1417, 1419, 1421, and 1423) may be transmitted to the base station with the second HARQ ID. For a rank 4 TTI, base station 100 may transmit downlink signaling for first and fourth data blocks to be transmitted/received over first and fourth MIMO layers (including a first HARQ ID, a first transport block size, a first modulation/coding scheme, a first redundancy version, and first and fourth transport sequence number, etc.) and for second and third data blocks to be transmitted/received over second and third MIMO layers (including a second HARQ ID, a second transport block size, a second modulation/coding scheme, a second redundancy version, and second and third transport sequence numbers, etc.). In such a rank 4 TTI, operation of FIG. 13B may be performed separately for the first and fourth data blocks and for the second and third data blocks, with both of the first and fourth data blocks of the rank 4 TTI being initial transmissions or retransmissions and with both of the second and third data blocks of the rank 4 TTI being initial transmissions or retransmissions. As discussed above, the first and fourth data blocks and the first and fourth MIMO layers may map to the first HARQ ID, and the second and third data blocks and the second and third MIMO layers may map to the second HARQ ID. Accordingly, an ACK or a NACK message for the first and fourth data blocks (depending on the success or failure of decoding the first and fourth data blocks at blocks 1407, 1417, 1419, 1421, and 1423) may be transmitted to the base station with the first HARQ ID, and an ACK or a NACK message for the second and third data blocks (depending on the success or failure of decoding the second and third data blocks at blocks 1407, 1417, 1419, 1421, and 1423) may be transmitted to the base station with the second HARQ ID.

ACRONYMS/ABBREVIATIONS

Tx Transmitter
Rx Receiver
HSDPA High Speed Downlink Packet Access
HS-SCCH High Speed Shared Control Channel
HS-PDSCH High Speed Physical Data Shared Channel
HARQ Hybrid Automatic Repeat Request
CRC Cyclic Redundancy Check
NAK/NACK Non-Acknowledgment or Negative-Acknowledgment
ACK Acknowledgment
CC Chase Combining
IR Incremental Redundancy
UE User Equipment or Wireless Terminal
CQI Channel Quality Information
MMSE Minimum Mean Square Error
TTI Transmit Time Interval
PCI Precoding Control Index In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items. As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.,", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of present inventive concepts. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of present inventive concepts. All such variations and modifications are intended to be included herein within the scope of present inventive concepts. Accordingly, the above disclosed subject matter is to be considered illustrative, and not restrictive, and the appended claims are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the following claims, and shall not be restricted or limited by the foregoing detailed description.

That which is claimed is:

1. A method of operating a node of a multiple-input-multiple-output (MIMO) radio access network, the method comprising:
    transmitting a first hybrid automatic repeat request (HARQ) process identification for a first data block, a first initial redundancy version for the first data block, and a second hybrid automatic repeat request process identification for second and third data blocks over a downlink signaling channel to a wireless terminal for a first MIMO transmission time interval (TTI) wherein the first HARQ process identification is mapped to a first MIMO data transmission layer, and wherein the second HARQ process identification is mapped to second and third MIMO data transmission layers;
    transmitting the first, second, and third data blocks over the first, second, and third MIMO data transmission layers, respectively, to the wireless terminal for the first MIMO TTI;
    responsive to receiving an acknowledgment (ACK) message associated with the first HARQ process identification from the wireless terminal for the first MIMO TTI, transmitting the first hybrid automatic repeat request process identification and a second initial redundancy version for a fourth data block over the downlink signaling channel to the wireless terminal for a second MIMO TTI;
    responsive to receiving the ACK message associated with the first HARQ process identification from the wireless terminal for the first MIMO TTI, transmitting the fourth data block over the first MIMO data transmission layer to the wireless terminal for the second MIMO TTI; and
    responsive to receiving a negative acknowledgment (NACK) message associated with the second HARQ process identification from the wireless terminal for the first MIMO TTI, retransmitting the second and third data blocks over the second and third MIMO data transmission layers to the wireless terminal for the second MIMO TTI.

2. The method of claim 1 further comprising:
    responsive to receiving an acknowledgment (ACK) message associated with the second HARQ process identification from the wireless terminal, transmitting fifth and sixth data blocks over the second and third MIMO data transmission layers to the wireless terminal for the second MIMO transmission time interval.

3. The method of claim 1 further comprising:
    responsive to receiving a negative acknowledgment (NACK) message associated with the first HARQ process identification from the wireless terminal, retransmitting the first data block over the first MIMO data transmission layer to the wireless terminal for the second MIMO transmission time interval.

4. The method of claim 1 wherein the first HARQ process identification is mapped to the first MIMO data transmission layer and to a fourth MIMO data transmission layer, the method further comprising:
    transmitting a fifth data block over the fourth MIMO data transmission layer to the wireless terminal for the first MIMO transmission time interval; and
    responsive to receiving the ACK message associated with the first HARQ process identification from the wireless terminal, transmitting the fourth data block and a sixth data block over the third and fourth MIMO data transmission layers to the wireless terminal for the second MIMO transmission time interval.

5. The method of claim 4 further comprising:
responsive to receiving a NACK message associated with the first HARQ process identification from the wireless terminal, retransmitting the first and fourth data blocks over the first and fourth MIMO data transmission layers to the wireless terminal for the second MIMO transmission time interval.

6. The method of claim 1 further comprising:
before transmitting the fourth data block and retransmitting the second and third data blocks for the second MIMO transmission time interval, receiving the acknowledgment (ACK) message associated with the first HARQ process identification and the negative acknowledgment (NACK) message associated with the second HARQ process identification from the wireless terminal, wherein the first and fourth data blocks are different.

7. A method of operating a node of a multiple-input-multiple-output (MIMO) radio access network, the method comprising:
transmitting a first hybrid automatic repeat request (HARQ) process identification for a first data block, a second hybrid automatic repeat request process identification for second and third data blocks, and an initial redundancy version for the second and third data blocks over a downlink signaling channel to a wireless terminal for a first MIMO transmission time interval (TTI) wherein the first HARQ process identification is mapped to a first MIMO data transmission layer, and wherein the second HARQ process identification is mapped to second and third MIMO data transmission layers;
transmitting the first, second, and third data blocks over the first, second, and third MIMO data transmission layers, respectively, to the wireless terminal for the first MIMO TTI;
responsive to receiving an acknowledgment (ACK) message associated with the first HARQ process identification from the wireless terminal for the first MIMO TTI, transmitting a fourth data block over the first MIMO data transmission layer to the wireless terminal for a second MIMO TTI; and
responsive to receiving a negative acknowledgment (NACK) message associated with the second HARQ process identification from the wireless terminal for the first MIMO TTI, determining a subsequent redundancy version for the second and third data blocks for the second MIMO TTI, wherein the initial and subsequent redundancy versions for the second and third data blocks are different;
responsive to receiving the NACK message, transmitting the second hybrid automatic repeat request process identification and the subsequent redundancy version for the second and third data blocks over the downlink signaling channel to the wireless terminal for the second MIMO TTI; and
retransmitting the second and third data blocks over the second and third MIMO data transmission layers to the wireless terminal for the second MIMO TTI.

8. The method of claim 7 further comprising:
before transmitting the first and second hybrid automatic repeat request process identifications, determining a first initial redundancy version for the first data block, wherein the initial redundancy version for the second and third data blocks is a second initial redundancy version;
before transmitting the first, second, and third data blocks, transmitting the first initial redundancy version for the first data block and the second initial redundancy version for the second and third data blocks over the downlink signaling channel;
responsive to receiving the ACK message associated with the first HARQ process identification, determining a third initial redundancy version for the fourth data block, wherein the first and third initial redundancy versions are the same; and
responsive to receiving the ACK message associated with the first HARQ process identification and receiving the NACK message associated with the second HARQ process identification and before retransmitting the second and third data blocks, and before transmitting the fourth data block, transmitting the first and second hybrid automatic repeat request process identifications, the subsequent redundancy version for the second and third data blocks, and the third initial redundancy version for the fourth data block over the downlink signaling channel to the wireless terminal for the second MIMO TTI.

9. The method of claim 8 further comprising:
before transmitting the first and second hybrid automatic repeat request process identifications for the first MIMO TTI, determining a first transport block size and/or a first modulation/coding scheme to be applied to the first data block and a second transport block size and/or a second modulation/coding scheme to be applied to the second and third data blocks;
before transmitting the first, second, and third data blocks, transmitting the first transport block size and/or the first modulation/coding scheme for the first data block over the downlink signaling channel; and
before transmitting the first, second, and third data blocks, transmitting the second transport block size and/or the second modulation/coding scheme for the second and third data blocks over the downlink signaling channel;
wherein transmitting the first data block comprises transmitting the first data block in accordance with the first transport block size and/or the first modulation/coding scheme, and wherein transmitting the second and third data blocks comprises transmitting the second and third data blocks in accordance with the second transport block size and/or the second modulation/coding scheme.

10. A method of operating a node of a multiple-input-multiple-output (MIMO) radio access network, the method comprising:
transmitting a first hybrid automatic repeat request (HARQ) process identification for a first data block, a second HARQ process identification for second and third data blocks, and transmitting a transport block size and/or a modulation/coding scheme for the second and third data blocks over a downlink signaling channel to a wireless terminal for a first MIMO transmission time interval (TTI) wherein the first HARQ process identification is mapped to a first MIMO data transmission layer, and wherein the second HARQ process identification is mapped to second and third MIMO data transmission layers;
transmitting the first, second, and third data blocks over the first, second, and third MIMO data transmission layers, respectively, to the wireless terminal for the first MIMO TTI wherein transmitting the second and third data blocks comprises transmitting the second and third data blocks in accordance with the transport block size and/or the modulation/coding scheme;

responsive to receiving an acknowledgment (ACK) message associated with the first HARQ process identification from the wireless terminal for the first MIMO TTI, transmitting a fourth data block over the first MIMO data transmission layer to the wireless terminal for a second MIMO TTI; and responsive to receiving a negative acknowledgment (NACK) message associated with the second HARQ process identification from the wireless terminal for the first MIMO TTI, retransmitting the second and third data blocks over the second and third MIMO data transmission layers to the wireless terminal for the second MIMO TTI.

11. A node of a multiple-input-multiple-output (MIMO) radio access network, the node comprising:

a transceiver configured to provide communications over a wireless channel with a wireless terminal; and a processor coupled with the transceiver, wherein the processor is configured to, transmit a first hybrid automatic repeat request (HARQ) process identification for a first data block, a first initial redundancy version for the first data block, and a second hybrid automatic repeat request process identification for second and third data blocks through the transceiver over a downlink signaling channel to a wireless terminal for a first MIMO transmission time interval (TTI) wherein the first HARQ process identification is mapped to a first MIMO data transmission layer, and wherein the second HARQ process identification is mapped to second and third MIMO data transmission layers, transmit the first, second, and third data blocks through the transceiver over the first, second, and third MIMO data transmission layers, respectively, to the wireless terminal for the first MIMO TTI, transmit the first hybrid automatic repeat request process identification and a second initial redundancy version for a fourth data block over the downlink signaling channel to the wireless terminal for a second MIMO TTI responsive to receiving an ACK message associated with the first HARQ process identification from the wireless terminal for the first MIMO TTI, transmit the fourth data block through the transceiver over the first MIMO data transmission layer to the wireless terminal for the second MIMO TTI responsive to receiving the ACK message associated with the first HARQ process identification from the wireless terminal for the first MIMO TTI, and retransmit the second and third data blocks through the transceiver over the second and third MIMO data transmission layers to the wireless terminal for the second MIMO TTI responsive to receiving a negative acknowledgment (NACK) message associated with the second HARQ process identification from the wireless terminal for the first MIMO TTI.

12. The node of claim 11 wherein the processor is further configured to, transmit fifth and sixth data blocks over the second and third MIMO data transmission layers to the wireless terminal for the second MIMO transmission time interval responsive to receiving an acknowledgment (ACK) message associated with the second HARQ process identification from the wireless terminal.

13. The node of claim 11 wherein the processor is further configured to, retransmit the first data block over the first MIMO data transmission layer to the wireless terminal for the second MIMO transmission time interval responsive to receiving a negative acknowledgment (NACK) message associated with the first HARQ process identification from the wireless terminal.

14. The node of claim 11 wherein the first HARQ process identification is mapped to the first MIMO data transmission layer and to a fourth MIMO data transmission layer, wherein the processor is further configured to, transmit a fifth data block over the fourth MIMO data transmission layer to the wireless terminal for the first MIMO transmission time interval, and transmit the fourth data block and a sixth data block over the third and fourth MIMO data transmission layers to the wireless terminal for the second MIMO transmission time interval responsive to receiving the ACK message associated with the first HARQ process identification from the wireless terminal.

15. The node of claim 14 wherein the processor is further configured to, retransmit the first and fourth data blocks over the first and fourth MIMO data transmission layers to the wireless terminal for the second MIMO transmission time interval responsive to receiving a NACK message associated with the first HARQ process identification from the wireless terminal.

16. The node of claim 11 wherein the processor is further configured to, receive the acknowledgment (ACK) message associated with the first HARQ process identification and the negative acknowledgment (NACK) message associated with the second HARQ process identification from the wireless terminal before transmitting the fourth data block and retransmitting the second and third data blocks for the second MIMO transmission time interval, wherein the first and fourth data blocks are different.

17. A node of a multiple-input-multiple-output (MIMO) radio access network, the node comprising:

a transceiver configured to provide communications over a wireless channel with a wireless terminal; and a processor coupled with the transceiver, wherein the processor is configured to, transmit a first hybrid automatic repeat request (HARQ) process identification for a first data block, a second hybrid automatic repeat request process identification for second and third data blocks, and an initial redundancy version for the second and third data blocks through the transceiver over a downlink signaling channel to a wireless terminal for a first MIMO transmission time interval (TTI) wherein the first HARQ process identification is mapped to a first MIMO data transmission layer, and wherein the second HARQ process identification is mapped to second and third MIMO data transmission layers, transmit the first, second, and third data blocks through the transceiver over the first, second, and third MIMO data transmission layers, respectively, to the wireless terminal for the first MIMO TTI, transmit the second hybrid automatic repeat request process identification and a subsequent redundancy version for the second and third data blocks over the downlink signaling channel to the wireless terminal for a second MIMO TTI responsive to receiving a negative acknowledgment (NACK) message associated with the second HARQ process identification from the wireless terminal for the first MIMO TTI wherein the initial and subsequent redundancy version for the second and third data blocks are different, transmit a fourth data block through the transceiver over the first MIMO data transmission layer to the wireless terminal for the second MIMO TTI responsive to receiving an acknowledgment (ACK) message associated with the first HARQ process identification from the wireless terminal for the first MIMO TTI, and retransmit the second and third data blocks through the transceiver over the second and third MIMO data transmission layers to the wireless terminal for the second MIMO TTI responsive to receiving the NACK message associated with the second HARQ process identification from the wireless terminal for the first MIMO TTI.

18. The node of claim 17 wherein the processor is further configured to, determine a first initial redundancy version for the first data block before transmitting the first and second hybrid automatic repeat request process identifications, wherein the initial redundancy version for the second and third data blocks is a second initial redundancy version, transmit the first initial redundancy version for the first data block and the second initial redundancy version for the second and third data blocks over the downlink signaling channel before transmitting the first, second, and third data blocks, determine a third initial redundancy version for the fourth data block responsive to receiving the ACK message associated with the first HARQ process identification, wherein the first and third initial redundancy versions are the same, and transmit the first and second hybrid automatic repeat request process identifications, the subsequent redundancy version for the second and third data blocks, and the third initial redundancy version for the fourth data block over the downlink signaling channel to the wireless terminal for the second MIMO TTI, responsive to receiving the ACK message associated with the first HARQ process identification and receiving the NACK message associated with the second HARQ process identification, before retransmitting the second and third data blocks, and before transmitting the fourth data block.

19. The node of claim 18 wherein the processor is further configured to, determine a first transport block size and/or a first modulation/coding scheme to be applied to the first data block and a second transport block size and/or a second modulation/coding scheme to be applied to the second and third data blocks before transmitting the first and second hybrid automatic repeat request process identifications for the first MIMO TTI, transmit the first transport block size and/or the first modulation/coding scheme for the first data block over the downlink signaling channel before transmitting the first, second, and third data blocks, and transmit the second transport block size and/or the second modulation/coding scheme for the second and third data blocks over the downlink signaling channel before transmitting the first, second, and third data blocks, wherein transmitting the first data block comprises transmitting the first data block in accordance with the first transport block size and/or the first modulation/coding scheme, and wherein transmitting the second and third data blocks comprises transmitting the second and third data blocks in accordance with the second transport block size and/or the second modulation/coding scheme.

20. A node of a multiple-input-multiple-output (MIMO) radio access network, the node comprising:

a transceiver configured to provide communications over a wireless channel with a wireless terminal; and a processor coupled with the transceiver, wherein the processor is configured to, transmit a first hybrid automatic repeat request (HARQ) process identification for a first data block, a second hybrid automatic repeat request process identification for second and third data blocks, and a transport block size and/or a modulation/coding scheme for the second and third data blocks through the transceiver over a downlink signaling channel to the wireless terminal for a first MIMO TTI wherein the first HARQ process identification is mapped to a first MIMO data transmission layer, and wherein the second HARQ process identification is mapped to second and third MIMO data transmission layers, transmit the first, second, and third data blocks through the transceiver over the first, second, and third MIMO data transmission layers, respectively, to the wireless terminal for the first MIMO TTI wherein transmitting the second and third data blocks comprises transmitting the second and third data blocks in accordance with the transport block size and/or the modulation/coding scheme, transmit a fourth data block through the transceiver over the first MIMO data transmission layer to the wireless terminal for a second MIMO TTI responsive to receiving an acknowledgment (ACK) message associated with the first HARQ process identification from the wireless terminal for the first MIMO TTI, and retransmit the second and third data blocks through the transceiver over the second and third MIMO data transmission layers to the wireless terminal for the second MIMO TTI responsive to receiving a negative acknowledgment (NACK) message associated with the second HARQ process identification from the wireless terminal for the first MIMO TTI.

* * * * *